(12) United States Patent
Shimizu

(10) Patent No.: US 11,411,223 B2
(45) Date of Patent: Aug. 9, 2022

(54) NEGATIVE ELECTRODE AND LITHIUM ION SECONDARY BATTERY

(71) Applicant: TDK CORPORATION, Tokyo (JP)

(72) Inventor: Chieko Shimizu, Tokyo (JP)

(73) Assignee: TDK CORPORATION, Tokyo (JP)

( * ) Notice: Subject to any disclaimer, the term of this patent is extended or adjusted under 35 U.S.C. 154(b) by 281 days.

(21) Appl. No.: 16/608,896

(22) PCT Filed: Mar. 22, 2019

(86) PCT No.: PCT/JP2019/012259
§ 371 (c)(1),
(2) Date: Oct. 28, 2019

(87) PCT Pub. No.: WO2019/182150
PCT Pub. Date: Sep. 26, 2019

(65) Prior Publication Data
US 2020/0274166 A1 Aug. 27, 2020

(30) Foreign Application Priority Data

Mar. 22, 2018 (JP) .............................. JP2018-055056
Mar. 22, 2018 (JP) .............................. JP2018-055176
Mar. 22, 2018 (JP) .............................. JP2018-055253

(51) Int. Cl.
*H01M 4/62* (2006.01)
*H01M 10/05* (2010.01)
(Continued)

(52) U.S. Cl.
CPC ....... *H01M 4/628* (2013.01); *H01M 10/0525* (2013.01); *H01M 2004/021* (2013.01); *H01M 2004/027* (2013.01)

(58) Field of Classification Search
CPC ............ H01M 4/628; H01M 10/0525; H01M 2004/021; H01M 2004/027
See application file for complete search history.

(56) References Cited

U.S. PATENT DOCUMENTS

| 2016/0372741 A1 | 12/2016 | Chung et al. |
| 2017/0301920 A1* | 10/2017 | Liu .......................... B01J 43/00 |
| 2019/0020030 A1 | 1/2019 | Umetsu et al. |

FOREIGN PATENT DOCUMENTS

| JP | 2008-177263 A | 7/2008 |
| JP | 2010-118179 A | 5/2010 |

(Continued)

*Primary Examiner* — Maria Laios
*Assistant Examiner* — Angela J Martin
(74) *Attorney, Agent, or Firm* — Oliff PLC

(57) ABSTRACT

A negative electrode includes a current collector and a negative electrode layer coated on at least one surface of the current collector. The negative electrode layer containing either phosphorus or fluorine, and the phosphorus content or fluorine content in the central portion of the negative electrode layer differs from the average phosphorus content in the end portion outward from the central portion to the side or the average fluorine content, and the phosphorus content P1 in the central portion and the average phosphorus content in the end portion P2 is $1 < P1/P2 \leq 1.30$, or the fluorine content F1 in the central portion and the average fluorine content F2 in the end portion of the negative electrode satisfy $1 < F1/F2 \leq 1.22$.

15 Claims, 2 Drawing Sheets

(51) Int. Cl.
*H01M 10/0525* (2010.01)
*H01M 4/02* (2006.01)

(56) References Cited

FOREIGN PATENT DOCUMENTS

| | | | |
|---|---|---|---|
| JP | 2013-069579 A | 4/2013 | |
| JP | 2013-225440 A | 10/2013 | |
| JP | 5357517 B2 | 12/2013 | |
| JP | 2015-099725 A | 5/2015 | |
| JP | 6067545 B2 | 1/2017 | |
| JP | 2017-535017 A | 11/2017 | |
| JP | 6227839 B2 | 11/2017 | |
| JP | 2018-006289 A | 1/2018 | |
| WO | WO 2012086507 * | 6/2012 | ........ H01M 10/0567 |
| WO | 2017/126689 A1 | 7/2017 | |

* cited by examiner

NEGATIVE ELECTRODE AND LITHIUM ION SECONDARY BATTERY

TECHNICAL FIELD

The present invention relates to a negative electrode and a lithium ion secondary battery.

This application claims priority on Japanese Patent Application No. 2018-055176, Japanese Patent Application No. 2018-055253, and Japanese Patent Application No. 2018-055056 filed in Japan on Mar. 22, 2018, the contents of which are hereby incorporated by reference.

BACKGROUND

In recent years, electronic devices such as mobile phones and personal computers have rapidly become smaller and cordless, and there is an increasing demand for secondary batteries having a small size, light mass and high energy density as power sources for driving these devices. In particular, a lithium ion secondary battery having a large charge and discharge capacity and a high energy density has attracted attention. In the lithium ion secondary battery, capacity is obtained by intercalation and de-intercalation of $Li^+$ solvated by oxidation/reduction reaction at the interface between the positive electrode and the electrolyte, or the negative electrode and the electrolyte.

The lithium ion secondary battery has a structure that generally includes an electrode body and a non-aqueous electrolyte, and can be broadly classified into two types including a stacked-type battery and a wound-type battery depending on the shape of the electrode body. The electrode body of the wound-type battery is manufactured by winding a long sheet-like electrode and a long sheet-like separator together into a flat shape. The electrode body of the wound-type battery has an advantage in that it can be manufactured continuously from a single roll and has excellent productivity. On the other hand, due to its structure, a gradient occurs in the electric field strength distribution in the plane or at the edge of the wound body, and electric current is concentrated in a region where the electric field strength increases. Therefore, the electrode body of the wound-type battery has a problem in that the oxidation/reduction reaction is likely to be non-uniform compared to that of the stacked-type battery.

During the oxidation/reduction reaction, it is known that an SEI film such as LiF film derived from the reduction reaction is formed on the negative electrode surface in the negative electrode side. Here, when the reaction in the electrode surface proceeds non-uniformly, such deposition becomes more prominent in the region where the reaction proceeds excessively. In the region where the deposition has progressed, the conductivity decreases, and as a result, the internal resistance of the battery increases, the capacity deteriorates with repeated charge and discharge, and metal elution tends to occur.

Patent Document 1 discloses that loss of the SEI layer can be prevented by forming a stable coating film containing fluorine on the negative electrode surface, and that as a result, battery performance can be improved.

Patent Document 2 discloses a lithium ion secondary battery in which the water content at the end portion of the negative electrode is higher by 200 ppm or more than the water content in the central portion of the negative electrode. The difference in the amount of SEI formed between the end portion and the central portion of the negative electrode plate is improved due to the difference in water content. As a result, a difference in Li+ acceptability between the end portion and the central portion of the negative electrode plate is improved, wherein the difference in Li+ acceptability is due to the above-mentioned difference in the amount of SEI. Patent Document 2 discloses that cycle durability in a low-temperature environment is improved by using the lithium ion secondary battery.

Patent Document 3 discloses that an ionically conductive medium includes an additive compound containing one or more anionic compounds selected from PTFO, PFO, and PO, and performs a conditioning treatment. Patent Document 3 discloses that an increase in battery resistance is suppressed and good battery characteristics are exhibited even after a cycle by forming a film containing phosphorus as a main component on the surface of the positive electrode.

In Patent Document 4, in the SEM-EDS analysis of the positive electrode surface, the area overlap ratio of element mapping of oxygen and fluorine is calculated by binarization processing. It was disclosed that gas generation is suppressed by suppressing an excessive decomposition reaction at the positive electrode, and that battery characteristics of suppressing a decrease in capacity in a high-load charge and discharge cycle are exhibited.

However, in the method disclosed in the above documents, various characteristics have not yet been satisfied, and improvement of resistance to metal lithium deposition during repeated charge and discharge is required.

[Patent Document 1] Translation of PCT International Publication No. 2017-535017
[Patent Document 2] Japanese Patent No. 6067545
[Patent Document 3] Japanese Patent No. 5357517
[Patent Document 4] Japanese Patent No. 6227839

SUMMARY OF THE INVENTION

The present invention has been made in view of the above problems, and an object thereof is to provide a negative electrode in which excessive deposition of precipitates on the surface is suppressed, and a lithium ion secondary battery which includes the negative electrode and has excellent cycle characteristics.

In addition, the present inventors have found that a negative electrode including a negative electrode layer in which a phosphorus content in the central portion is larger than a phosphorus content in the end portion within a certain range improves the cycle characteristics of the lithium ion secondary battery including the negative electrode.

The present inventors have found that a negative electrode having a negative electrode layer in which a fluorine content in the central portion is larger than a fluorine content in the end portion within a certain range improves the cycle characteristics of the lithium ion secondary battery including the negative electrode.

The present inventors have found that a negative electrode including a negative electrode layer in which a water content in the central portion is larger than a water content in the end portion within a certain range improves the cycle characteristics of the lithium ion secondary battery including the negative electrode.

In order to solve the above problems, the following means are provided.

(1) A negative electrode comprising a current collector and a negative electrode layer coated on at least one surface of the current collector, wherein the negative electrode layer comprises either phosphorus or fluorine, a phosphorus content or a fluorine content in a central portion of the negative electrode layer is different from an average phosphorus content or an average fluorine content in an end portion outward from the central portion to a side, the phosphorus content P1 in the central portion and the average phosphorus content P2 in the end portion satisfy a relationship of $1<P1/P2\leq1.30$, or the fluorine content F1 in the central portion and the average fluorine content F2 in the end portion satisfy a relationship of $1<F1/F2\leq1.22$.

(2) In the negative electrode according to the above embodiment, wherein the negative electrode layer has a phosphorus-containing layer, an average thickness T1 [μm] of the phosphorus-containing layer in the central portion and an average thickness T2 [μm] of the phosphorus-containing layer in the end portion satisfy both a relationship of $1<T1/T2\leq1.80$ and a relationship of $T1\leq10$.

(3) In the negative electrode according to the above embodiment, wherein the phosphorus content P1 in the central portion and the phosphorus content P3 at an arbitrary point in the end portion satisfy a relationship of $1<P1/P3\leq1.30$.

(4) In the negative electrode according to the embodiment described above, wherein the negative electrode layer has a phosphorus-containing layer, an average thickness T1 [μm] of the phosphorus-containing layer in the central portion and a thickness T3 [μm] of the phosphorus-containing layer at an arbitrary point in the end portion satisfy a relationship of $1<T1/T3\leq1.80$.

(5) In the negative electrode according to the above embodiment, wherein the negative electrode layer has a fluorine-containing layer, an average thickness T1 [μm] of the fluorine-containing layer in the central portion and an average thickness T2 [μm] of the fluorine-containing layer in the end portion satisfy both a relationship of $1<T1/T2\leq1.80$ and a relationship of $T1\leq10$.

(6) In the negative electrode according to the above embodiment, wherein the fluorine content F1 in the central portion and the fluorine content F3 at an arbitrary point in the end portion satisfy a relationship of $1<F1/F3\leq1.22$.

(7) In the negative electrode according to the above embodiment, wherein the negative electrode layer has a fluorine-containing layer, the average thickness T1 [μm] of the fluorine-containing layer in the central portion and the thickness T3 [μm] of the fluorine-containing layer at arbitrary point in the end portion satisfy both a relationship of $1<T1/T3\leq1.80$ and a relationship of $T1\leq10$.

(8) A negative electrode according to one embodiment of the present invention is a negative electrode comprising a current collector and a negative electrode layer coated on at least one surface of the current collector, wherein the negative electrode layer comprises phosphorus and fluorine, a phosphorus content in a central portion of the negative electrode layer is different from an average phosphorus content in an end portion outward from the central portion to a side, a fluorine content in the central portion of the negative electrode layer is different from an average fluorine content in the end portion outward from the central portion to a side, the phosphorus content P1 in the central portion and the average phosphorus content P2 in the end portion satisfy a relationship of $1<P1/P2\leq1.30$, and the fluorine content F1 in the central portion and the average fluorine content in the end portion in which F2 satisfy a relationship of $1<F1/F2\leq1.22$.

(9) In the negative electrode described in (1) to (8) above, wherein the negative electrode layer comprises phosphorus and fluorine, the total amount of the phosphorus content and the fluorine content in the central portion of the negative electrode layer is different from the total amount of the average phosphorus content and the average fluorine content in the end portion outward from the central portion to the side, the relationship between the sum of the phosphorus content P1 and fluorine content F1 in the central portion and the sum of the average phosphorus content P2 and average fluorine content F2 in the end portion satisfy a relationship of $1<(P1+F1)/(P2+F2)\leq1.24$.

(10) In the negative electrode described in (1) to (9) above, wherein a water content in the central portion of the negative electrode layer is different from an average water content in the end portion outward from the central portion to the side, the water content W1 [ppm] per unit mass in the central portion measured and the average water content W2 [ppm] per unit mass in the end portion satisfy a relationship of $1<W1/W2\leq1.5$, wherein when the water content W1 and the average water content W2 are measured when the negative electrode layer is heated from 120° C. to 300° C.

(11) In the negative electrode described in (1) to (10) above, wherein the water content W1 [ppm] per unit mass in the central portion and the water content W3 [ppm] per unit mass at arbitrary point in the end portion satisfy a relationship of $1<W1/W3\leq1.5$.

(12) A lithium ion secondary battery according to an embodiment of the present invention includes a positive electrode;

the negative electrode according to any one of claims 1 to 11; and a separator interposed between the positive electrode and the negative electrode, and a non-aqueous electrolyte.

In the negative electrodes according to the above embodiments, since wrinkle generation on the coated surface caused by the difference in the water absorption of the binder and the difference in the degree of expansion of the active material is suppressed, unintended non-uniformity of the oxidation/reduction reaction on the negative electrode surface and an excessive deposition of precipitates on the surface of the negative electrode are suppressed. Thereby, since the metal lithium precipitation tolerance during repeated charge and discharge is improved, a lithium ion secondary battery with excellent cycle characteristics can be provided.

DETAILED DESCRIPTION OF THE INVENTION

Figure 1:
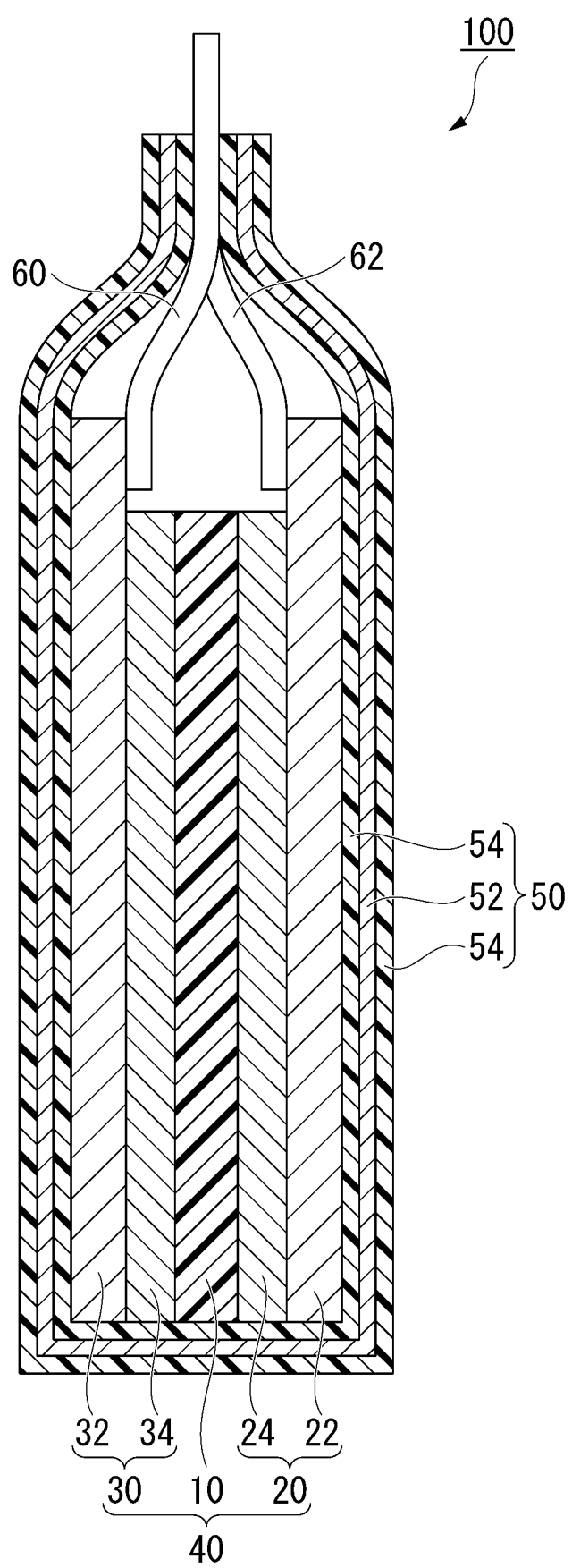
FIG. 1 is a schematic cross-sectional view of a lithium ion secondary battery according to the present embodiment.

Hereinafter, the present invention will be described in detail with reference to the drawings as appropriate. In the drawings used in the following description, in order to make the characteristics of the present invention easier to understand, there are cases where the characteristic parts are enlarged for convenience. Therefore, the dimensional ratios of the components described in the drawings may be different from the actual ones. The materials, dimensions, and the like exemplified in the following description are merely examples, and the present invention is not limited to these, and can be appropriately changed and implemented within a range where the effects are exhibited.

[Lithium Ion Secondary Battery]

FIG. 1 is a schematic cross-sectional view of a lithium ion secondary battery 100 according to this embodiment. A lithium ion secondary battery 100 shown in FIG. 1 mainly includes a laminated body 40, a case 50 that accommodates the laminated body 40 in a sealed state, and a pair of leads 60 and 62 connected to the laminated body 40. Although not shown, an electrolyte solution is provided in the case 50 together with the laminated body 40.

The lithium ion secondary battery 100 may be preliminarily charged and discharged prior to commercial use in order to ensure the specified charge and discharge performance after the battery is assembled. During this preliminary charge and discharge, precipitates containing fluorine (F) and phosphorus (P) are deposited on the surface of the negative electrode 30.

In addition, an SEI film such as LiF is formed on the surface of the negative electrode 30 during the preliminary charge and discharge.

The laminated body 40 is configured such that the positive electrode 20 and the negative electrode 30 are disposed to face each other with the separator 10 interposed therebetween. The positive electrode 20 is obtained by providing a positive electrode active material layer 24 on a plate-like (film-like) positive electrode current collector 22. The negative electrode 30 is obtained by providing a negative electrode active material layer 34 on a plate-like (film-like) negative electrode current collector 32.

The positive electrode active material layer 24 and the negative electrode active material layer 34 are in contact with both sides of the separator 10, respectively. Leads 62 and 60 are connected to the ends of the positive electrode current collector 22 and the negative electrode current collector 32, respectively, and the ends of the leads 60 and 62 extend to the outside of the case 50. In FIG. 1, as one example, the case 50 has one laminated body 40 therein, but a plurality of laminated bodies 40 may be stacked.

"Negative Electrode"

(Negative Electrode Active Material Layer)

The negative electrode 30 includes a negative electrode current collector 32 and a negative electrode active material layer 34. In the present specification, the negative electrode active material layer 34 is also referred to as a negative electrode layer 34. The negative electrode active material layer 34 includes a negative electrode active material and a negative electrode binder, and may further include a conductive material, an additive, and the like as necessary.

Figure 2:
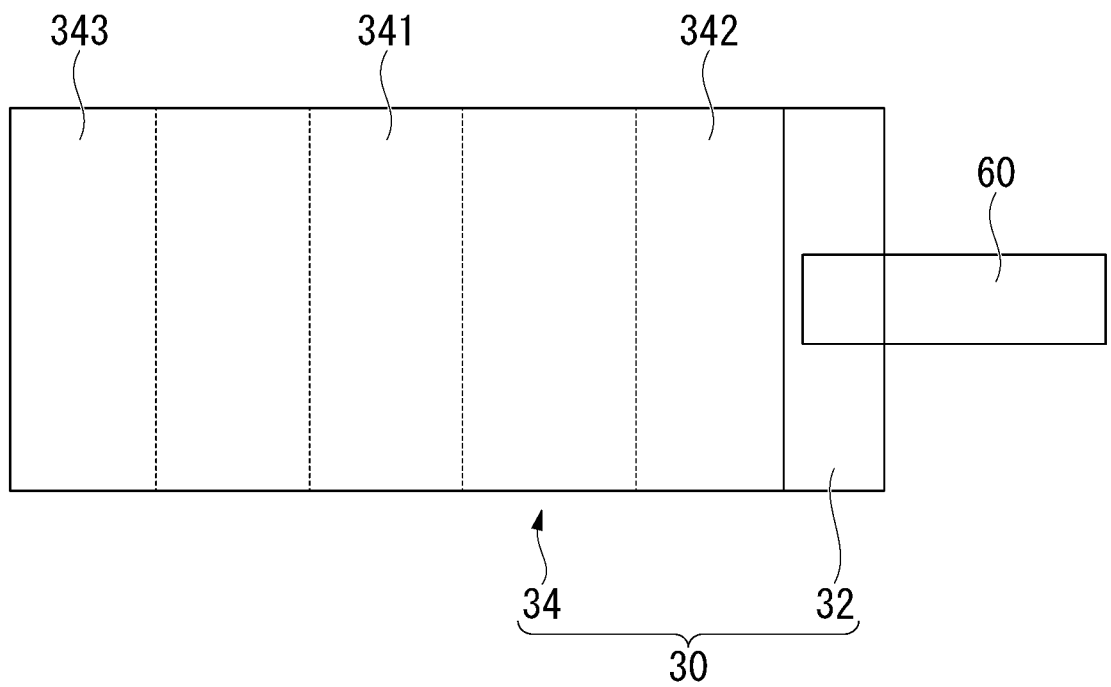
FIG. 2 is a top view of the negative electrode according to the present embodiment.

The negative electrode active material layer 34 can be divided into a central portion and an end portion outward from the central portion to the side. When the negative electrode active material layer 34 is a square, there are four sides, and thus the negative electrode active material layer 34 may have four end portions. However, for convenience of explanation in this specification, as shown in FIG. 2, a central portion 341 and two end portions (a first end portion 342 and a second end portion 343) are assumed. However, those skilled in the art will appreciate that the description herein can also be applied to polygons having two sides or more.

FIG. 2 shows the central portion 341, the first end portion 342 and the second end portion 343 in the negative electrode active material layer 34. In FIG. 2, the lead 60 is provided at the end of the negative electrode current collector 32.

<Central Portion>

In one embodiment, the central portion 341 may refer to a portion advanced by ($\frac{1}{10}$) L from the center of the first side and the second side toward the first side and the second side when the distance between the first side and the second side is L.

<First End Portion and Second End Portion>

In one embodiment of the present invention, the first end portion 342 may refer to a portion advanced by ($\frac{1}{5}$) L from the first side toward the second side when the distance between the first side and the second side is L. Similarly, the second end portion 343 may refer to a portion advanced by ($\frac{1}{5}$) L from the second side toward the first side, when the distance between the first side and the second side is L.

In another embodiment, when the distance between the first side and the second side is L, the central portion 341 may refer to a portion advanced by ($\frac{1}{6}$) L from the center of the first side and the second side toward the first side and the second side. The first end portion 342 may refer to a portion advanced by ($\frac{1}{3}$) L from the first side toward the second side when the distance between the first side and the second side is L. The second end portion 343 may refer to a portion advanced by ($\frac{1}{3}$) L from the second side toward the first side when the distance between the first side and the second side is L.

The negative electrode active material layer 34 may contain phosphorus. Phosphorus may be present as an additive added to the negative electrode active material layer 34, or may exist as a high-resistance precipitate produced by reacting with the electrolyte contained in the non-aqueous electrolyte solution through preliminary charge and discharge before commercial use.

The negative electrode active material layer 34 may contain fluorine. Fluorine may be present as an additive added to the negative electrode active material layer 34, or may exist as a high-resistance precipitate produced by reacting with the electrolyte contained in the non-aqueous electrolyte solution through preliminary charge and discharge before commercial use.

After charge and discharge, the negative electrode active material layer 34 may contain phosphorus in various forms. Here, charge and discharge means both single cycle or multi-cycle charge and discharge performed in the degassing/aging process before product shipment and charge and discharge during normal battery use by the user. Further, "after charge and discharge" may be either a state after charge or a state after discharge.

After the charge and discharge, fluorine can be included in the negative electrode active material layer 34 in various forms. Here, charge and discharge means both single cycle or multi-cycle charge and discharge performed in the degassing/aging process before product shipment and charge and discharge during normal battery use by the user. Further, "after charge and discharge" may be either a state after charge or a state after discharge.

Phosphorus can be included as a phosphorus compound in the negative electrode active material layer 34. The phosphorus compound can be an aromatic compound or an aliphatic compound. In particular, the phosphorus compound can be a phosphate ester compound. Phosphate ester compounds may be triphenyl phosphate (TPP), tricresyl phosphate (TCP), trixylenyl phosphate (TXP), cresyl diphenyl phosphate (CDP), 2-ethylhexyl diphenyl phosphate (EHDP), t-butylphenyl diphenyl phosphate (t-BDP), bis-(t-butylphenyl) phenyl phosphate (BBDP), tris-(t-butylphenyl) phosphate (TBDP), isopropylphenyl diphenyl phosphate (IPP), bis-(isopropylphenyl) diphenyl phosphate (BIPP), tris-(isopropylphenyl) phosphate (TIPP), tris(chloroethyl) phosphate, tris(β-chloropropyl) phosphate, tetrakis(2-chloroethyl) dichloroisopentyl diphosphate, polyoxyalkylene bis (dichloroalkyl) phosphate, resorcinol bis-diphenyl phosphate, resorcinol bis-dixylenyl phosphate, bisphenol A bis-diphenyl phosphate, triphenyl phosphite, trisnonylphenyl phosphite, tricresyl phosphite and tris (2-ethylhexyl) phosphite. Preferably, the phosphorus ester compound may be one or more selected from the group consisting of triphenyl phosphite, trisnonylphenyl phosphite, tricresyl phosphite and tris(2-ethylhexyl) phosphite. The phosphorus compound may be included as crystals or as an amorphous form. The phosphorus content in the negative electrode active material layer 34 can be derived from the phosphorus component contained in the negative electrode material, and the phosphorus component contained in the non-aqueous electrolyte and the lithium salt.

Fluorine can be included as a fluorine compound in the negative electrode active material layer 34. The fluorine compound can be a fluorine-based surfactant or a fluorine-based flame retardant. Fluorine-based surfactants include potassium heptadecafluoro-1-octane sulfonate, heptadecafluorooctane sulfonate, hepadecafluorononanoic acid, lithium heptadecafluoro-1-octane sulfonate, heneicosafluoroundecanoic acid, 4, 4, 5, 5, 6, 6, 7, 7, 8, 8, 9, 9, 10, 10, 11, 11, 11-heptadecafluoroundecanoic acid, nonadecafluorodecanoic acid, nonafluoro-1-butane sulfonic acid, lithium nonafluoro-1-butanesulfonate, potassium nonafluoro-1-butanesulfonate, pentadecafluorooctanoic acid, ammonium pentadecafluorooctanoate, tridecafluoroheptanoic acid, tricosafluorododecanoic acid, undecafluorohexane acid. Fluorine flame retardants may be polytetrafluoroethylene, polychlorotrifluoroethylene, polyvinylidene fluoride, polyvinyl fluoride, perfluoroalkoxy fluororesin, tetrafluoroethylene/ hexafluoropropylene copolymer, ethylene/tetrafluoroethylene copolymer, and an ethylene/chlorotrifluoroethylene copolymer. Preferably, the fluorine-based surfactant may be one or more members selected from the group consisting of SURFLON (registered trademark) (manufactured by AGC Semi Chemical Co., Ltd) and FC-4430 (manufactured by 3M). The fluorine-based flame retardant may be one or more members selected from the group consisting of POLYFLON PTFE LUBRON (Daikin) and POLYFLON MPA (Daikin). The fluorine compound may be included as crystals or as an amorphous form. The fluorine content in the negative electrode active material layer 34 can be derived from a fluorine component contained in the negative electrode material, and a fluorine component contained in the non-aqueous electrolyte and the lithium salt.

In the present application, the distribution of precipitates formed on the negative electrode active material layer 34 during charge and discharge is controlled by adjusting the distribution of phosphorus content in the negative electrode active material layer 34, that is, the distribution of phosphorus concentration, within a certain range. Moreover, in this application, the distribution of the precipitate formed in the negative electrode active material layer 34 during charge and discharge is controlled by adjusting the distribution of fluorine content in the negative electrode active material layer 34, that is, the distribution of fluorine concentration, within a certain range. Thereby, the cycle characteristics of the lithium ion secondary battery 100 including the negative electrode active material layer 34 are improved.

In one embodiment of the present invention, the phosphorus content in the central portion of the negative electrode active material layer 34 is different from the average phosphorus content in the end portion outward from the central portion to the side. Moreover, in another one embodiment, the fluorine content in the center portion of the negative electrode active material layer 34 is different from the average fluorine content in the end portion outward from the central portion to the side. The phosphorus content or fluorine content in the central portion is an average value of five or three data obtained by measuring the phosphorus content or fluorine content at five or three arbitrary points in the central portion of the negative electrode active material layer 34. The average phosphorus content or the average fluorine content in the end portion is an average value of a plurality of data obtained by measuring the phosphorus content at a plurality of points in the end portion of the negative electrode active material layer 34, for example, at five or three arbitrary points in each end portion.

The five arbitrary points in the central portion are, for example, a total of five points including a central point in the central portion and four points at four ends of two straight lines orthogonal to each other at the central point.

The three arbitrary points in the central portion are, for example, a total of three points including a central point in the central portion and two points at two ends of one straight line passing through the central point.

The five arbitrary points in the end portion are, for example, a total of five points including a central point in the end portion and four points at four ends of two straight lines orthogonal to each other at the central point.

The three arbitrary points in the end portion are, for example, a total of three points including a central point in the end portion and two points on two ends of one straight line passing through the central point.

It is sufficient for the negative electrode layer according to the embodiment to contain either phosphorus or fluorine.

The phosphorus content P1 in the central portion and the average phosphorus content P2 in the end portion can satisfy the relationship of $1<P1/P2\leq1.30$. P1/P2 may be 1.20 or less and may be 1.10 or less.

The fluorine content F1 in the central portion and the average fluorine content F2 in the end portion can satisfy the relationship of $1\leq F1/F2\leq1.22$. F1/F2 may be 1.10 or more and 1.15 or less, and may be 1.10 or more and 1.12 or less.

The distribution of the phosphorus content can be adjusted by using the content of the phosphorus compound added to the negative electrode active material layer 34. In addition, the distribution of the phosphorus content can also be adjusted by making a change in state of precipitation formed by decomposition of the electrolyte by carrying out aging treatment. The difference in the precipitation state is due to a distribution of the electrolyte retention in the negative electrode active material layer 34, and the distribution of the the electrolyte retention is obtained by distributing the density of the negative electrode active material layer 34.

The distribution of the fluorine content can be adjusted by using the content of the fluorine compound added to the negative electrode active material layer 34. In addition, the distribution of the fluorine content can also be adjusted by making a change in state of precipitation formed by the decomposition of the electrolyte by carrying out aging treatment. The difference in the precipitation state is due to a distribution of the electrolyte retention in the negative electrode active material layer 34, and the distribution of the the electrolyte retention is obtained by distributing the density of the negative electrode active material layer 34.

By adjusting the ratio of the phosphorus content in the central portion to the average phosphorus content in the end portion of the negative electrode active material layer 34 within a certain range greater than 1, the electrical resistance in the central portion can be increased compared to the end portion. The difference in electrical resistance between the central portion and the end portion forms an appropriate potential gradient between the central portion, which has high resistance, and the end portion, which has low resistance, during charge and discharge when a voltage is applied between the positive and negative electrodes. As a result, the intercalation and de-intercalation of lithium ions and the electron transfer increase in the end portion of the negative electrode active material layer 34 compared to the center portion, and are stabilized. Thus, by controlling the distribution of the phosphorus content in the negative electrode active material layer 34 in advance, intensive formation of unintended precipitates that cause local high resistance is prevented, and cycle characteristics of the lithium ion secondary battery 100 are improved.

By adjusting the ratio of the fluorine content in the central portion to the average fluorine content in the end portion of the negative electrode active material layer 34 within a certain range larger than 1, the electric resistance in the central portion can be increased compared to the end portion. The difference in electrical resistance between the central portion and the end portion forms an appropriate potential gradient between the central portion, which has high resistance, and the end portion, which has low resistance, during charge and discharge when a voltage is applied between the positive and negative electrodes. As a result, the intercalation and de-intercalation of lithium ions and the electron transfer increase in the end portion of the negative electrode active material layer 34 compared to the center portion, and are stabilized. Thus, by controlling the distribution of the fluorine content in the negative electrode active material layer 34 in advance, intensive formation of unintended precipitates that cause local high resistance is prevented, and cycle characteristics of the lithium ion secondary battery 100 are improved.

The negative electrode active material layer 34 may have a phosphorus-containing layer (not shown). The average thickness T1 [μm] of the phosphorus-containing layer in the center portion and the average thickness T2 [μm] of the phosphorus-containing layer in the end portion satisfy both of the relationship of $1<T1/T2\leq1.80$ and the relationship of $T1\leq10$. T1/T2 may be 1.20 or more, may be 1.40 or more, and may be 1.50 or more. T1/T2 may be 1.70 or less and may be 1.60 or less. T1 may be 8 μm or less, may be 6 μm or less, and may be 5 μm or less. The average thickness T1 [μm] of the phosphorus-containing layer in the central portion can be determined by cross-sectional observation with a scanning electron microscope in the central portion, and the average thickness T2 [μm] of the phosphorus-containing layer in the end portion can be determined by cross-sectional observation with a scanning electron microscope in the end portion.

By setting the ratio of the average thickness T1 [μm] of the phosphorus-containing layer in the central portion to the average thickness T2 [μm] of the phosphorus-containing layer in the end portion within a predetermined range, the formation of wrinkles of the negative electrode during battery assembly and during charge and discharge can be suppressed. Moreover, internal resistance can be decreased by adjusting the average thickness T1 [μm] of the phosphorus-containing layer in a center portion below into a predetermined value.

In another embodiment, the phosphorus content P1 in the central portion of the negative electrode active material layer 34 and the phosphorus content P3 at an arbitrary point in the end portion can satisfy the relationship of $1<P1/P3\leq1.30$. P1/P3 may be 1.20 or less and may be 1.10 or less.

By adjusting the ratio of the phosphorus content in the central portion to the phosphorus content at an arbitrary point in the end portion of the negative electrode active material layer 34 within a certain range larger than 1, the electrical resistance in the central portion can increase compared to an arbitrary point at the end portion. The electrical resistance difference between the central portion and an arbitrary point in the end portion forms an appropriate potential gradient between the central portion that has high resistance and the end point that has low resistance during charge and discharge when a voltage is applied between the positive and negative electrodes. Thereby, the intercalation and de-intercalation of lithium ions and the electron transfer increase at an arbitrary point in the end portion of the negative electrode active material layer 34 compared to the center portion, and are stabilized. Thus, by controlling the distribution of the phosphorus content in the negative electrode active material layer 34 in advance, intensive formation of unintended precipitates that cause local high resistance is prevented, and cycle characteristics of the lithium ion secondary battery 100 are improved.

The negative electrode active material layer 34 may have a phosphorus-containing layer (not shown). The average thickness T1 [μm] of the phosphorus-containing layer in the central portion and the thickness T3 [μm] of the phosphorus-containing layer at an arbitrary point in the end portion can satisfy both the relationship of $1<T1/T3\leq1.80$ and the relationship of $T1\leq10$. T1/T3 may be 1.20 or more, may be 1.40 or more, and may be 1.50 or more. T1/T3 may be 1.70 or less and may be 1.60 or less. T1 may be 8 μm or less, may be 6 μm or less, and may be 5 μm or less. The average thickness T1 [μm] of the phosphorus-containing layer in the central portion can be determined by cross-sectional observation with a scanning electron microscope in the central portion, and the thickness T3 [μm] of the phosphorus-containing layer at an arbitrary point in the central portion can be determined by cross-sectional observation with a scanning electron microscope at arbitrary point in the end portion.

By setting the ratio of the average thickness T1 [μm] of the phosphorus-containing layer in the central portion to the thickness T3 [μm] of the phosphorus-containing layer at an arbitrary point in the end portion within a predetermined range, the formation of wrinkles on the negative electrode at the time of battery assembly and charge and discharge can be suppressed. Moreover, internal resistance can be decreased by adjusting the average thickness T1 [μm] of the phosphorus containing layer in a center portion below predetermined value.

The negative electrode active material layer 34 may have a fluorine-containing layer (not shown). The average thickness T1 [μm] of the fluorine-containing layer in the center portion and the average thickness T2 [μm] of the fluorine-containing layer in the end portion satisfy both of the relationship of $1<T1/T2\leq1.80$ and the relationship of $T1\leq10$. T1/T2 may be 1.20 or more, may be 1.40 or more, and may be 1.50 or more. T1/T2 may be 1.70 or less and may be 1.60 or less. T1 may be 8 μm or less, may be 6 μm or less, and may be 5 μm or less. The average thickness T1 [μm] of the fluorine-containing layer in the central portion can be determined by cross-sectional observation with a scanning electron microscope in the central portion, and the average thickness T2 [μm] of the fluorine-containing layer in the end portion can be determined by cross-sectional observation with a scanning electron microscope in the end portion.

By setting the ratio of the average thickness T1 [μm] of the fluorine-containing layer in the central portion to the average thickness T2 [μm] of the fluorine-containing layer in the end portion within a predetermined range, the formation of wrinkles of the negative electrode during battery assembly and during charge and discharge can be suppressed. Moreover, internal resistance can be decreased by adjusting the average thickness T1 [μm] of the fluorine-containing layer in a center portion below a predetermined value.

In another embodiment, the fluorine content F1 at the center of the negative electrode active material layer 34 and the fluorine content F3 at arbitrary point in the end portion can satisfy the relationship of $1<F1/F3\leq1.22$. F1/F3 may be 1.10 or more and 1.15 or less, and may be 1.10 or more and 1.12 or less.

By adjusting the ratio of the fluorine content in the central portion to the fluorine content at an arbitrary point in the end portion of the negative electrode active material layer 34 within a certain range larger than 1, the electrical resistance in the central portion can increase compared to an arbitrary point at the end portion. The electrical resistance difference between the central portion and an arbitrary point in the end portion forms an appropriate potential gradient between the central portion that has high resistance and the end point that has low resistance during charge and discharge when a voltage is applied between the positive and negative electrodes. Thereby, the intercalation and de-intercalation of lithium ions and the electron transfer increase at an arbitrary point in the end portion of the negative electrode active material layer 34 compared to the center portion, and are stabilized. Thus, by controlling the distribution of the fluorine content in the negative electrode active material layer 34 in advance, intensive formation of unintended precipitates that cause local high resistance is prevented, and cycle characteristics of the lithium ion secondary battery 100 are improved.

The negative electrode active material layer 34 may have a fluorine-containing layer (not shown). The average thickness T1 [μm] of the fluorine-containing layer in the central portion and the thickness T3 [μm] of the fluorine-containing layer at an arbitrary point in the end portion can satisfy both the relationship of $1<T1/T3\leq1.80$ and the relationship of $T1\leq10$. T1/T3 may be 1.20 or more, may be 1.40 or more, and may be 1.50 or more. T1/T3 may be 1.70 or less and may be 1.60 or less. T1 may be 8 μm or less, may be 6 μm or less, and may be 5 μm or less. The average thickness T1 [μm] of the fluorine-containing layer in the central portion can be determined by cross-sectional observation with a scanning electron microscope in the central portion, and the thickness T3 [μm] of the fluorine-containing layer at an arbitrary point in the central portion can be determined by cross-sectional observation with a scanning electron microscope at arbitrary point in the end portion.

By setting the ratio of the average thickness T1 [μm] of the fluorine-containing layer in the central portion to the thickness T3 [μm] of the fluorine-containing layer at an arbitrary point in the end portion within a predetermined range, the formation of wrinkles on the negative electrode at the time of battery assembly and charge and discharge can be suppressed. Moreover, internal resistance can be decreased by adjusting the average thickness T1 [μm] of the fluorine containing layer in a center portion below a predetermined value.

The negative electrode layer according to the embodiment can contain both phosphorus and fluorine.

The phosphorus content in the central portion of the negative electrode layer is different from the average phosphorus content in the end portion outward from the central portion to the side, and the fluorine content in the central portion of the negative electrode layer is different from the average phosphorus content in the end portion outward from the central portion to the side.

Further, the phosphorus content P1 in the central portion and the average phosphorus content P2 in the end portion may satisfy the relationship of $1<P1/P2\leq1.30$, and the fluorine content F1 in the central portion and the average fluorine content F2 in the end portion may satisfy the relationship of $1<F1/F2\leq1.22$.

By adjusting the ratio of the phosphorus content in the central portion to the average phosphorus content in the end portion of the negative electrode active material layer 34, and the ratio of the fluorine content in the central portion to the average phosphorus content in the end portion of the negative electrode active material layer 34 within a certain range greater than 1, the electrical resistance in the central portion can be increased compared to the end portion.

The difference in electrical resistance between the central portion and the end portion forms an appropriate potential gradient between the central portion, which has high resistance, and the end portion, which has low resistance, during charge and discharge when a voltage is applied between the positive and negative electrodes. As a result, the intercalation and de-intercalation of lithium ions and the electron transfer increase in the end portion of the negative electrode active material layer 34 compared to the center portion, and are stabilized. Thus, by controlling the distribution of the phosphorus content and fluorine content in the negative electrode active material layer 34 in advance, intensive formation of unintended precipitates that cause local high resistance is prevented, and cycle characteristics of the lithium ion secondary battery 100 are improved.

P1/P2 may be 1.20 or less and may be 1.10 or less.

F1/F2 may be 1.10 or more and 1.15 or less, and may be 1.10 or more and 1.12 or less.

The total amount of phosphorus and fluorine in the central portion of the negative electrode layer may be different from the total amount of average phosphorus and average fluorine in the end portion outward from the central portion to the side.

Further, the sum of the phosphorus content P1 and the fluorine content F1 in the central portion and the sum of the average phosphorus content P2 and the average fluorine content F2 in the central portion may satisfy a relationship of $1<(P1+F1)/(P2+F2)\leq1.24$.

The total amount of phosphorus and fluorine in the central portion of the negative electrode layer is different from the total amount of the average phosphorus content and the average fluorine content in the end portion outward from the central portion to the side, so that the potential gradient between the central portion, which has high resistance, and the end portion, which has low resistance, is in a suitable state, and lithium ion intercalation and de-intercalation and electron transfer in the end portion of the negative electrode active material layer 34 are more stable.

In addition, when the sum of the phosphorus content P1 and the fluorine content F1 in the central portion and the sum of the average phosphorus content P2 and the average fluorine content F2 in the central portion satisfy the above relationship, cycle characteristics of the lithium ion secondary battery 100 are improved.

The reason for this is not clear, but it is presumably that by controlling the sum of the phosphorus content P1 and fluorine content F1 in the central portion and the sum of the average phosphorus content P2 and average fluorine content F2 in the central portion to a specific range, the formation of a potential gradient between the central portion and the end portion is stabilized, and the intensive formation of unintended precipitates that cause local high resistance is further prevented.

(P1+F1)/(P2+F2) is more preferably 1.09 or more and 1.23 or less, and further preferably 1.05 or more and 1.20 or less.

The negative electrode active material layer 34 can contain a small amount of water. Water can react with the electrolyte contained in the non-aqueous electrolyte during charge and discharge to form a high-resistance precipitate.

In the present application, the distribution of precipitates formed in the negative electrode active material layer 34 during charge and discharge is controlled by adjusting the water content distribution in the negative electrode active material layer 34 within a certain range. Thereby, the cycle characteristics of the lithium ion secondary battery 100 including the negative electrode active material layer 34 are improved.

In one embodiment, the water content in the central portion of the negative electrode active material layer 34 is different from the average water content in the end portion outward from the central portion to the side. The water content at the center is an average value of five data obtained by measuring the water content at five arbitrary points in the center of the negative electrode active material layer 34. The average water content in the end portion is an average value of a plurality of data obtained by measuring the water contents at a plurality of different points in the end portion in the negative electrode active material layer 34, for example, five arbitrary points at each end portion.

The water content W1 [ppm] per unit mass in the central portion and the average water content W2 [ppm] per unit mass in the central portion can satisfy the relationship of $1<W1/W2\leq1.5$. W1/W2 may be 1.4 or less, and may be 1.3 or less.

By adjusting the ratio of the water content per unit mass in the central portion to the average water content per unit mass in the end portion of the negative electrode active material layer 34 within a certain range larger than 1, the amount of precipitates in the central portion can be increased compared to the end portion. Such precipitates can form a high-resistance film, during charge and discharge in which a voltage is applied between the positive electrode and the negative electrode, an appropriate potential gradient is generated between the central portion with more of the high-resistance film and the end portion with less of the high-resistance film. As a result, the intercalation and de-intercalation of lithium ions and the electron transfer increase in the end portion of the negative electrode active material layer 34 compared to the center portion, and are stabilized. In this way, by controlling the distribution of precipitates in advance, intensive formation of unintended precipitates is prevented, and the cycle characteristics of the lithium ion secondary battery 100 are improved.

In another embodiment, the water content W1 [ppm] per unit mass in the central portion of the negative electrode active material layer 34 and the water content W3 [ppm] per unit mass at an arbitrary point in the end portion may satisfy the relationship of $1<W1/W3\leq1.5$. W1/W3 may be 1.4 or less, and may be 1.3 or less.

By adjusting the ratio of the water content per unit mass in the central portion to the water content per unit mass at an arbitrary point in the end of the negative electrode active material layer 34 within a certain range greater than 1, the amount of precipitates in the central portion can be increased compared to the end portion. Such precipitates can form a high-resistance film, during charge and discharge in which a voltage is applied between the positive electrode and the negative electrode, an appropriate potential gradient is generated between the central portion with more of the high-resistance film and the end portion with less of the high-resistance film. As a result, the intercalation and de-intercalation of lithium ions and the electron transfer increase in the end portion of the negative electrode active material layer 34 compared the center portion, and are stabilized. In this way, by controlling the distribution of precipitates in advance, intensive formation of unintended precipitates is prevented, and the cycle characteristics of the lithium ion secondary battery 100 are improved.

In the specific embodiment shown in FIG. 2, the phosphorus content in the central portion 341 of the negative electrode active material layer 34 may be different from the average phosphorus content in the first end portion 342 and the second end portion 343.

In the specific embodiment shown in FIG. 2, the fluorine content in the central portion 341 of the negative electrode active material layer 34 may be different from the average fluorine content in the first end portion 342 and the second end portion 343.

In the specific embodiment shown in FIG. 2, the water content in the central portion 341 of the negative electrode active material layer 34 may be different from the average water content in the first end portion 342 and the second end portion 343.

The phosphorus content P1 in the central portion 341 and the average phosphorus content P2 in the first end portion 342 and the second end portion 343 can satisfy the relationship of $1<P1/P2\leq1.30$. P1/P2 may be 1.20 or less and may be 1.10 or less.

In a specific embodiment, the negative electrode active material layer 34 may have a phosphorus-containing layer (not shown). The average thickness T1 [μm] of the phosphorus-containing layer in the central portion 341 and the average thickness T2 [μm] of the phosphorus-containing layer in the first end portion 342 and the second end portion 343 satisfy both of the relationship of $1<T1/T2\leq1.80$ and the relationship of $T1\leq10$. T1/T2 may be 1.20 or more, may be 1.40 or more, and may be 1.50 or more. T1/T2 may be 1.70 or less and may be 1.60 or less. T1 may be 8 μm or less, may be 6 μm or less, and may be 5 μm or less.

In another specific embodiment shown in FIG. 2, the phosphorus content P1 in the central portion 341 and the phosphorus content P3 at an arbitrary point of the first end portion 342 and the second end portion 343 can satisfy the relationship of $1<P1/P3\leq1.30$. P1/P3 may be 1.20 or less and may be 1.10 or less.

In another specific embodiment, the negative electrode active material layer 34 may have a phosphorus-containing layer (not shown). The average thickness T1 [μm] of the phosphorus-containing layer in the central portion 341 and the thickness T3 [μm] of the phosphorus-containing layer at arbitrary point of the first end portion 342 and the second end portion 343 can satisfy both the relationship of $1<T1/T3\leq1.80$ and the relationship of $T1\leq10$. T1/T3 may be 1.20 or more, may be 1.40 or more, and may be 1.50 or more. T1/T3 may be 1.70 or less and may be 1.60 or less. T1 may be 8 µm or less, may be 6 µm or less, and may be 5 µm or less.

The phosphorus-containing layer may be formed at the interface between the negative electrode active material layer 34 and the separator 10. By forming the phosphorus-containing layer so as to face the separator 10, it is possible to effectively suppress the formation of unintended precipitates that cause local high resistance.

In contrast to the present application, when the distribution of the phosphorus content in the negative electrode active material layer 34 and the thickness of the phosphorus-containing layer are not adjusted, precipitates that cause local high resistance may be randomly formed and have an unpredictable distribution on the negative electrode active material layer 34 during charge and discharge. In this case, precipitates may be intensively formed at unintended locations, which may lead to unstable cycle characteristics of the lithium ion secondary battery 100.

In addition, if the non-uniform of the phosphorus content distribution in the negative electrode active material layer 34 is excessively large, the potential gradient formed between the first end portion 342 and/or the second end portion 343 during charge and discharge becomes too large, charge and discharge may become instable, and cycle characteristics may deteriorate.

When the ratio between the average thickness of the phosphorus-containing layer in the central portion 341 and the average thickness of the phosphorus-containing layer in the first end portion 342 and/or the second end portion 343 is outside the scope of the present application, when the battery is assembled, or charged and discharged, negative electrode wrinkles are likely to be formed, and adverse effects such as peeling of the negative electrode active material layer 34 from the negative electrode current collector 32 can be brought about. Further, if the average thickness of the phosphorus-containing layer in the central portion 341 is outside the scope of the present application, there may be a problem in that the internal resistance increases.

The phosphorus content in the negative electrode active material layer 34 can be measured using, for example, SEM-EDS (scanning electron microscope-energy dispersive X-ray spectroscopy) analysis. The phosphorus content in the negative electrode active material layer 34 can be measured quantitatively by using SEM-EDS analysis.

The fluorine content F1 in the central portion 341 and the average fluorine content F2 in the first end portion 342 and the second end portion 343 can satisfy the relationship of $1<F1/F2\leq1.22$. F1/F2 may be 1.10 or more and 1.15 or less, and may be 1.10 or more and 1.12 or less.

In a specific embodiment, the negative electrode active material layer 34 may have a fluorine-containing layer (not shown). The average thickness T1 [µm] of the fluorine-containing layer in the central portion 341 and the average thickness T2 [µm] of the fluorine-containing layer in the first end portion 342 and the second end portion 343 satisfy both of the relationship of $1<T1/T2\leq1.80$ and the relationship of $T1\leq10$. T1/T2 may be 1.20 or more, may be 1.40 or more, and may be 1.50 or more. T1/T2 may be 1.70 or less and may be 1.60 or less. T1 may be 8 µm or less, may be 6 µm or less, and may be 5 µm or less.

In another specific embodiment shown in FIG. 2, the fluorine content P1 in the central portion 341 and the fluorine content P3 at arbitrary point of the first end portion 342 and the second end portion 343 can satisfy the relationship of $1<P1/P3\leq1.30$. P1/P3 may be 1.20 or less and may be 1.10 or less.

In another specific embodiment, the negative electrode active material layer 34 may have a fluorine-containing layer (not shown). The average thickness T1 [µm] of the fluorine-containing layer in the central portion 341 and the thickness T3 [µm] of the fluorine-containing layer at an arbitrary point of the first end portion 342 and the second end portion 343 can satisfy both the relationship of $1<T1/T3\leq1.80$ and the relationship of $T1\leq10$. T1/T3 may be 1.20 or more, may be 1.40 or more, and may be 1.50 or more. T1/T3 may be 1.70 or less and may be 1.60 or less. T1 may be 8 µm or less, may be 6 or less, and may be 5 µm or less.

The fluorine-containing layer may be formed at the interface between the negative electrode active material layer 34 and the separator 10. By forming the fluorine-containing layer so as to face the separator 10, it is possible to effectively suppress the formation of unintended precipitates that cause local high resistance.

In contrast to the present application, when the distribution of the fluorine content in the negative electrode active material layer 34 and the thickness of the fluorine-containing layer are not adjusted, precipitates that cause local high resistance may be randomly formed and have an unpredictable distribution on the negative electrode active material layer 34 during charge and discharge. In this case, precipitates may be intensively formed at unintended locations, which may lead to unstable cycle characteristics of the lithium ion secondary battery 100.

In addition, if the non-uniform of the fluorine content distribution in the negative electrode active material layer 34 is excessively large, the potential gradient formed between the first end portion 342 and/or the second end portion 343 during charge and discharge becomes too large, charge and discharge may become instable, and cycle characteristics may deteriorate.

In the case that the ratio between the average thickness of the fluorine-containing layer in the central portion 341 and the average thickness of the fluorine-containing layer in the first end portion 342 and/or the second end portion 343 is outside the scope of the present application, when the battery is assembled, or charged and discharged, negative electrode wrinkles are likely to be formed, and adverse effects such as peeling of the negative electrode active material layer 34 from the negative electrode current collector 32 can be brought about. Further, if the average thickness of the fluorine-containing layer in the central portion 341 is outside the scope of the present application, there may be a problem in that the internal resistance increases.

The fluorine content in the negative electrode active material layer 34 can be measured using, for example, SEM-EDS (scanning electron microscope-energy dispersive X-ray spectroscopy) analysis. The fluorine content in the negative electrode active material layer 34 can be measured quantitatively by using SEM-EDS analysis.

The water content W1 [ppm] per unit mass in the central portion 341 and the average water content W2 [ppm] per unit mass in the first end portion 342 and the second end portion 343 can satisfy the relationship of $1<W1/W2\leq1.5$. W1/W2 may be 1.4 or less, and may be 1.3 or less.

In another specific embodiment shown in FIG. 2, the water content W1 [ppm] per unit mass in the central portion 341 and the water content W3 [ppm] per unit mass at arbitrary point of the first end portion 342 and the second end portion 343 can satisfy the relationship of $1<W1/W3\leq1.5$. W1/W3 may be 1.4 or less, and may be 1.3 or less.

In contrast to the present application, when the distribution of the water content in the negative electrode active material layer 34 is not adjusted, precipitates are randomly formed on the negative electrode active material layer 34 during charge and discharge, resulting in an unpredictable distribution. In this case, precipitates may be intensively formed at unintended locations, which may lead to unstable cycle characteristics of the lithium ion secondary battery 100.

Further, if the distribution of water content in the negative electrode active material layer 34 is too large, the distribution of precipitates formed on the negative electrode active material layer 34 during charge and discharge becomes too large. Thereby, wrinkles can be formed in the negative electrode 30, and adverse effects such as peeling of the negative electrode active material layer 34 from the negative electrode current collector 32 can be brought about.

It is preferable to consider not only the water content ratio but also its absolute amount. The water content in the central portion 341, the first end portion 342, and the second end portion 343 of the negative electrode active material layer 34 is 300 [ppm] or less, 200 [ppm] or less, 150 [ppm] or less, or 100 [ppm] or less. In addition, the water content in the central portion 341, the first end portion 342, and the second end portion 343 of the negative electrode active material layer 34 may be 10 [ppm] or more, 20 [ppm] or more, or 50 [ppm] or more. If the water content in the negative electrode active material layer 34 is less than 10 [ppm], the amount of precipitates formed may be reduced, and the formation of unintended precipitates may not be suppressed. On the contrary, if the water content in the negative electrode active material layer 34 is more than 300 [ppm], the amount of formed precipitates increases, which leads to formation of wrinkles in the electrode and can inhibit lithium ion conduction.

<Water Content>

The water content in the negative electrode active material layer 34 can be measured using, for example, the Karl Fischer method (vaporization method). In the Karl Fischer method, for example, the temperature is raised from 120° C. to 300° C., and water in the negative electrode active material layer 34 is released. By measuring the amount of water released, the water content in the negative electrode active material layer 34 is measured.

The water measured by the Karl Fischer method may include free water that does not interact with other constituent molecules and bound water that is strongly attracted to other constituent molecules and cannot be easily removed. The bound water can include water of crystallization, which is water contained in the crystal. The water of crystallization may includes coordination water coordinated to metal ions to form complex ions, anion water that is hydrogen-bonded with anions such as $SO_4^{2-}$, lattice water that fills the space in the crystal lattice, structural water, oxonium ions, zeolite water, ice and the like.

Whether or not the water is bound water is confirmed by measuring the mass spectrum of the laminated body 40 containing water. The laminated body 40 is heated in a vacuum, and the detected amount of a substance having an m/z value of 18 (ie, $H_2O$) is measured while gradually raising the temperature. Since the bound water is bound to the constituent molecules of the laminated body 40, the bound water does not desorb at a temperature of 100° C. or lower. On the other hand, free water (also referred to as adsorbed water) simply adsorbed on the laminated body 40 is desorbed at a temperature of 100° C. or lower. Therefore, the presence or absence of bound water can be confirmed by confirming the presence or absence of water desorbed at a temperature of 100° C. or higher.

In the present application, water that is not released from the negative electrode active material layer 34 at a temperature higher than 300° C. may not be considered. Such stable water can be considered to not be involved in the formation of precipitates during charge and discharge.

(Negative Electrode Active Material)

As the negative electrode active material used for the negative electrode active material layer 34, a known negative electrode active material can be used. Examples of the negative electrode active material include carbon materials that can occlude and release lithium ions such as graphite (natural graphite, artificial graphite), carbon nanotubes, non-graphitizable carbon, graphitizable carbon, low-temperature calcined carbon and the like; a metal that can be combined with lithium such as aluminum, phosphorus, tin and the like; an amorphous compound mainly composed of an oxide such as $SiOx$ (0<x<2), tin dioxide and the like; and particles containing lithium titanate ($Li_4Ti_5O_{12}$), and the like.

(Negative Electrode Current Collector)

The negative electrode current collector 32 may be a conductive plate material, and for example, a metal thin plate of copper or nickel foil can be used. The negative electrode current collector 32 is preferably not alloyed with lithium, and copper is particularly preferable. The thickness of the negative electrode current collector 32 is preferably 6 to 30

(Negative Electrode Conductive Material)

Examples of the conductive material include carbon material such as carbon powder of carbon black, carbon nanotube; fine metal powder such as copper, nickel, stainless steel, iron and the like; a mixture of carbon material and fine metal powder; and conductive oxide such as ITO. Among these, carbon powders of acetylene black and ethylene black are particularly preferable. In the case where sufficient conductivity can be ensured with only the negative electrode active material, the lithium ion secondary battery 100 may not include the conductive material.

(Negative Electrode Binder)

The binder bonds the active materials to each other and bonds the active material to the negative electrode current collector 32. The binder is not particularly limited as long as it can be bonded as described above. For example, polyvinylidene fluoride (PVDF), polytetrafluoroethylene (PTFE), tetrafluoroethylene-hexafluoropropylene copolymer (FEP), tetrafluoroethylene-perfluoroalkyl vinyl ether copolymer (PFA), ethylene-tetrafluoroethylene copolymer (ETFE), polychlorotrifluoroethylene (PCTFE), ethylene-chlorotrifluoroethylene copolymer (ECTFE), polyvinyl fluoride (PVF), and the like can be used.

In addition to the above, as the binder, for example, vinylidene fluoride-based fluororubber, such as vinylidene fluoride-hexafluoropropylene fluororubber (VDF-HFP fluororubber), vinylidene fluoride-hexafluoropropylene-tetrafluoroethylene fluororubber (VDF-HFP-) TFE fluororubber), vinylidene fluoride-pentafluoropropylene fluororubber (VDF-PFP fluororubber), vinylidene fluoride-pentafluoropropylene-tetrafluoroethylene fluororubber (VDF-PFP-TFE fluororubber), vinylidene fluoride-perfluoromethyl vinyl ether-tetrafluoroethylene fluororubber (VDF-PFMVE-TFE fluororubber), vinylidene fluoride-chlorotrifluoroethylene (VDF-CTFE fluororubber) or the like may be used.

Further, an electron-conductive polymer or an ion-conductive polymer may be used as the binder. Examples of the electron conductive polymer include polyacetylene. In this case, since the binder also functions as a conductive material, it is not necessary to add a conductive material. As the ion-conductive conductive polymer, for example, a polymer having ion conductivity such as lithium ion conductivity can be used. For example, a composition obtained by combinating a monomer of polymer (polyether polymer such as polyethylene oxide and polypropylene oxide, polyphosphazene, and the like) and a lithium salt such as $LiClO_4$, $LiBF_4$, $LiPF_6$, or an alkali metal salt mainly composed of lithium, and the like, may be used. Examples of the polymerization initiator used for the combination include a photopolymerization initiator or a thermal polymerization initiator that is compatible with the above-described monomer.

In addition, as the binder, for example, cellulose such as carboxymethyl cellulose (CMC), styrene/butadiene rubber (SBR), ethylene/propylene rubber, polyimide resin, polyamideimide resin, acrylic resin, or the like may be used.

The kind and amount of the binders can be changed in order to adjust the water adsorption capacity in the negative electrode active material layer 34.

(Additive)

The additive can be a phosphorus compound. The phosphorus compound can be an aromatic compound or an aliphatic compound. In particular, the phosphorus compound can be a phosphate ester compound. Phosphate ester compounds may be triphenyl phosphate (TPP), tricresyl phosphate (TCP), trixylenyl phosphate (TXP), cresyl diphenyl phosphate (CDP), 2-ethylhexyl diphenyl phosphate (EHDP), t-butylphenyl diphenyl phosphate (t-BDP), bis-(t-butylphenyl) phenyl phosphate (BBDP), tris-(t-butylphenyl) phosphate (TBDP), isopropylphenyl diphenyl phosphate (IPP), bis-(isopropylphenyl) diphenyl phosphate (BIPP), tris-(isopropylphenyl) phosphate (TIPP), tris(chloroethyl) phosphate, tris(β-chloropropyl) phosphate, trakis(2chloroethyl) dichloroisopentyl diphosphate, polyoxyalkylene bis (dichloroalkyl) phosphate, resorcinol bis-diphenyl phosphate, resorcinol bis-dixylenyl phosphate, bisphenol A bis-diphenyl phosphate, triphenyl phosphite, trisnonylphenyl phosphite, tricresyl phosphite and tris (2-ethylhexyl) phosphite. Preferably, the phosphorus ester compound may be one or more selected from the group consisting of triphenyl phosphite, trisnonylphenyl phosphite, tricresyl phosphite and tris (2-ethylhexyl) phosphite. The phosphorus compound may be included as crystals or as an amorphous form.

The additive can be a fluorine compound. The fluorine compound can be a fluorine-based surfactant or a fluorine-based flame retardant. Fluorine surfactants include potassium heptadecafluoro-1-octane sulfonate, heptadecafluorooctane sulfonate, hepadecafluorononanoic acid, lithium heptadecafluoro-1-octane sulfonate, heneicosafluoroundecanoic acid, 4, 4, 5, 5, 6, 6, 7, 7, 8, 8, 9, 9, 10, 10, 11, 11, 11-heptadecafluoroundecanoic acid, nonadecafluorodecanoic acid, nonafluoro-1-butane sulfonic acid, lithium nonafluoro-1-butanesulfonate, potassium nonafluoro-1-butanesulfonate, pentadecafluorooctanoic acid, ammonium pentadecafluorooctanoate, tridecafluoroheptanoic acid, tricosafluorododecanoic acid, and aundecafluorohexane acid. Fluorine flame retardants may be polytetrafluoroethylene, polychlorotrifluoroethylene, polyvinylidene fluoride, polyvinyl fluoride, perfluoroalkoxy fluororesin, tetrafluoroethylene/hexafluoropropylene copolymer, ethylene/tetrafluoroethylene copolymer, and an ethylene/chlorotrifluoroethylene copolymer. Preferably, the fluorine-based surfactant may be one or more members selected from the group consisting of SURFLON (registered trademark) (manufactured by AGC Semi Chemical Co., Ltd) and FC-4430 (manufactured by 3M). The fluorine-based flame retardant may be one or more members selected from the group consisting of POLYFLON PTFE LUBRON (Daikin) and POLYFLON MPA (Daikin). The fluorine compound may be included as crystals or as an amorphous form.

The contents of the negative electrode active material, the conductive material, and the binder in the negative electrode active material layer 34 are not particularly limited. The constituent ratio of the negative electrode active material in the negative electrode active material layer 34 is preferably 80% by mass or more and 99% by mass or less, and more preferably 90% by mass or more and 98% by mass or less. The constituent ratio of the conductive material in the negative electrode active material layer 34 is preferably 0% by mass or more and 20% by mass or less, and the constituent ratio of the binder in the negative electrode active material layer 34 is preferably 1% by mass or more and 10% by mass or less.

By setting the contents of the negative electrode active material and the binder in the above range, it is possible to prevent that the strong negative electrode active material layer 34 cannot be formed due to the too small amount of the binder. Moreover, it is possible to suppress the tendency that it is difficult to obtain a sufficient volume energy density due to increasing the amount of the binder that does not contribute to the electric capacity.

"Positive Electrode"

The positive electrode 20 includes a positive electrode current collector 22 and a positive electrode active material layer 24 provided on the positive electrode current collector 22.

(Positive Electrode Current Collector)

The positive electrode current collector 22 may be a conductive plate material, for example, a thin metal plate of aluminum, copper, or nickel foil.

(Positive Electrode Active Material Layer)

The positive electrode active material used for the positive electrode active material layer 24 may use an electrode active material capable of reversibly proceeding occlusion and release of lithium ion, intercalation and de-intercalation of lithium ions, or doping and dedoping lithium ion and counter ions thereof (for example, $PF^{6-}$) can be used.

For example, lithium cobaltate ($LiCoO_2$), lithium nickelate ($LiNiO_2$), lithium manganate ($LiMnO_2$), lithium manganese spinel ($LiMn_2O_4$), and a composition metal oxide represented by general formula: $LiNi_xCo_yMn_zM_aO_2$ (x+y+z+a=1, 0≤x<1, 0≤y<1, 0≤z<1, 0≤a<1, M is one or more elements selected from Al, Mg, Nb, Ti, Cu, Zn, and Cr), lithium vanadium compound ($LiV_2O_5$), olivine type $LiMPO_4$ (where M represents VO, or one or more elements selected from Co, Ni, Mn, Fe, Mg, Nb, Ti, Al, and Zr), lithium titanate ($Li_4Ti_5O_{12}$), a composition metal oxide represented by general formula: $LiNi_xCo_yAl_zO_2$ (0.9<x+y+z<1.1); polyacetylene; polyaniline; polypyrrole; polythiophene; polyacene; and the like can be used.

(Positive Electrode Conductive Material)

Examples of the conductive material include carbon material such as carbon powder of carbon black, carbon nanotube; fine metal powder such as copper, nickel, stainless steel, iron and the like; a mixture of carbon material and fine metal powder; and conductive oxide such as ITO. Among these, carbon powders of acetylene black and ethylene black are particularly preferable. In the case where sufficient conductivity can be ensured with only the negative electrode active material, the lithium ion secondary battery 100 may not include the conductive material.

(Positive Electrode Binder)

The binder used for the positive electrode can be the same as that used for the negative electrode 30.

The constituent ratio of the positive electrode active material in the positive electrode active material layer 24 is preferably 80% by mass or more and 90% by mass or less. The constituent ratio of the conductive material in the positive electrode active material layer 24 is preferably 0.5% by mass or more and 10% by mass or less, and the constituent ratio of the binder in the positive electrode active material layer 24 is preferably 0.5% by mass or more and 10% by mass or less.

"Separator"

It is sufficient that the separator 10 has an electrically insulating porous structure. For example, a single layer of a film made of polyethylene, polypropylene, or polyolefin; a stretched film of a laminated body 40; or a mixture of the above resins; or a fiber nonwoven fabric made of at least one constituent material selected from the group consisting of cellulose, polyester, and polypropylene can be used.

"Non-Aqueous Electrolyte"

The non-aqueous electrolyte contains a non-aqueous solvent and a lithium salt. As the non-aqueous solvent, a cyclic carbonate, a chain carbonate, an ionic liquid, or the like can be used.

The non-aqueous electrolyte may contain phosphorus. When the non-aqueous electrolyte contains phosphorus, the internal resistance during charge and discharge is reduced due to the interaction with phosphorus contained in the negative electrode active material layer 34, which can have an advantageous effect in cycle characteristics.

The non-aqueous electrolytic solution may contain fluorine. When the non-aqueous electrolyte contains fluorine, the internal resistance during charge and discharge is reduced due to the interaction with fluorine contained in the negative electrode active material layer 34, which can have an advantageous effect in cycle characteristics.

(Cyclic Carbonate)

As the cyclic carbonate, a cyclic carbonate that can solvate the electrolyte can be used. For example, ethylene carbonate, propylene carbonate, butylene carbonate, and the like can be used.

(Chain Carbonate)

The chain carbonate can reduce the viscosity of cyclic carbonate. Examples thereof include diethyl carbonate, dimethyl carbonate, and ethyl methyl carbonate. In addition, a chain carbonate mixed with methyl acetate, ethyl acetate, methyl propionate, ethyl propionate, γ-butyrolactone, 1,2-dimethoxyethane, 1,2-diethoxyethane, and the like may be used.

The ratio of the cyclic carbonate and the chain carbonate in the non-aqueous solvent is preferably 1:9 to 1:1 by volume.

(Ionic Liquid)

An ionic liquid is a liquid salt obtained by a combination of a cation and an anion even at a temperature below 100° C. Since the ionic liquid is a liquid composed only of ions, the ionic liquid has a strong electrostatic interaction and is characterized by non-volatility and nonflammability. In addition, since an electrolytic solution using an ionic liquid has low reactivity with water, it is difficult to generate hydrogen fluoride (HF) due to the reaction between water and a lithium salt. Therefore, the lithium ion secondary battery 100 that uses an ionic liquid as an electrolytic solution has an excellent characteristics in safety.

There are various types of ionic liquids depending on the combination of cations and anions. Examples thereof include nitrogen-based ionic liquids such as imidazolium salts, pyrrolidinium salts, piperidinium salts, pyridinium salts, and ammonium salts; phosphorus-based ionic liquids such as phosphonium salts; and sulfur-based ionic liquids such as sulfonium salts. Nitrogen-based ionic liquids may include cyclic quaternary ammonium salts and chain quaternary ammonium salts.

As the cation of the ionic liquid, a cation containing nitrogen, phosphorus, sulfur and the like have been reported. The cation of the ionic liquid is preferably at least one selected from the group consisting of a quaternary ammonium cation, a sulfonium cation, and a phosphonium cation. These cations have a wide potential window on the reduction side. Therefore, these cations are hardly reduced and decomposed on the surface of the negative electrode 30.

As the anion of the ionic liquid, $AlCl_4^-$, $NO_2^-$, $NO_3^-$, $I^-$, $BF_4^-$, $PF_6^-$, $AsF_6^-$, $SbF_6^-$, $NbF_6^-$, $TaF_6^-$, $F(HF)_{2.3}^-$, $p\text{-}CH_3PhSO_3^-$, $CH_3CO_2^-$, $CF_3CO_2^-$, $CH_3SO_3^-$, $CF_3SO_3^-$, $(CF_3SO_2)_3C^-$, $C_3F_7CO_2^-$, $C_4F_9SO_3^-$, $(CF_3SO_2)_2N^-$, $(C_2F_5SO_2)_2N^-$, $(CF_3SO_2)(CF_3CO)N^-$, $(CN)_2N^-$, $(SO_2F)_2N^-$, and the like can be used.

(Lithium Salt)

As the lithium salt, salts of inorganic acid anion such as $LiPF_6$, $LiBF_4$, and LiBOB; and salts of organic acid anion such as $LiCF_3SO_3$, $(CF_3SO_2)_2NLi$, and $(FSO_2)_2NLi$ can be used.

The lithium salt may contain phosphorus. When the lithium salt contains phosphorus, the internal resistance during charge and discharge is reduced due to the interaction with phosphorus contained in the negative electrode active material layer 34, which can have an advantageous effect in cycle characteristics.

The lithium salt may contain fluorine. When the lithium salt contains fluorine, the internal resistance during charge and discharge is reduced due to the interaction with fluorine contained in the negative electrode active material layer 34, which can have an advantageous effect in cycle characteristics.

"Case"

The case 50 seals the laminated body 40 and the electrolytic solution therein. The case 50 is not particularly limited as long as it can suppress leakage of the electrolytic solution to the outside and entry of water and the like into the lithium ion secondary battery 100 from the outside.

For example, as the case 50, as shown in FIG. 1, a metal laminate film in which a metal foil 52 is coated with a polymer film 54 from both sides can be used. For example, an aluminum foil can be used as the metal foil 52 and a film such as polypropylene can be used as the polymer film 54. For example, the material of the outer polymer film 54 is preferably a polymer having a high melting point, such as polyethylene terephthalate (PET) or polyamide, and the material of the inner polymer film 54 is preferably polyethylene (PE) or polypropylene (PP) and the like.

"Lead"

The leads 60 and 62 are made of a conductive material such as aluminum. Then, the leads 60 and 62 are respectively welded to the positive electrode current collector 22 and the negative electrode current collector 32 by a known method, and a separator 10 is provided between the positive electrode active material layer 24 of the positive electrode 20 and the negative electrode active material layer 34 of the negative electrode 30. The resulting assembly is inserted into the case 50 together with the electrolyte, and the entrance of the case 50 is sealed.

As shown in FIG. 2, the lead 60 may be disposed on the first side of the negative electrode active material layer 34 provided with the first end portion 342 of the negative electrode current collector 32. The lead 60 may be disposed on the second side of the negative electrode active material layer 34 provided with the second end portion 343 of the negative electrode current collector 32 (not shown). The lead 60 may be disposed on the side of the negative electrode active material layer 34 of the negative electrode current collector 32 where the first end portion 342 or the second end portion 343 is not provided (not shown). In any case, if the phosphorus content or the fluorine content in the central portion 341 and the first end portion 342 and/or the second end portion 343 in the negative electrode active material layer 34 is within the range specified in the present embodiment, an appropriate potential gradient is formed between the central portion 341 and the first end portion 342 and between the central portion 341 and the second end portion 343, and the intercalation and de-intercalation of lithium ions and the electron transfer during charge and discharge are promoted.

Alternatively, in any case, if the water content in the central portion 341 and the first end portion 342 and/or the second end portion 343 in the negative electrode active material layer 34 is within the range specified in the present embodiment, an appropriate potential gradient is formed between the central portion 341 and the first end portion 342 and between the central portion 341 and the second end portion 343, and intercalation and de-intercalation of lithium ions and electron transfer during charge and discharge can be promoted. Thereby, the internal resistance between the negative electrode active material layer 34 and the lead 60 can be lowered.

As described above, in the negative electrode 30 according to the present embodiment, intercalation and de-intercalation of lithium ions and electron transfer during charge and discharge are promoted, so that excessive deposition of precipitates on the surface of the negative electrode 30 can be suppressed during charge and discharge. Therefore, the lithium ion secondary battery including the positive electrode 20, the negative electrode 30 according to the present embodiment, the separator 10 interposed between the positive electrode 20 and the negative electrode 30, and the non-aqueous electrolyte has the advantage of excellent cycle characteristics.

Although the embodiments of the present invention have been described in detail with reference to the drawings, the configurations and combinations of the embodiments in the embodiments are examples, and the addition, omission, substitutions, and other changes of configurations within the scope not departing from the gist of the present invention, are possible.

EXAMPLE

Example 1

The negative electrode of Example 1 was produced by the following the steps A1 to A9.

Step A1

A negative electrode active material, a binder, and a solvent were mixed to prepare negative electrode mixture slurries A and B, respectively. The negative electrode mixture slurry A contains 98% by mass of a negative electrode active material, 1% by mass of a binder and 1% by mass of a solvent, and the negative electrode mixture slurry B contains 97% by mass of the negative electrode active material, 2% by mass of the binder and 1% by mass of the solvent. As the negative electrode active material in the negative electrode mixture slurries A and B, a natural graphite material for a lithium ion secondary battery was used. Further, a mixture of CMC as a thickener and SBR in a mass ratio of 1:1 was used as a binder. Water was used as a solvent. Separately, a 1% by mass solution of triphenyl phosphite as a phosphorus compound was added to the negative electrode mixture slurry B. In the negative electrode mixture slurry B, the phosphorus compound was added so that the mass ratio of the phosphorus compound to other components was 2:98.

The mixing method of these components constituting the slurry A and B is not particularly limited, and the mixing order is not particularly limited.

Step A2

When the distance between the first side and the second side is L, a slurry prepared by mixing 50% by mass of the slurry A produced in the step A1 and 50% by mass of the slurry B produced in the step A1 was applied to an electrolytic copper foil (Furukawa Electric) as a negative electrode current collector 32, so as to form a portion advanced by ($\frac{1}{3}$) L from the first side to the second side and a portion advanced by ($\frac{1}{3}$) L from the second side toward the first side. In addition, a slurry prepared by mixing 45% by mass of the slurry A produced in the step A1 and 55% by mass of the slurry B produced in the step A1 was applied to the negative electrode current collector 32, so as to form a portion advanced by ($\frac{1}{6}$) L from the center between the first side and the second side toward the first side and the second side. Thus, the negative electrode 30 was produced.

As is clear from the definitions of the central portion and the first and second end portions, the portion to which the slurry B was applied may include the central portion 341, and the portion to which the slurry A was applied may include the first end portion 342 and the second end portion 343.

The coating method is not particularly limited, and a method usually employed when producing an electrode can be used. Examples thereof include a slit die coating method and a doctor blade method. The application of the slurry A and B may be performed simultaneously or separately.

Step A3

The negative electrode 30 coated in the step A2 was dried for 15 minutes by a hot air drying method. The temperature of the hot air was 85° C.

Step A4

A positive electrode active material, a binder, and a solvent were mixed to prepare a positive electrode mixture slurry. As the positive electrode active material, $LiNi_{0.83}Co_{0.12}Al_{0.05}O_2$ having an average particle diameter of 10 μm was prepared. After 92 parts by mass of the positive electrode active material, 4 parts by mass of acetylene black, and 4 parts by mass of polyvinylidene fluoride (PVDF) were weighed, and they were dispersed in N-methyl-2-pyrrolidone (NMP). A positive electrode mixture slurry was prepared.

Step A5

The positive electrode mixture slurry prepared in the step A4 was applied onto an aluminum current collector foil for lithium ion batteries (manufactured by UACJ) as the positive electrode current collector 22 to prepare the positive electrode 20.

The coating method is not particularly limited, and a method usually employed when producing an electrode can be used. Examples thereof include a slit die coating method and a doctor blade method.

Step A6

The positive electrode 20 coated in the step A5 was dried by a hot air drying method.

Step A7

The negative electrode 30 produced in the step A3, a 20 μm thick polyethylene microporous film (porosity: 40%) as the separator 10, and the positive electrode 20 produced in the step A6 were alternately laminated to produce a laminated body. The positive electrode 20, the separator 10, and the negative electrode 30 may be brought into close contact with each other by heating and pressing with a press tool from a direction perpendicular to the laminating direction of the laminated body 40.

Step A8

The laminated body produced in the step A7 was sealed in a laminate outer package 50 (nylon/aluminum foil/unstretched polypropylene), in which an electrolyte was injected. The electrolyte was prepared by mixing ethylene carbonate (EC) and diethyl carbonate (DEC) at a volume ratio of 3:7 and dissolving $LiPF_6$ as a lithium salt so as to be 1 mol/L. Thereafter, the laminate outer package 50 was sealed to produce a lithium ion secondary battery.

Instead of injecting the electrolyte into the laminate outer package 50, the laminated body 40 may be impregnated with the electrolyte.

Step A9

The lithium ion secondary battery produced in the step A8 is charged and discharged for single cycle or multi-cycle as an aging treatment, and then the lithium ion secondary battery was disassembled and a negative electrode active material layer 34 was taken out. Each of phosphorus contents in the central portion 341, the first the end portion 342 and the second end portion 343 of the negative electrode active material layer 34 taken out was measured by SEM-EDS analysis (Equipment used: SU8010 (manufactured by Hitachi High-Tech Fielding)). The phosphorus content in the central portion 341 is an average value of three data obtained by measuring the phosphorus content at three arbitrary points in the central portion 341 in the negative electrode active material layer 34. The average phosphorus content in the first end portion 342 and the second end portion 343 was obtained by extracting three arbitrary points from the first end portion 342 and the second end portion 343 in the negative electrode active material layer 34, measuring the phosphorus contents at the three points, and obtaining an average value of three data. In addition, the average thickness T1 of the phosphorus-containing layer in the central portion 341 was an average value obtained by observing cross sections of three arbitrary points of the central portion 341 in the negative electrode active material layer 34 with a scanning electron microscope. The average thickness T2 of the phosphorus-containing layer in the first end portion 342 and the second end portion 343 was obtained by extracting three arbitrary points from the first end portion 342 and the second end portion 343 in the negative electrode active material layer 34, observing cross sections of the three points with a scanning electron microscope, and obtaining average value of the three data. Again, the central portion 341 is included in the portion where the slurry B was applied, and the first end portion 342 and the second end portion 343 are included in the portion where the slurry A was applied. The phosphorus content in the negative electrode active material layer 34 was determined through the charge and discharge of single cycle or multi-cycle. The phosphorus content can be determined according to the phosphorus component contained in the negative electrode mixture slurry used for producing the negative electrode, and the phosphorus components contained in the non-aqueous electrolyte and the lithium salt.

The three arbitrary points of the central portion 341 are three points in total including one point of the central point in the central portion 341 of the negative electrode active material layer 34 taken out by disassembling the lithium ion secondary battery, and two points of two ends of one straight line passing through the central point.

The three arbitrary points extracted from the first end portion 342 and the second end portion 343 in the negative electrode active material layer 34 are total 3 points including one point selected from a first central point in the first end portion 342 and a second central point in the second end portion 343 taken out by disassembling the lithium ion secondary battery, and two points of two ends of one straight line passing through another central point rather than the above-selected central point, wherein the other central point is in an end portion where the central point was not extracted.

The three arbitrary points related to the average thickness T1 of the phosphorus-containing layer in the central portion 341 are three points in total including one point of the central point in the central portion 341 of the negative electrode active material layer 34 taken out by disassembling the lithium ion secondary battery, and two points of two ends of one straight line passing through the central point.

The three arbitrary points related to the average thickness T2 of the phosphorus-containing layer in the first end portion 342 and the second end portion 343 are three points in total including one point of a center point selected from a first center point of the first end portion 342 and a second center point of the second end portion 343 taken out by disassembling the lithium ion secondary battery, and two points of two ends of one straight line passing through another central point rather than the above-selected central point, wherein the other central point is in an end portion where the central point was not extracted.

No significant difference was observed between the phosphorus content distribution in the negative electrode active material layer 34 after charge and discharge of single cycle or multi-cycle and the phosphorus content distribution in the negative electrode active material layer 34 after 1000 cycles.

The phosphorus content P1 in the central portion 341 of the negative electrode active material layer 34; the average phosphorus content P2 in the first end portion 342 and the second end portion 343; the phosphorus contents P3-1 to P3-3 at three arbitrary points of the first end portion 342 and the second end portion 343; their ratios; and cycle characteristics after 1000 cycles, all of which were obtained from Examples 1 to 9 and Comparative Examples 1 to 3, are shown in Table 1. The average thickness T1 of the phosphorus-containing layer in the central portion 341; the average thickness T2 of the phosphorus-containing layer in the first end portion 342 and the second end portion 343; the thicknesses T3-1 to T3-3 of the phosphorus-containing layer at arbitrary points of the first end portion 342 and the second end portion 343; and their ratios, all of which are obtained from Examples 10 to 15, also shown in Table 1. The phosphorus content P1 in the central portion 341, the average phosphorus content P2 in the first end portion 342 and the second end portion 343 are the phosphorus content after single cycle or multi-cycle of charge and discharge performed in the degassing/aging process before product shipment. The average phosphorus content P2 is an average value of the phosphorus contents P3-1 to P3-3 at three arbitrary points. The average thickness T2 of the phosphorus-containing layer is an average value of the thicknesses T3-1 to T3-3 of the phosphorus-containing layer at the three arbitrary points.

TABLE 1

|  | P3-1 | P3-2 | P3-2 | P1 | P2 | P1/P2 | P1/P3-1 | P1/P3-2 | P1/P3-3 |
|---|---|---|---|---|---|---|---|---|---|
| Example 1 | 1.99 | 2.10 | 2.03 | 2.19 | 2.04 | 1.07 | 1.10 | 1.04 | 1.08 |
| Example 2 | 1.80 | 2.20 | 1.73 | 2.21 | 1.91 | 1.16 | 1.23 | 1.00 | 1.28 |
| Example 3 | 1.08 | 1.78 | 1.76 | 2.20 | 1.78 | 1.24 | 1.22 | 1.24 | 1.25 |
| Example 4 | 1.73 | 1.73 | 1.72 | 2.23 | 1.73 | 1.29 | 1.29 | 1.29 | 1.30 |
| Example 5 | 1.90 | 1.90 | 1.78 | 2.21 | 1.86 | 1.19 | 1.16 | 1.16 | 1.24 |
| Example 6 | 2.16 | 2.17 | 2.18 | 2.20 | 2.17 | 1.01 | 1.02 | 1.01 | 1.01 |
| Example 7 | 2.08 | 2.11 | 2.00 | 2.22 | 2.06 | 1.08 | 1.07 | 1.05 | 1.11 |
| Example 8 | 2.16 | 1.99 | 2.20 | 2.23 | 2.12 | 1.05 | 1.03 | 1.12 | 1.01 |
| Comparative Example 1 | 1.70 | 1.69 | 1.68 | 2.21 | 1.69 | 1.31 | 1.30 | 1.31 | 1.32 |
| Comparative Example 2 | 2.30 | 2.25 | 2.24 | 2.20 | 2.26 | 0.97 | 0.96 | 0.98 | 0.98 |
| Example 9 | 1.70 | 1.70 | 1.70 | 2.21 | 1.70 | 1.30 | 1.30 | 1.30 | 1.30 |
| Comparative Example 3 | 2.20 | 2.22 | 2.18 | 2.20 | 2.2 | 1.00 | 1.00 | 0.99 | 1.01 |
| Example 10 | 1.82 | 2.18 | 1.73 | 2.21 | 1.91 | 1.16 | 1.21 | 1.01 | 1.28 |
| Example 11 | 1.82 | 2.18 | 1.73 | 2.21 | 1.91 | 1.16 | 1.21 | 1.01 | 1.28 |
| Example 12 | 1.82 | 2.18 | 1.73 | 2.21 | 1.91 | 1.16 | 1.21 | 1.01 | 1.28 |
| Example 13 | 1.82 | 2.18 | 1.73 | 2.21 | 1.91 | 1.16 | 1.21 | 1.01 | 1.28 |
| Example 14 | 1.82 | 2.18 | 1.73 | 2.21 | 1.91 | 1.16 | 1.21 | 1.01 | 1.28 |
| Example 15 | 1.82 | 2.18 | 1.73 | 2.21 | 1.91 | 1.16 | 1.21 | 1.01 | 1.28 |
| Example 16 | 1.82 | 2.18 | 1.73 | 2.21 | 1.91 | 1.16 | 1.21 | 1.01 | 1.28 |
| Example 17 | 1.82 | 2.18 | 1.73 | 2.21 | 1.91 | 1.16 | 1.21 | 1.01 | 1.28 |
| Example 18 | 1.80 | 2.40 | 1.73 | 2.21 | 1.98 | 1.12 | 1.23 | 0.92 | 1.28 |
| Example 19 | 2.28 | 2.23 | 2.08 | 2.21 | 2.20 | 1.01 | 0.97 | 0.99 | 1.06 |
| Example 20 | 1.69 | 2.04 | 1.89 | 2.21 | 1.87 | 1.18 | 1.31 | 1.08 | 1.17 |
| Example 21 | 1.65 | 2.18 | 1.66 | 2.21 | 1.83 | 1.21 | 1.34 | 1.01 | 1.33 |
| Example 22 | 1.82 | 2.18 | 1.73 | 2.21 | 1.91 | 1.16 | 1.21 | 1.01 | 1.28 |
| Example 23 | 1.82 | 2.18 | 1.73 | 2.21 | 1.91 | 1.16 | 1.21 | 1.01 | 1.28 |
| Example 24 | 1.82 | 2.18 | 1.73 | 2.21 | 1.91 | 1.16 | 1.21 | 1.01 | 1.28 |
| Example 25 | 1.82 | 2.18 | 1.73 | 2.21 | 1.91 | 1.16 | 1.21 | 1.01 | 1.28 |

|  | T3-1 | T3-2 | T3-2 | T1 | T2 | T1/T2 | T1/T3-1 | T1/T3-2 | T1/T3-3 | Cycle Characteristics @1000 Cycle (%) | Phosphorus-Containing Layer |
|---|---|---|---|---|---|---|---|---|---|---|---|
| Example 1 | — | — | — | — | — | — | — | — | — | 85.1 | No |
| Example 2 | — | — | — | — | — | — | — | — | — | 85.5 | No |
| Example 3 | — | — | — | — | — | — | — | — | — | 85.1 | No |
| Example 4 | — | — | — | — | — | — | — | — | — | 85.6 | No |
| Example 5 | — | — | — | — | — | — | — | — | — | 86.1 | No |
| Example 6 | — | — | — | — | — | — | — | — | — | 86.5 | No |
| Example 7 | — | — | — | — | — | — | — | — | — | 86.0 | No |
| Example 8 | — | — | — | — | — | — | — | — | — | 86.1 | No |
| Comparative Example 1 | — | — | — | — | — | — | — | — | — | 73.1 | No |
| Comparative Example 2 | — | — | — | — | — | — | — | — | — | 73.9 | No |
| Example 9 | — | — | — | — | — | — | — | — | — | 86.3 | No |
| Comparative Example 3 | — | — | — | — | — | — | — | — | — | 73.1 | No |
| Example 10 | 10.5 | 10.1 | 10.9 | 12.2 | 10.5 | 1.16 | 1.16 | 1.21 | 1.12 | 87.0 | Yes |
| Example 11 | 11.5 | 11.1 | 11.0 | 11.6 | 11.2 | 1.04 | 1.01 | 1.05 | 1.05 | 87.5 | Yes |
| Example 12 | 13.5 | 13.8 | 13.8 | 14.8 | 13.7 | 1.08 | 1.10 | 1.07 | 1.07 | 87.1 | Yes |
| Example 13 | 16.0 | 15.5 | 14.1 | 16.7 | 15.2 | 1.10 | 1.04 | 1.08 | 1.18 | 87.2 | Yes |
| Example 14 | 5.5 | 5.6 | 5.5 | 9.8 | 5.5 | 1.78 | 1.78 | 1.75 | 1.78 | 87.7 | Yes |
| Example 15 | 4.6 | 5.0 | 4.8 | 7.5 | 4.8 | 1.56 | 1.63 | 1.50 | 1.56 | 87.5 | Yes |
| Example 16 | 2.9 | 2.9 | 3.8 | 5.1 | 3.2 | 1.59 | 1.76 | 1.76 | 1.34 | 87.9 | Yes |
| Example 17 | 3 | 2.7 | 2.7 | 4.8 | 2.8 | 1.71 | 1.60 | 1.78 | 1.78 | 87.3 | Yes |
| Example 18 | 10.5 | 10.1 | 10.9 | 12.2 | 10.5 | 1.16 | 1.16 | 1.21 | 1.12 | 80.1 | Yes |
| Example 19 | 10.5 | 10.1 | 10.9 | 12.2 | 10.5 | 1.16 | 1.16 | 1.21 | 1.12 | 78.5 | Yes |
| Example 20 | 10.5 | 10.1 | 10.9 | 12.2 | 10.5 | 1.16 | 1.16 | 1.21 | 1.12 | 80.8 | Yes |
| Example 21 | 10.5 | 10.1 | 10.9 | 12.2 | 10.5 | 1.16 | 1.16 | 1.21 | 1.12 | 78.1 | Yes |
| Example 22 | 12.1 | 7.3 | 12.2 | 12.2 | 10.5 | 1.16 | 1.01 | 1.67 | 1.00 | 79.6 | Yes |
| Example 23 | 12.2 | 6.8 | 12.5 | 12.2 | 10.5 | 1.16 | 1.00 | 1.79 | 0.98 | 76.2 | Yes |
| Example 24 | 12.1 | 6.7 | 12.1 | 12.2 | 10.3 | 1.18 | 1.01 | 1.82 | 1.01 | 78.9 | Yes |
| Example 25 | 12.1 | 6.6 | 6.7 | 12.2 | 8.5 | 1.44 | 1.01 | 1.85 | 1.82 | 77.1 | Yes |

The ratio (P1/P2) of the phosphorus content (P1) in the central portion 341 to the average phosphorus content (P2) in the first end portion 342 and the second end portion 343 was 1.07. The cycle characteristics after 1000 cycles were 85.1%.

The ratio (P1/P3-1) of the phosphorus content (P1) to the phosphorus content (P3-1) at a first arbitrary point in the first end portion 342 and the second end portion 343 was 1.10. The ratio (P1/P3-2) of the phosphorus content (P1) to the phosphorus content (P3-2) at a second arbitrary point in the first end portion 342 and the second end portion 343 was 1.04. The ratio (P1/P3-3) of the phosphorus content (P1) to the phosphorus content (P3-3) at a third arbitrary point in the first end portion 342 and the second end portion 343 was 1.08.

Example 2

A negative electrode was prepared in the same manner as in Example 1 except that in the step A2, a slurry prepared by mixing 40% by mass of the slurry A produced in the step A1 and 60% by mass of the slurry B produced in the step A1 was applied to the negative electrode current collector 32, so as to form a portion advanced by ($\frac{1}{6}$) L from the center between the first side and the second side toward the first side and the second side.

The ratio (P1/P2) of the phosphorus content (P1) in the central portion 341 to the average phosphorus content (P2) in the first end portion 342 and the second end portion 343 was 1.16. The cycle characteristics after 1000 cycles were 85.5%.

The ratio (P1/P3-1) of the phosphorus content (P1) to the phosphorus content (P3-1) at a first arbitrary point in the first end portion 342 and the second end portion 343 was 1.23. The ratio (P1/P3-2) of the phosphorus content (P1) to the phosphorus content (P3-2) at a second arbitrary point in the first end portion 342 and the second end portion 343 was 1.00. The ratio (P1/P3-3) of the phosphorus content (P1) to the phosphorus content (P3-3) at a third arbitrary point in the first end portion 342 and the second end portion 343 was 1.28.

Example 3

A negative electrode was prepared in the same manner as in Example 1 except that in the step A2, a slurry prepared by mixing 33% by mass of the slurry A produced in the step A1 and 67% by mass of the slurry B produced in the step A1 was applied to the negative electrode current collector 32, so as to form a portion advanced by ($\frac{1}{6}$) L from the center between the first side and the second side toward the first side and the second side.

The ratio (P1/P2) of the phosphorus content (P1) in the central portion 341 to the average phosphorus content (P2) in the first end portion 342 and the second end portion 343 was 1.24. The cycle characteristics after 1000 cycles were 85.1%.

The ratio (P1/P3-1) of the phosphorus content (P1) to the phosphorus content (P3-1) at a first arbitrary point in the first end portion 342 and the second end portion 343 was 1.22. The ratio (P1/P3-2) of the phosphorus content (P1) to the phosphorus content (P3-2) at a second arbitrary point in the first end portion 342 and the second end portion 343 was 1.24. The ratio (P1/P3-3) of the phosphorus content (P1) to the phosphorus content (P3-3) at third arbitrary point in the first end portion 342 and the second end portion 343 was 1.25.

Example 4

A negative electrode was prepared in the same manner as in Example 1 except that in the step A2, a slurry prepared by mixing 24% by mass of the slurry A produced in the step A1 and 76% by mass of the slurry B produced in the step A1 was applied to the negative electrode current collector 32, so as to form a portion advanced by ($\frac{1}{6}$) L from the center between the first side and the second side toward the first side and the second side.

The ratio (P1/P2) of the phosphorus content (P1) in the central portion 341 to the average phosphorus content (P2) in the first end portion 342 and the second end portion 343 was 1.29. The cycle characteristics after 1000 cycles were 85.6%.

The ratio (P1/P3-1) of the phosphorus content (P1) to the phosphorus content (P3-1) at a first arbitrary point in the first end portion 342 and the second end portion 343 was 1.29. The ratio (P1/P3-2) of the phosphorus content (P1) to the phosphorus content (P3-2) at a second arbitrary point in the first end portion 342 and the second end portion 343 was 1.29. The ratio (P1/P3-3) of the phosphorus content (P1) to the phosphorus content (P3-3) at a third arbitrary point in the first end portion 342 and the second end portion 343 was 1.30.

Example 5

A negative electrode was prepared in the same manner as in Example 1 except that in the step A1, a 2% by mass solution of triphenyl phosphite was used as the phosphorus compound to be added to the negative electrode mixture slurry B, and the phosphorus compound was added so that the mass ratio of the phosphorus compound and other components was 4:96.

The ratio (P1/P2) of the phosphorus content (P1) in the central portion 341 to the average phosphorus content (P2) in the first end portion 342 and the second end portion 343 was 1.19. The cycle characteristics after 1000 cycles were 86.1%.

The ratio (P1/P3-1) of the phosphorus content (P1) to the phosphorus content (P3-1) at a first arbitrary point in the first end portion 342 and the second end portion 343 was 1.16. The ratio (P1/P3-2) of the phosphorus content (P1) to the phosphorus content (P3-2) at a second arbitrary point in the first end portion 342 and the second end portion 343 was 1.16. The ratio (P1/P3-3) of the phosphorus content (P1) to the phosphorus content (P3-3) at a third arbitrary point in the first end portion 342 and the second end portion 343 was 1.24.

Example 6

A negative electrode was prepared in the same manner as in Example 1 except that in the step A1, a 2% by mass solution of trisnonylphenyl phosphite was used as the phosphorus compound to be added to the negative electrode mixture slurry B, and the phosphorus compound was added so that the mass ratio of the phosphorus compound and other components was 4:96.

The ratio (P1/P2) of the phosphorus content (P1) in the central portion 341 to the average phosphorus content (P2) in the first end portion 342 and the second end portion 343 was 1.01. The cycle characteristics after 1000 cycles were 86.5%.

The ratio (P1/P3-1) of the phosphorus content (P1) to the phosphorus content (P3-1) at a first arbitrary point in the first end portion 342 and the second end portion 343 was 1.02. The ratio (P1/P3-2) of the phosphorus content (P1) to the phosphorus content (P3-2) at a second arbitrary point in the first end portion 342 and the second end portion 343 was 1.01. The ratio (P1/P3-3) of the phosphorus content (P1) to the phosphorus content (P3-3) at a third arbitrary point in the first end portion 342 and the second end portion 343 was 1.01.

Example 7

A negative electrode was prepared in the same manner as in Example 1 except that in the step A1, a 2% by mass solution of tricresyl phosphite was used as the phosphorus compound to be added to the negative electrode mixture slurry B, and the phosphorus compound was added so that the mass ratio of the phosphorus compound and other components was 4:96.

The ratio (P1/P2) of the phosphorus content (P1) in the central portion 341 to the average phosphorus content (P2) in the first end portion 342 and the second end portion 343 was 1.08. The cycle characteristics after 1000 cycles were 86.0%.

The ratio (P1/P3-1) of the phosphorus content (P1) to the phosphorus content (P3-1) at a first arbitrary point in the first end portion 342 and the second end portion 343 was 1.07. The ratio (P1/P3-2) of the phosphorus content (P1) to the phosphorus content (P3-2) at a second arbitrary point in the first end portion 342 and the second end portion 343 was 1.05. The ratio (P1/P3-3) of the phosphorus content (P1) to the phosphorus content (P3-3) at a third arbitrary point in the first end portion 342 and the second end portion 343 was 1.11.

Example 8

A negative electrode was prepared in the same manner as in Example 1 except that in the step A1, a 2% by mass solution of tris(2-ethylhexyl) phosphite was used as the phosphorus compound to be added to the negative electrode mixture slurry B, and the phosphorus compound was added so that the mass ratio of the phosphorus compound and other components was 4:96.

The ratio (P1/P2) of the phosphorus content (P1) in the central portion 341 to the average phosphorus content (P2) in the first end portion 342 and the second end portion 343 was 1.05. The cycle characteristics after 1000 cycles were 86.1%.

The ratio (P1/P3-1) of the phosphorus content (P1) to the phosphorus content (P3-1) at a first arbitrary point in the first end portion 342 and the second end portion 343 was 1.03. The ratio (P1/P3-2) of the phosphorus content (P1) to the phosphorus content (P3-2) at a second arbitrary point in the first end portion 342 and the second end portion 343 was 1.12. The ratio (P1/P3-3) of the phosphorus content (P1) to the phosphorus content (P3-3) at a third arbitrary point in the first end portion 342 and the second end portion 343 was 1.01.

Comparative Example 1

A negative electrode was prepared in the same manner as in Example 1 except that in the step A2, a slurry prepared by mixing 20% by mass of the slurry A produced in the step A1 and 80% by mass of the slurry B produced in the step A1 was applied to the negative electrode current collector 32, so as to form a portion advanced by (⅙) L from the center between the first side and the second side toward the first side and the second side.

The ratio (P1/P2) of the phosphorus content (P1) in the central portion 341 to the average phosphorus content (P2) in the first end portion 342 and the second end portion 343 was 1.31. The cycle characteristics after 1000 cycles were 73.1%.

The ratio (P1/P3-1) of the phosphorus content (P1) to the phosphorus content (P3-1) at a first arbitrary point in the first end portion 342 and the second end portion 343 was 1.30. The ratio (P1/P3-2) of the phosphorus content (P1) to the phosphorus content (P3-2) at a second arbitrary point in the first end portion 342 and the second end portion 343 was 1.31. The ratio (P1/P3-3) of the phosphorus content (P1) to the phosphorus content (P3-3) at a third arbitrary point in the first end portion 342 and the second end portion 343 was 1.32.

Comparative Example 2

A negative electrode was prepared in the same manner as in Example 1 except that in the step A1, only the negative electrode mixture slurry B was produced, and that in the step A2, the slurry B was applied to the first end portion 342, the second end portion 343, and the central portion 341.

The ratio (P1/P2) of the phosphorus content (P1) in the central portion 341 to the average phosphorus content (P2) in the first end portion 342 and the second end portion 343 was 0.97. The cycle characteristics after 1000 cycles were 73.9%.

The ratio (P1/P3-1) of the phosphorus content (P1) to the phosphorus content (P3-1) at a first arbitrary point in the first end portion 342 and the second end portion 343 was 0.96. The ratio (P1/P3-2) of the phosphorus content (P1) to the phosphorus content (P3-2) at a second arbitrary point in the first end portion 342 and the second end portion 343 was 0.98. The ratio (P1/P3-3) of the phosphorus content (P1) to the phosphorus content (P3-3) at a third arbitrary point in the first end portion 342 and the second end portion 343 was 0.98.

Example 9

A negative electrode was prepared in the same manner as in Example 1 except that in the step A2, a slurry prepared by mixing 20% by mass of the slurry A produced in the step A1 and 80% by mass of the slurry B produced in the step A1 was applied to the negative electrode current collector 32, so as to form a portion advanced by (⅙) L from the center between the first side and the second side toward the first side and the second side.

The ratio (P1/P2) of the phosphorus content (P1) in the central portion 341 to the average phosphorus content (P2) in the first end portion 342 and the second end portion 343 was 1.30. The cycle characteristics after 1000 cycles were 86.3%.

The ratio (P1/P3-1) of the phosphorus content (P1) to the phosphorus content (P3-1) at a first arbitrary point in the first end portion 342 and the second end portion 343 was 1.30. The ratio (P1/P3-2) of the phosphorus content (P1) to the phosphorus content (P3-2) at a second arbitrary point in the first end portion 342 and the second end portion 343 was 1.30. The ratio (P1/P3-3) of the phosphorus content (P1) to the phosphorus content (P3-3) at a third arbitrary point in the first end portion 342 and the second end portion 343 was 1.30.

Comparative Example 3

A negative electrode was prepared in the same manner as in Example 1 except that in the step A2, a slurry prepared by mixing 50% by mass of the slurry A produced in the step A1 and 50% by mass of the slurry B produced in the step A1 was applied to the negative electrode current collector 32, so as to form a portion advanced by (⅙) L from the center between the first side and the second side toward the first side and the second side.

The ratio (P1/P2) of the phosphorus content (P1) in the central portion 341 to the average phosphorus content (P2) in the first end portion 342 and the second end portion 343 was 1.00. The cycle characteristics after 1000 cycles were 73.1%.

The ratio (P1/P3-1) of the phosphorus content (P1) to the phosphorus content (P3-1) at a first arbitrary point in the first end portion 342 and the second end portion 343 was 1.00. The ratio (P1/P3-2) of the phosphorus content (P1) to the phosphorus content (P3-2) at a second arbitrary point in the first end portion 342 and the second end portion 343 was 0.99. The ratio (P1/P3-3) of the phosphorus content (P1) to the phosphorus content (P3-3) at a third arbitrary point in the first end portion 342 and the second end portion 343 was 1.01.

Example 10

In the step A2, only the slurry A was applied to the entire surface of the negative electrode current collector 32. On top of the resulting electrode, a 1% by mass solution of triphenyl phosphite as a phosphorus compound was applied using an applicator. A portion advanced by (⅓) L from the first side toward the second side and a portion advanced by (⅓) L from the second side toward the first side were coated with an applicator gap of 10 μm. A portion advanced by (⅙) L from the center of the first side and the second side toward the first side and the second side was coated with an applicator gap of 15 μm. A negative electrode was prepared in the same manner as in Example 1 except that the obtained negative electrode 30 was used.

The ratio (P1/P2) of the phosphorus content (P1) in the central portion 341 to the average phosphorus content (P2) in the first end portion 342 and the second end portion 343 was 1.16. The cycle characteristics after 1000 cycles were 87.0%.

The ratio (P1/P3-1) of the phosphorus content (P1) to the phosphorus content (P3-1) at a first arbitrary point in the first end portion 342 and the second end portion 343 was 1.21. The ratio (P1/P3-2) of the phosphorus content (P1) to the phosphorus content (P3-2) at a second arbitrary point in the first end portion 342 and the second end portion 343 was 1.01. The ratio (P1/P3-3) of the phosphorus content (P1) to the phosphorus content (P3-3) at a third arbitrary point in the first end portion 342 and the second end portion 343 was 1.28.

The ratio (T1/T2) of the average thickness T1 [μm] of the phosphorus-containing layer in the central portion 341 to the average thickness T2 [μm] of the phosphorus-containing layer in the first end portion 342 and the second end portion 343 was 1.16. T1 was 12.2 μm.

The ratio (T1/T3-1) of the average thickness T1 [μm] of the phosphorus-containing layer in the central portion 341 to the thickness T3-1 [μm] of the phosphorus-containing layer at first arbitrary point of the first end portion 342 and the second end portion 343 was 1.16. The ratio (T1/T3-2) of the average thickness T1 [μm] of the phosphorus-containing layer in the central portion 341 to the thickness T3-2 [μm] of the phosphorus-containing layer at second arbitrary point of the first end portion 342 and the second end portion 343 was 1.21. The ratio (T1/T3-3)) of the average thickness T1 [μm] of the phosphorus-containing layer in the central portion 341 and the thickness T3-3 [μm] of the phosphorus-containing layer at third arbitrary point of the first end portion 342 and the second end portion 343 was 1.12.

Example 11

A negative electrode was prepared in the same manner as in Example 10 except that in the step A2, the portion advanced by (⅓) L from the first side to the second side and the portion advanced by (⅓) L from the second side to the first side were coated with a gap of 12 μm, and a portion advanced by (⅙) L from the center of the first side and the second side toward the first side and the second side was coated with an applicator gap of 15 μm.

The ratio (P1/P2) of the phosphorus content (P1) in the central portion 341 to the average phosphorus content (P2) in the first end portion 342 and the second end portion 343 was 1.16. The cycle characteristics after 1000 cycles were 87.5%.

The ratio (P1/P3-1) of the phosphorus content (P1) to the phosphorus content (P3-1) at a first arbitrary point in the first end portion 342 and the second end portion 343 was 1.21. The ratio (P1/P3-2) of the phosphorus content (P1) to the phosphorus content (P3-2) at a second arbitrary point in the first end portion 342 and the second end portion 343 was 1.01. The ratio (P1/P3-3) of the phosphorus content (P1) to the phosphorus content (P3-3) at a third arbitrary point in the first end portion 342 and the second end portion 343 was 1.28.

The ratio (T1/T2) between the average thickness T1 [μm] of the phosphorus-containing layer in the central portion 341 and the average thickness T2 [μm] of the phosphorus-containing layer in the first end portion 342 and the second end portion 343 was 1.04. T1 was 11.6 μm.

The ratio (T1/T3-1) of the average thickness T1 [μm] of the phosphorus-containing layer in the central portion 341 to the thickness T3-1 [μm] of the phosphorus-containing layer at first arbitrary point of the first end portion 342 and the second end portion 343 was 1.01. The ratio (T1/T3-2) of the average thickness T1 [μm] of the phosphorus-containing layer in the central portion 341 to the thickness T3-2 [μm] of the phosphorus-containing layer at second arbitrary point of the first end portion 342 and the second end portion 343 was 1.05. The ratio (T1/T3-3) of the average thickness T1 [μm] of the phosphorus-containing layer in the central portion 341 and the thickness T3-3 [μm] of the phosphorus-containing layer at third arbitrary point of the first end portion 342 and the second end portion 343 was 1.05.

Example 12

A negative electrode was prepared in the same manner as in Example 10 except that in the step A2, the portion advanced by (⅓) L from the first side to the second side and the portion advanced by (⅓) L from the second side to the first side were coated with a gap of 18 μm, and a portion advanced by (⅙) L from the center of the first side and the second side toward the first side and the second side was coated with an applicator gap of 20 μm.

The ratio (P1/P2) of the phosphorus content (P1) in the central portion 341 to the average phosphorus content (P2)

in the first end portion 342 and the second end portion 343 was 1.16. The cycle characteristics after 1000 cycles were 87.1%.

The ratio (P1/P3-1) of the phosphorus content (P1) to the phosphorus content (P3-1) at a first arbitrary point in the first end portion 342 and the second end portion 343 was 1.21. The ratio (P1/P3-2) of the phosphorus content (P1) to the phosphorus content (P3-2) at a second arbitrary point in the first end portion 342 and the second end portion 343 was 1.01. The ratio (P1/P3-3) of the phosphorus content (P1) to the phosphorus content (P3-3) at a third arbitrary point in the first end portion 342 and the second end portion 343 was 1.28.

The ratio (T1/T2) between the average thickness T1 [μm] of the phosphorus-containing layer in the central portion 341 and the average thickness T2 [μm] of the phosphorus-containing layer in the first end portion 342 and the second end portion 343 was 1.08. T1 was 14.8 μm.

The ratio (T1/T3-1) of the average thickness T1 [μm] of the phosphorus-containing layer in the central portion 341 to the thickness T3-1 [μm] of the phosphorus-containing layer at first arbitrary point of the first end portion 342 and the second end portion 343 was 1.10. The ratio (T1/T3-2) of the average thickness T1 [μm] of the phosphorus-containing layer in the central portion 341 to the thickness T3-2 [μm] of the phosphorus-containing layer at second arbitrary point of the first end portion 342 and the second end portion 343 was 1.07. The ratio (T1/T3-3)) of the average thickness T1 [μm] of the phosphorus-containing layer in the central portion 341 and the thickness T3-3 [μm] of the phosphorus-containing layer at third arbitrary point of the first end portion 342 and the second end portion 343 was 1.07.

Example 13

A negative electrode was prepared in the same manner as in Example 10 except that in the step A2, the portion advanced by (⅓) L from the first side to the second side and the portion advanced by (⅓) L from the second side to the first side were coated with a gap of 22 μm, and a portion advanced by (⅙) L from the center of the first side and the second side toward the first side and the second side was coated with an applicator gap of 26 μm.

The ratio (P1/P2) of the phosphorus content (P1) in the central portion 341 to the average phosphorus content (P2) in the first end portion 342 and the second end portion 343 was 1.16. The cycle characteristics after 1000 cycles were 87.2%.

The ratio (P1/P3-1) of the phosphorus content (P1) to the phosphorus content (P3-1) at a first arbitrary point in the first end portion 342 and the second end portion 343 was 1.21. The ratio (P1/P3-2) of the phosphorus content (P1) to the phosphorus content (P3-2) at a second arbitrary point in the first end portion 342 and the second end portion 343 was 1.01. The ratio (P1/P3-3) of the phosphorus content (P1) to the phosphorus content (P3-3) at a third arbitrary point in the first end portion 342 and the second end portion 343 was 1.28.

The ratio (T1/T2) of the average thickness T1 [μm] of the phosphorus-containing layer in the central portion 341 to the average thickness T2 [μm] of the phosphorus-containing layer in the first end portion 342 and the second end portion 343 was 1.10. T1 was 16.7 μm.

The ratio (T1/T3-1) of the average thickness T1 [μm] of the phosphorus-containing layer in the central portion 341 to the thickness T3-1 [μm] of the phosphorus-containing layer at first arbitrary point of the first end portion 342 and the second end portion 343 was 1.04. The ratio (T1/T3-2) of the average thickness T1 [μm] of the phosphorus-containing layer in the central portion 341 to the thickness T3-2 [μm] of the phosphorus-containing layer at second arbitrary point of the first end portion 342 and the second end portion 343 was 1.08. The ratio (T1/T3-3)) of the average thickness T1 [μm] of the phosphorus-containing layer in the central portion 341 and the thickness T3-3 [μm] of the phosphorus-containing layer at third arbitrary point of the first end portion 342 and the second end portion 343 was 1.18.

Example 14

A negative electrode was prepared in the same manner as in Example 10 except that in the step A2, the portion advanced by (⅓) L from the first side to the second side and the portion advanced by (⅓) L from the second side to the first side were coated with a gap of 8 μm, and a portion advanced by (⅙) L from the center of the first side and the second side toward the first side and the second side was coated with an applicator gap of 13 μm.

The ratio (P1/P2) of the phosphorus content (P1) in the central portion 341 to the average phosphorus content (P2) in the first end portion 342 and the second end portion 343 was 1.16. The cycle characteristics after 1000 cycles were 87.7%.

The ratio (P1/P3-1) of the phosphorus content (P1) to the phosphorus content (P3-1) at a first arbitrary point in the first end portion 342 and the second end portion 343 was 1.21. The ratio (P1/P3-2) of the phosphorus content (P1) to the phosphorus content (P3-2) at a second arbitrary point in the first end portion 342 and the second end portion 343 was 1.01. The ratio (P1/P3-3) of the phosphorus content (P1) to the phosphorus content (P3-3) at a third arbitrary point in the first end portion 342 and the second end portion 343 was 1.28.

The ratio (T1/T2) between the average thickness T1 [μm] of the phosphorus-containing layer in the central portion 341 and the average thickness T2 [μm] of the phosphorus-containing layer in the first end portion 342 and the second end portion 343 was 1.78. T1 was 9.8 μm.

The ratio (T1/T3-1) of the average thickness T1 [μm] of the phosphorus-containing layer in the central portion 341 to the thickness T3-1 [μm] of the phosphorus-containing layer at first arbitrary point of the first end portion 342 and the second end portion 343 was 1.78. The ratio (T1/T3-2) of the average thickness T1 [μm] of the phosphorus-containing layer in the central portion 341 to the thickness T3-2 [μm] of the phosphorus-containing layer at second arbitrary point of the first end portion 342 and the second end portion 343 was 1.75. The ratio (T1/T3-3)) of the average thickness T1 [μm] of the phosphorus-containing layer in the central portion 341 and the thickness T3-3 [μm] of the phosphorus-containing layer at third arbitrary point of the first end portion 342 and the second end portion 343 was 1.78.

Example 15

A negative electrode was prepared in the same manner as in Example 10 except that in the step A2, the portion advanced by (⅓) L from the first side to the second side and the portion advanced by (⅓) L from the second side to the first side were coated with a gap of 7 μm, and a portion advanced by (⅙) L from the center of the first side and the second side toward the first side and the second side was coated with an applicator gap of 9 μm.

The ratio (P1/P2) of the phosphorus content (P1) in the central portion 341 to the average phosphorus content (P2) in the first end portion 342 and the second end portion 343 was 1.16. The cycle characteristics after 1000 cycles were 87.5%.

The ratio (P1/P3-1) of the phosphorus content (P1) to the phosphorus content (P3-1) at a first arbitrary point in the first end portion 342 and the second end portion 343 was 1.21. The ratio (P1/P3-2) of the phosphorus content (P1) to the phosphorus content (P3-2) at a second arbitrary point in the first end portion 342 and the second end portion 343 was 1.01. The ratio (P1/P3-3) of the phosphorus content (P1) to the phosphorus content (P3-3) at a third arbitrary point in the first end portion 342 and the second end portion 343 was 1.28.

The ratio (T1/T2) between the average thickness T1 [μm] of the phosphorus-containing layer in the central portion 341 and the average thickness T2 [μm] of the phosphorus-containing layer in the first end portion 342 and the second end portion 343 was 1.56. T1 was 7.5 μm.

The ratio (T1/T3-1) of the average thickness T1 [μm] of the phosphorus-containing layer in the central portion 341 to the thickness T3-1 [μm] of the phosphorus-containing layer at first arbitrary point of the first end portion 342 and the second end portion 343 was 1.63. The ratio (T1/T3-2) of the average thickness T1 [μm] of the phosphorus-containing layer in the central portion 341 to the thickness T3-2 [μm] of the phosphorus-containing layer at second arbitrary point of the first end portion 342 and the second end portion 343 was 1.50. The ratio (T1/T3-3) of the average thickness T1 [μm] of the phosphorus-containing layer in the central portion 341 and the thickness T3-3 [μm] of the phosphorus-containing layer at third arbitrary point of the first end portion 342 and the second end portion 343 was 1.56.

Example 16

A negative electrode was prepared in the same manner as in Example 10 except that in the step A2, the portion advanced by (⅓) L from the first side to the second side and the portion advanced by (⅓) L from the second side to the first side were coated with a gap of 5 μm, and a portion advanced by (⅙) L from the center of the first side and the second side toward the first side and the second side was coated with an applicator gap of 7 μm.

The ratio (P1/P2) of the phosphorus content (P1) in the central portion 341 to the average phosphorus content (P2) in the first end portion 342 and the second end portion 343 was 1.16. The cycle characteristics after 1000 cycles were 87.9%.

The ratio (P1/P3-1) of the phosphorus content (P1) to the phosphorus content (P3-1) at a first arbitrary point in the first end portion 342 and the second end portion 343 was 1.21. The ratio (P1/P3-2) of the phosphorus content (P1) to the phosphorus content (P3-2) at a second arbitrary point in the first end portion 342 and the second end portion 343 was 1.01. The ratio (P1/P3-3) of the phosphorus content (P1) to the phosphorus content (P3-3) at a third arbitrary point in the first end portion 342 and the second end portion 343 was 1.28.

The ratio (T1/T2) between the average thickness T1 [μm] of the phosphorus-containing layer in the central portion 341 and the average thickness T2 [μm] of the phosphorus-containing layer in the first end portion 342 and the second end portion 343 was 1.59. Further, T1 was 5.1 μm.

The ratio (T1/T3-1) of the average thickness T1 [μm] of the phosphorus-containing layer in the central portion 341 to the thickness T3-1 [μm] of the phosphorus-containing layer at first arbitrary point of the first end portion 342 and the second end portion 343 was 1.76. The ratio (T1/T3-2) of the average thickness T1 [μm] of the phosphorus-containing layer in the central portion 341 to the thickness T3-2 [μm] of the phosphorus-containing layer at second arbitrary point of the first end portion 342 and the second end portion 343 was 1.76. The ratio (T1/T3-3) of the average thickness T1 [μm] of the phosphorus-containing layer in the central portion 341 and the thickness T3-3 [μm] of the phosphorus-containing layer at third arbitrary point of the first end portion 342 and the second end portion 343 was 1.34.

Example 17

A negative electrode was prepared in the same manner as in Example 10 except that in the step A2, the portion advanced by (⅓) L from the first side to the second side and the portion advanced by (⅓) L from the second side to the first side were coated with a gap of 4 μm, and a portion advanced by (⅙) L from the center of the first side and the second side toward the first side and the second side was coated with an applicator gap of 6 μm.

The ratio (P1/P2) of the phosphorus content (P1) in the central portion 341 to the average phosphorus content (P2) in the first end portion 342 and the second end portion 343 was 1.16. The cycle characteristics after 1000 cycles were 87.3%.

The ratio (P1/P3-1) of the phosphorus content (P1) to the phosphorus content (P3-1) at a first arbitrary point in the first end portion 342 and the second end portion 343 was 1.21. The ratio (P1/P3-2) of the phosphorus content (P1) to the phosphorus content (P3-2) at a second arbitrary point in the first end portion 342 and the second end portion 343 was 1.01. The ratio (P1/P3-3) of the phosphorus content (P1) to the phosphorus content (P3-3) at a third arbitrary point in the first end portion 342 and the second end portion 343 was 1.28.

The ratio (T1/T2) of the average thickness T1 [μm] of the phosphorus-containing layer in the central portion 341 to the average thickness T2 [μm] of the phosphorus-containing layer in the first end portion 342 and the second end portion 343 was 1.71. Moreover, T1 was 4.8 micrometers.

The ratio (T1/T3-1) of the average thickness T1 [μm] of the phosphorus-containing layer in the central portion 341 to the thickness T3-1 [μm] of the phosphorus-containing layer at first arbitrary point of the first end portion 342 and the second end portion 343 was 1.60. The ratio (T1/T3-2) of the average thickness T1 [μm] of the phosphorus-containing layer in the central portion 341 to the thickness T3-2 [μm] of the phosphorus-containing layer at second arbitrary point of the first end portion 342 and the second end portion 343 was 1.78. The ratio (T1/T3-3) of the average thickness T1 [μm] of the phosphorus-containing layer in the central portion 341 and the thickness T3-3 [μm] of the phosphorus-containing layer at third arbitrary point of the first end portion 342 and the second end portion 343 was 1.78.

Example 18

A negative electrode was prepared in the same manner as in Example 10 except that in the step A1, a solution which was obtained by mixing 50% by mass of a 1% by mass solution of triphenyl phosphite and 50% by mass of a 2% by mass solution of trisnonylphenyl phosphite was used as a phosphorus compound.

The ratio (P1/P2) of the phosphorus content (P1) in the central portion 341 to the average phosphorus content (P2) in the first end portion 342 and the second end portion 343 was 1.12. The cycle characteristics after 1000 cycles were 80.1%.

The ratio (P1/P3-1) of the phosphorus content (P1) to the phosphorus content (P3-1) at a first arbitrary point in the first end portion 342 and the second end portion 343 was 1.23. The ratio (P1/P3-2) of the phosphorus content (P1) to the phosphorus content (P3-2) at a second arbitrary point in the first end portion 342 and the second end portion 343 was 0.92. The ratio (P1/P3-3) of the phosphorus content (P1) to the phosphorus content (P3-3) at a third arbitrary point in the first end portion 342 and the second end portion 343 was 1.28.

The ratio (T1/T2) of the average thickness T1 [μm] of the phosphorus-containing layer in the central portion 341 to the average thickness T2 [μm] of the phosphorus-containing layer in the first end portion 342 and the second end portion 343 was 1.16. T1 was 12.2 μm.

The ratio (T1/T3-1) of the average thickness T1 [μm] of the phosphorus-containing layer in the central portion 341 to the thickness T3-1 [μm] of the phosphorus-containing layer at first arbitrary point of the first end portion 342 and the second end portion 343 was 1.16. The ratio (T1/T3-2) of the average thickness T1 [μm] of the phosphorus-containing layer in the central portion 341 to the thickness T3-2 [μm] of the phosphorus-containing layer at second arbitrary point of the first end portion 342 and the second end portion 343 was 1.21. The ratio (T1/T3-3) of the average thickness T1 [μm] of the phosphorus-containing layer in the central portion 341 and the thickness T3-3 [μm] of the phosphorus-containing layer at third arbitrary point of the first end portion 342 and the second end portion 343 was 1.12.

Example 19

A negative electrode was prepared in the same manner as in Example 10 except that in the step A1, a solution which was obtained by mixing 30% by mass of a 1% by mass solution of triphenyl phosphite and 70% by mass of a 2% by mass solution of trisnonylphenyl phosphite was used as a phosphorus compound.

The ratio (P1/P2) of the phosphorus content (P1) in the central portion 341 to the average phosphorus content (P2) in the first end portion 342 and the second end portion 343 was 1.01. The cycle characteristics after 1000 cycles were 78.5%.

The ratio (P1/P3-1) of the phosphorus content (P1) to the phosphorus content (P3-1) at a first arbitrary point in the first end portion 342 and the second end portion 343 was 0.97. The ratio (P1/P3-2) of the phosphorus content (P1) to the phosphorus content (P3-2) at a second arbitrary point in the first end portion 342 and the second end portion 343 was 0.99. The ratio (P1/P3-3) of the phosphorus content (P1) to the phosphorus content (P3-3) at a third arbitrary point in the first end portion 342 and the second end portion 343 was 1.06.

The ratio (T1/T2) of the average thickness T1 [μm] of the phosphorus-containing layer in the central portion 341 to the average thickness T2 [μm] of the phosphorus-containing layer in the first end portion 342 and the second end portion 343 was 1.16. T1 was 12.2 μm.

The ratio (T1/T3-1) of the average thickness T1 [μm] of the phosphorus-containing layer in the central portion 341 to the thickness T3-1 [μm] of the phosphorus-containing layer at first arbitrary point of the first end portion 342 and the second end portion 343 was 1.16. The ratio (T1/T3-2) of the average thickness T1 [μm] of the phosphorus-containing layer in the central portion 341 to the thickness T3-2 [μm] of the phosphorus-containing layer at second arbitrary point of the first end portion 342 and the second end portion 343 was 1.21. The ratio (T1/T3-3) of the average thickness T1 [μm] of the phosphorus-containing layer in the central portion 341 and the thickness T3-3 [μm] of the phosphorus-containing layer at third arbitrary point of the first end portion 342 and the second end portion 343 was 1.12.

Example 20

A negative electrode was prepared in the same manner as in Example 10 except that in the step A1, a solution which was obtained by mixing 20% by mass of a 1% by mass solution of triphenyl phosphite and 80% by mass of a 2% by mass solution of trisnonylphenyl phosphite was used as a phosphorus compound.

The ratio (P1/P2) of the phosphorus content (P1) in the central portion 341 to the average phosphorus content (P2) in the first end portion 342 and the second end portion 343 was 1.18. The cycle characteristics after 1000 cycles were 80.8%.

The ratio (P1/P3-1) of the phosphorus content (P1) to the phosphorus content (P3-1) at a first arbitrary point in the first end portion 342 and the second end portion 343 was 1.31. The ratio (P1/P3-2) of the phosphorus content (P1) to the phosphorus content (P3-2) at a second arbitrary point in the first end portion 342 and the second end portion 343 was 1.08. The ratio (P1/P3-3) of the phosphorus content (P1) to the phosphorus content (P3-3) at a third arbitrary point in the first end portion 342 and the second end portion 343 was 1.17.

The ratio (T1/T2) of the average thickness T1 [μm] of the phosphorus-containing layer in the central portion 341 to the average thickness T2 [μm] of the phosphorus-containing layer in the first end portion 342 and the second end portion 343 was 1.16. T1 was 12.2 μm.

The ratio (T1/T3-1) of the average thickness T1 [μm] of the phosphorus-containing layer in the central portion 341 to the thickness T3-1 [μm] of the phosphorus-containing layer at first arbitrary point of the first end portion 342 and the second end portion 343 was 1.16. The ratio (T1/T3-2) of the average thickness T1 [μm] of the phosphorus-containing layer in the central portion 341 to the thickness T3-2 [μm] of the phosphorus-containing layer at second arbitrary point of the first end portion 342 and the second end portion 343 was 1.21. The ratio (T1/T3-3) of the average thickness T1 [μm] of the phosphorus-containing layer in the central portion 341 and the thickness T3-3 [μm] of the phosphorus-containing layer at third arbitrary point of the first end portion 342 and the second end portion 343 was 1.12.

Example 21

A negative electrode was prepared in the same manner as in Example 1 except that in the step A1, a solution which was obtained by mixing 60% by mass of a 1% by mass solution of triphenyl phosphite and 40% by mass of a 2% by mass solution of trisnonylphenyl phosphite was used as a phosphorus compound.

The ratio (P1/P2) of the phosphorus content (P1) in the central portion 341 to the average phosphorus content (P2) in the first end portion 342 and the second end portion 343 was 1.21. The cycle characteristics after 1000 cycles were 78.1%.

The ratio (P1/P3-1) of the phosphorus content (P1) to the phosphorus content (P3-1) at a first arbitrary point in the first end portion 342 and the second end portion 343 was 1.34. The ratio (P1/P3-2) of the phosphorus content (P1) to the phosphorus content (P3-2) at a second arbitrary point in the first end portion 342 and the second end portion 343 was 1.01. The ratio (P1/P3-3) of the phosphorus content (P1) to the phosphorus content (P3-3) at third arbitrary point in the first end portion 342 and the second end portion 343 was 1.33.

The ratio (T1/T2) of the average thickness T1 [μm] of the phosphorus-containing layer in the central portion 341 to the average thickness T2 [μm] of the phosphorus-containing layer in the first end portion 342 and the second end portion 343 was 1.16. T1 was 12.2 μm.

The ratio (T1/T3-1) of the average thickness T1 [μm] of the phosphorus-containing layer in the central portion 341 to the thickness T3-1 [μm] of the phosphorus-containing layer at first arbitrary point of the first end portion 342 and the second end portion 343 was 1.16. The ratio (T1/T3-2) of the average thickness T1 [μm] of the phosphorus-containing layer in the central portion 341 to the thickness T3-2 [μm] of the phosphorus-containing layer at second arbitrary point of the first end portion 342 and the second end portion 343 was 1.21. The ratio (T1/T3-3) of the average thickness T1 [μm] of the phosphorus-containing layer in the central portion 341 and the thickness T3-3 [μm] of the phosphorus-containing layer at third arbitrary point of the first end portion 342 and the second end portion 343 was 1.12.

Example 22

As a reproduction experiment of Example 10, a negative electrode was produced in the same manner as Example 10.

The ratio (P1/P2) of the phosphorus content (P1) in the central portion 341 to the average phosphorus content (P2) in the first end portion 342 and the second end portion 343 was 1.16. The cycle characteristics after 1000 cycles were 79.6%.

The ratio (P1/P3-1) of the phosphorus content (P1) to the phosphorus content (P3-1) at a first arbitrary point in the first end portion 342 and the second end portion 343 was 1.21. The ratio (P1/P3-2) of the phosphorus content (P1) to the phosphorus content (P3-2) at a second arbitrary point in the first end portion 342 and the second end portion 343 was 1.01. The ratio (P1/P3-3) of the phosphorus content (P1) to the phosphorus content (P3-3) at a third arbitrary point in the first end portion 342 and the second end portion 343 was 1.28.

The ratio (T1/T2) of the average thickness T1 [μm] of the phosphorus-containing layer in the central portion 341 to the average thickness T2 [μm] of the phosphorus-containing layer in the first end portion 342 and the second end portion 343 was 1.16. T1 was 12.2 μm.

The ratio (T1/T3-1) of the average thickness T1 [μm] of the phosphorus-containing layer in the central portion 341 to the thickness T3-1 [μm] of the phosphorus-containing layer at first arbitrary point of the first end portion 342 and the second end portion 343 was 1.01. The ratio (T1/T3-2) of the average thickness T1 [μm] of the phosphorus-containing layer in the central portion 341 to the thickness T3-2 [μm] of the phosphorus-containing layer at second arbitrary point of the first end portion 342 and the second end portion 343 was 1.67. The ratio (T1/T3-3) of the average thickness T1 [μm] of the phosphorus-containing layer in the central portion 341 and the thickness T3-3 [μm] of the phosphorus-containing layer at third arbitrary point of the first end portion 342 and the second end portion 343 was 1.00.

Example 23

As a reproduction experiment of Example 10, a negative electrode was produced in the same manner as Example 10.

The ratio (P1/P2) of the phosphorus content (P1) in the central portion 341 to the average phosphorus content (P2) in the first end portion 342 and the second end portion 343 was 1.16. The cycle characteristics after 1000 cycles were 76.2%.

The ratio (P1/P3-1) of the phosphorus content (P1) to the phosphorus content (P3-1) at a first arbitrary point in the first end portion 342 and the second end portion 343 was 1.21. The ratio (P1/P3-2) of the phosphorus content (P1) to the phosphorus content (P3-2) at a second arbitrary point in the first end portion 342 and the second end portion 343 was 1.01. The ratio (P1/P3-3) of the phosphorus content (P1) to the phosphorus content (P3-3) at a third arbitrary point in the first end portion 342 and the second end portion 343 was 1.28.

The ratio (T1/T2) of the average thickness T1 [μm] of the phosphorus-containing layer in the central portion 341 to the average thickness T2 [μm] of the phosphorus-containing layer in the first end portion 342 and the second end portion 343 was 1.16. T1 was 12.2 μm.

The ratio (T1/T3-1) of the average thickness T1 [μm] of the phosphorus-containing layer in the central portion 341 to the thickness T3-1 [μm] of the phosphorus-containing layer at first arbitrary point of the first end portion 342 and the second end portion 343 was 1.00. The ratio (T1/T3-2) of the average thickness T1 [μm] of the phosphorus-containing layer in the central portion 341 to the thickness T3-2 [μm] of the phosphorus-containing layer at second arbitrary point of the first end portion 342 and the second end portion 343 was 1.79. The ratio (T1/T3-3) of the average thickness T1 [μm] of the phosphorus-containing layer in the central portion 341 and the thickness T3-3 [μm] of the phosphorus-containing layer at third arbitrary point of the first end portion 342 and the second end portion 343 was 0.98.

Example 24

As a reproduction experiment of Example 10, a negative electrode was produced in the same manner as Example 10.

The ratio (P1/P2) of the phosphorus content (P1) in the central portion 341 to the average phosphorus content (P2) in the first end portion 342 and the second end portion 343 was 1.16. The cycle characteristics after 1000 cycles were 78.9%.

The ratio (P1/P3-1) of the phosphorus content (P1) to the phosphorus content (P3-1) at a first arbitrary point in the first end portion 342 and the second end portion 343 was 1.21. The ratio (P1/P3-2) of the phosphorus content (P1) to the phosphorus content (P3-2) at a second arbitrary point in the first end portion 342 and the second end portion 343 was 1.01. The ratio (P1/P3-3) of the phosphorus content (P1) to the phosphorus content (P3-3) at a third arbitrary point in the first end portion 342 and the second end portion 343 was 1.28.

The ratio (T1/T2) of the average thickness T1 [μm] of the phosphorus-containing layer in the central portion 341 to the average thickness T2 [μm] of the phosphorus-containing layer in the first end portion 342 and the second end portion 343 was 1.18. T1 was 12.2 μm.

The ratio (T1/T3-1) of the average thickness T1 [µm] of the phosphorus-containing layer in the central portion 341 to the thickness T3-1 [µm] of the phosphorus-containing layer at first arbitrary point of the first end portion 342 and the second end portion 343 was 1.01. The ratio (T1/T3-2) of the average thickness T1 [µm] of the phosphorus-containing layer in the central portion 341 to the thickness T3-2 [µm] of the phosphorus-containing layer at second arbitrary point of the first end portion 342 and the second end portion 343 was 1.82. The ratio (T1/T3-3) of the average thickness T1 [µm] of the phosphorus-containing layer in the central portion 341 and the thickness T3-3 [µm] of the phosphorus-containing layer at third arbitrary point of the first end portion 342 and the second end portion 343 was 1.01.

Example 25

As a reproduction experiment of Example 10, a negative electrode was produced in the same manner as Example 10.

The ratio (P1/P2) of the phosphorus content (P1) in the central portion 341 to the average phosphorus content (P2) in the first end portion 342 and the second end portion 343 was 1.16. The cycle characteristics after 1000 cycles were 77.1%.

The ratio (P1/P3-1) of the phosphorus content (P1) to the phosphorus content (P3-1) at a first arbitrary point in the first end portion 342 and the second end portion 343 was 1.21. The ratio (P1/P3-2) of the phosphorus content (P1) to the phosphorus content (P3-2) at a second arbitrary point in the first end portion 342 and the second end portion 343 was 1.01. The ratio (P1/P3-3) of the phosphorus content (P1) to the phosphorus content (P3-3) at a third arbitrary point in the first end portion 342 and the second end portion 343 was 1.28.

The ratio (T1/T2) between the average thickness T1 [µm] of the phosphorus-containing layer in the central portion 341 and the average thickness T2 [µm] of the phosphorus-containing layer in the first end portion 342 and the second end portion 343 was 1.44. T1 was 12.2 µm.

The ratio (T1/T3-1) of the average thickness T1 [µm] of the phosphorus-containing layer in the central portion 341 to the thickness T3-1 [µm] of the phosphorus-containing layer at first arbitrary point of the first end portion 342 and the second end portion 343 was 1.01. The ratio (T1/T3-2) of the average thickness T1 [µm] of the phosphorus-containing layer in the central portion 341 to the thickness T3-2 [µm] of the phosphorus-containing layer at second arbitrary point of the first end portion 342 and the second end portion 343 was 1.85. The ratio (T1/T3-3) of the average thickness T1 [µm] of the phosphorus-containing layer in the central portion 341 and the thickness T3-3 [µm] of the phosphorus-containing layer at third arbitrary point of the first end portion 342 and the second end portion 343 was 1.82.

In Examples 1 to 9, the ratio (P1/P2) of the phosphorus content (P1) in the central portion 341 to the average phosphorus content (P2) in the first end portion 342 and the second end portion 343 satisfies the relationship of 1<P1/P2≤1.30, and the cycle characteristics after 1000 cycles were 85.1% or more. This high cycle characteristics are due to stability of intercalation and de-intercalation of lithium ions and electron transfer during charge and discharge in a whole of the negative electrode, by forming an appropriate potential gradient between the central portion 341 and the first end portion 342, and between the central portion 341 and the second end portion 343.

In Examples 10 to 25, the average thickness T1 [µm] of the phosphorus-containing layer in the central portion 341 and the average thickness T2 [µm] of the phosphorus-containing layer in the first end portion 342 and the second end portion 343 satisfy both the relationship of 1<T1/T2≤1.80 and the relationship of T1≤10, and the cycle characteristics after 1000 cycles were 76.2% or more. This high cycle characteristics are due to the fact that the formation of wrinkles of the negative electrode was suppressed during battery assembly and charge and discharge, and that the thin phosphorus-containing layer in the central portion 341 reduced the internal resistance.

On the other hand, in Comparative Examples 1 to 3, the ratio (P1/P2) of the phosphorus content (P1) in the central portion 341 to the average phosphorus content (P2) in the first end portion 342 and the second end portion 343 does not satisfy the relationship of 1<P1/P2≤1.30, and the cycle characteristics after 1000 cycles were 75.6% or less. This is considered due to the fact that the potential gradient formed between the central portion 341, and the first end portion 342 or between the central portion 341 and the second end portion 343 becomes too large.

Example 26

The negative electrode of Example 26 was produced by the following steps B1 to B9.

Step B1

A negative electrode active material, a binder, and a solvent were mixed to prepare negative electrode mixture slurries A and B, respectively. The negative electrode mixture slurry A contains 98% by mass of a negative electrode active material, 1% by mass of a binder and 1% by mass of a solvent, and the negative electrode mixture slurry B contains 97% by mass of the negative electrode active material, 2% by mass of the binder and 1% by mass of the solvent. As the negative electrode active material in the negative electrode mixture slurries A and B, a natural graphite material for a lithium ion secondary battery was used. Further, a mixture of CMC as a thickener and SBR in a mass ratio of 1:1 was used as a binder. Water was used as a solvent. Separately, 1% by mass solution of SURFLON (registered trademark) (manufactured by AGC Semi Chemical Co., Ltd.) as an additive was added to the negative electrode mixture slurry B. In the negative electrode mixture slurry B, the phosphorus compound was added so that the mass ratio of the phosphorus compound to other components was 2:98.

The mixing method of these components constituting the slurry A and B is not particularly limited, and the mixing order is not particularly limited.

The steps B2 to B8 according to Example 26 are the same as the steps A2 to A8 according to Example 1 above.

Step B9

The lithium ion secondary battery produced in the step B8 was charged and discharged for single cycle or multi-cycle as an aging treatment, and then the lithium ion secondary battery was disassembled and a negative electrode active material layer 34 was taken out. Each of fluorine contents in the central portion 341, the first the end portion 342 and the second end portion 343 of the negative electrode active material layer 34 taken out was measured by SEM-EDS analysis (Equipment used: SU8010 (manufactured by Hitachi High-Tech Fielding)). The fluorine content in the central portion 341 is an average value of three data obtained by measuring the fluorine content at three arbitrary points in the central portion 341 in the negative electrode active material layer 34. The average fluorine content in the first end portion 342 and the second end portion 343 was obtained by extracting three arbitrary points from the first end portion 342 and the second end portion 343 in the negative electrode active material layer 34, measuring the fluorine contents at the three points, and obtaining an average value of three data. In addition, the average thickness T1 of the fluorine-containing layer in the central portion 341 was an average value obtained by observing cross sections of three arbitrary points of the central portion 341 in the negative electrode active material layer 34 with a scanning electron microscope. The average thickness T2 of the fluorine-containing layer in the first end portion 342 and the second end portion 343 was obtained by extracting three arbitrary points from the first end portion 342 and the second end portion 343 in the negative electrode active material layer 34, observing cross sections of the three points with a scanning electron microscope, and obtaining average value of the three data. Again, the central portion 341 is included in the portion where the slurry B was applied, and the first end portion 342 and the second end portion 343 are included in the portion where the slurry A was applied. The fluorine content in the negative electrode active material layer 34 was determined through the charge and discharge of single cycle or multi-cycle. The fluorine content can be determined according to the fluorine component contained in the negative electrode mixture slurry used for producing the negative electrode, and the fluorine components contained in the non-aqueous electrolyte and the lithium salt.

The three arbitrary points of the central portion 341 are three points in total including one point of the central point in the central portion 341 of the negative electrode active material layer 34 taken out by disassembling the lithium ion secondary battery, and two points of two ends of one straight line passing through the central point.

The three arbitrary points extracted from the first end portion 342 and the second end portion 343 in the negative electrode active material layer 34 are total 3 points including one point selected from a first central point in the first end portion 342 and a second central point in the second end portion 343 taken out by disassembling the lithium ion secondary battery, and two points of two ends of one straight line passing through another central point rather than the above-selected central point, wherein the other central point is in an end portion where the central point was not extracted.

The three arbitrary points related to the average thickness T1 of the fluorine-containing layer in the central portion 341 are three points in total including one point of the central point in the central portion 341 of the negative electrode active material layer 34 taken out by disassembling the lithium ion secondary battery, and two points of two ends of one straight line passing through the central point.

The three arbitrary points related to the average thickness T2 of the fluorine-containing layer in the first end portion 342 and the second end portion 343 are three points in total including one point of a center point selected from a first center point of the first end portion 342 and a second center point of the second end portion 343 taken out by disassembling the lithium ion secondary battery, and two points of two ends of one straight line passing through another central point rather than the above-selected central point, wherein the other central point is in an end portion where the central point was not extracted.

No significant difference was observed between the fluorine content distribution in the negative electrode active material layer 34 after charge and discharge of single cycle or multi-cycle and the fluorine content distribution in the negative electrode active material layer 34 after 1000 cycles.

The fluorine content F1 in the central portion 341 of the negative electrode active material layer 34; the average fluorine content F2 in the first end portion 342 and the second end portion 343; the fluorine contents F3-1 to F3-3 at three arbitrary points of the first end portion 342 and the second end portion 343; their ratios; and cycle characteristics after 1000 cycles, all of which were obtained from Examples 26 to 33 and Comparative Examples 4 to 6, are shown in Table 2. The average thickness T1 of the fluorine-containing layer in the central portion 341; the average thickness T2 of the fluorine-containing layer in the first end portion 342 and the second end portion 343; the thicknesses T3-1 to T3-3 of the fluorine-containing layer at arbitrary points of the first end portion 342 and the second end portion 343; and their ratios, all of which are obtained from Examples 34 to 49, also shown in Table 2. The fluorine content F1 in the central portion 341, the average fluorine content F2 in the first end portion 342 and the second end portion 343 are the fluorine content after single cycle or multi-cycle of charge and discharge performed in the degassing/aging process before product shipment. The average fluorine content F2 is an average value of the fluorine contents F3-1 to F3-3 at three arbitrary points. The average thickness T2 of the fluorine-containing layer is an average value of the thicknesses T3-1 to T3-3 of the fluorine-containing layer at the three arbitrary points.

TABLE 2

|  | F3-1 | F3-2 | F3-3 | F1 | F2 | F1/F2 | F1/F3-1 | F1/F3-2 | F1/F3-3 |
| --- | --- | --- | --- | --- | --- | --- | --- | --- | --- |
| Example 26 | 17.10 | 17.13 | 17.22 | 18.77 | 17.15 | 1.09 | 1.10 | 1.10 | 1.09 |
| Example 27 | 17.01 | 17.10 | 17.04 | 18.68 | 17.05 | 1.10 | 1.10 | 1.09 | 1.10 |
| Example 28 | 15.69 | 15.51 | 15.44 | 18.59 | 15.55 | 1.20 | 1.18 | 1.20 | 1.20 |
| Example 29 | 15.33 | 15.32 | 15.31 | 18.66 | 15.32 | 1.22 | 1.22 | 1.22 | 1.22 |
| Example 30 | 17.09 | 15.49 | 15.92 | 18.65 | 16.17 | 1.15 | 1.09 | 1.20 | 1.17 |
| Example 31 | 16.82 | 17.01 | 16.34 | 18.66 | 16.72 | 1.12 | 1.11 | 1.10 | 1.14 |
| Example 32 | 17.23 | 15.71 | 17.97 | 18.67 | 16.97 | 1.10 | 1.08 | 1.19 | 1.04 |
| Example 33 | 17.30 | 16.95 | 16.4 | 18.64 | 18.53 | 1.01 | 1.08 | 1.10 | 1.14 |
| Comparative example 4 | 14.90 | 15.32 | 15.37 | 18.67 | 15.20 | 1.23 | 1.25 | 1.22 | 1.21 |
| Comparative example 5 | 18.99 | 17.78 | 19.95 | 18.67 | 18.91 | 0.99 | 0.98 | 1.05 | 0.94 |
| Comparative example 6 | 18.68 | 18.63 | 18.70 | 18.67 | 18.67 | 1.00 | 1.00 | 1.00 | 1.00 |
| Example 34 | 17.01 | 17.10 | 17.04 | 18.68 | 17.05 | 1.10 | 1.10 | 1.09 | 1.10 |
| Example 35 | 17.01 | 17.10 | 17.04 | 18.68 | 17.05 | 1.10 | 1.10 | 1.09 | 1.10 |
| Example 36 | 17.01 | 17.10 | 17.04 | 18.68 | 17.05 | 1.10 | 1.10 | 1.09 | 1.10 |
| Example 37 | 17.01 | 17.10 | 17.04 | 18.68 | 17.05 | 1.10 | 1.10 | 1.09 | 1.10 |
| Example 38 | 17.01 | 17.10 | 17.04 | 18.68 | 17.05 | 1.10 | 1.10 | 1.09 | 1.10 |

TABLE 2-continued

| | | | | | | | | | |
|---|---|---|---|---|---|---|---|---|---|
| Example 39 | 17.01 | 17.10 | 17.04 | 18.68 | 17.05 | 1.10 | 1.10 | 1.09 | 1.10 |
| Example 40 | 17.01 | 17.1 | 17.04 | 18.68 | 17.05 | 1.10 | 1.10 | 1.09 | 1.10 |
| Example 41 | 17.01 | 17.10 | 17.04 | 18.68 | 17.05 | 1.10 | 1.10 | 1.09 | 1.10 |
| Example 42 | 18.7 | 15.52 | 16.92 | 18.68 | 17.05 | 1.10 | 1.00 | 1.20 | 1.10 |
| Example 43 | 18.85 | 19.01 | 15.52 | 18.68 | 17.95 | 1.05 | 0.99 | 0.98 | 1.20 |
| Example 44 | 14.97 | 18.29 | 17.89 | 18.68 | 17.05 | 1.10 | 1.25 | 1.02 | 1.04 |
| Example 45 | 18.55 | 15.15 | 15.09 | 18.68 | 16.26 | 1.15 | 1.01 | 1.23 | 1.24 |
| Example 46 | 17.01 | 17.10 | 17.04 | 18.68 | 17.05 | 1.10 | 1.10 | 1.09 | 1.10 |
| Example 47 | 17.01 | 17.10 | 17.04 | 18.68 | 17.05 | 1.10 | 1.10 | 1.09 | 1.10 |
| Example 48 | 17.01 | 17.10 | 17.04 | 18.68 | 17.05 | 1.10 | 1.10 | 1.09 | 1.10 |
| Example 49 | 17.01 | 17.10 | 17.04 | 18.68 | 17.05 | 1.10 | 1.10 | 1.09 | 1.10 |

| | T3-1 | T3-2 | T3-2 | T1 | T2 | T1/T2 | T1/T3-1 | T1/T3-2 | T1/T3-3 | Cycle Characteristics @1000 cycle (%) | Fluorine-Containing Layer |
|---|---|---|---|---|---|---|---|---|---|---|---|
| Example 26 | — | — | — | — | — | — | — | — | — | 87.3 | No |
| Example 27 | — | — | — | — | — | — | — | — | — | 87.5 | No |
| Example 28 | — | — | — | — | — | — | — | — | — | 87.1 | No |
| Example 29 | — | — | — | — | — | — | — | — | — | 87.8 | No |
| Example 30 | — | — | — | — | — | — | — | — | — | 88.3 | No |
| Example 31 | — | — | — | — | — | — | — | — | — | 88.6 | No |
| Example 32 | — | — | — | — | — | — | — | — | — | 88.2 | No |
| Example 33 | — | — | — | — | — | — | — | — | — | 88.5 | No |
| Comparative example 4 | — | — | — | — | — | — | — | — | — | 75.2 | No |
| Comparative example 5 | — | — | — | — | — | — | — | — | — | 75.6 | No |
| Comparative example 6 | — | — | — | — | — | — | — | — | — | 75.3 | No |
| Example 34 | 10.2 | 10.7 | 11.2 | 11.3 | 10.7 | 1.06 | 1.11 | 1.06 | 1.01 | 89.3 | Yes |
| Example 35 | 8.8 | 10.9 | 14.5 | 14.7 | 11.4 | 1.29 | 1.67 | 1.35 | 1.01 | 89.1 | Yes |
| Example 36 | 13.2 | 13.2 | 13.2 | 15.2 | 13.2 | 1.15 | 1.15 | 1.15 | 1.15 | 89.5 | Yes |
| Example 37 | 16.8 | 16.6 | 16.1 | 17.2 | 16.5 | 1.04 | 1.02 | 1.04 | 1.07 | 89.8 | Yes |
| Example 38 | 5.5 | 5.6 | 5.5 | 9.8 | 5.5 | 1.78 | 1.78 | 1.75 | 1.78 | 89.1 | present |
| Example 39 | 4.8 | 4.2 | 5.4 | 7.5 | 4.8 | 1.56 | 1.56 | 1.79 | 1.39 | 89.4 | present |
| Example 40 | 3.8 | 2.9 | 2.9 | 5.1 | 3.2 | 1.59 | 1.34 | 1.76 | 1.76 | 89.3 | present |
| Example 41 | 3.0 | 2.7 | 2.7 | 4.8 | 2.8 | 1.71 | 1.6 | 1.78 | 1.78 | 89.3 | present |
| Example 42 | 10.2 | 10.7 | 11.2 | 11.3 | 10.7 | 1.06 | 1.11 | 1.06 | 1.01 | 81.2 | present |
| Example 43 | 10.2 | 10.2 | 11.2 | 10.3 | 10.7 | 1.06 | 1.11 | 1.06 | 1.01 | 79.9 | present |
| Example 44 | 10.2 | 10.7 | 11.2 | 10.3 | 10.7 | 1.06 | 1.11 | 1.06 | 1.01 | 82.1 | present |
| Example 45 | 10.2 | 10.7 | 11.2 | 10.3 | 10.7 | 1.06 | 1.11 | 1.06 | 1.01 | 79.2 | present |
| Example 46 | 12.1 | 7.3 | 12.2 | 12.2 | 10.5 | 1.16 | 1.01 | 1.67 | 1.00 | 80.5 | present |
| Example 47 | 12.2 | 6.8 | 12.5 | 12.2 | 10.5 | 1.16 | 1.00 | 1.79 | 0.98 | 76.9 | present |
| Example 48 | 12.1 | 6.7 | 12.1 | 12.2 | 10.3 | 1.18 | 1.01 | 1.82 | 1.01 | 80.2 | present |
| Example 49 | 12.1 | 6.6 | 6.7 | 12.2 | 8.5 | 1.44 | 1.01 | 1.85 | 1.82 | 78.4 | present |

The ratio (F1/F2) of the fluorine content (F1) in the central portion 341 to the average fluorine content (F2) in the first end portion 342 and the second end portion 343 was 1.09. The cycle characteristics after 1000 cycles were 87.3%.

The ratio (F1/F3-1) of the fluorine content (F1) to the fluorine content (F3-1) at a first arbitrary point in the first end portion 342 and the second end portion 343 was 1.10. The ratio (F1/F3-2) of the fluorine content (F1) to the fluorine content (F3-2) at second arbitrary point in the first end portion 342 and the second end portion 343 was 1.10. The ratio (F1/F3-3) of the fluorine content (F1) to the fluorine content (F3-3) at a third arbitrary point in the first end portion 342 and the second end portion 343 was 1.09.

Example 27

A negative electrode was prepared in the same manner as in Example 26 except that in the step B2, a slurry prepared by mixing 40% by mass of the slurry A produced in the step B1 and 60% by mass of the slurry B produced in the step B1 was applied to the negative electrode current collector 32, so as to form a portion advanced by (⅙) L from the center between the first side and the second side toward the first side and the second side.

The ratio (F1/F2) of the fluorine content (F1) in the central portion 341 to the average fluorine content (F2) in the first end portion 342 and the second end portion 343 was 1.10. The cycle characteristics after 1000 cycles were 87.5%.

The ratio (F1/F3-1) of the fluorine content (F1) to the fluorine content (F3-1) at a first arbitrary point in the first end portion 342 and the second end portion 343 was 1.10. The ratio (F1/F3-2) of the fluorine content (F1) to the fluorine content (F3-2) at second arbitrary point in the first end portion 342 and the second end portion 343 was 1.09. The ratio (F1/F3-3) of the fluorine content (F1) to the fluorine content (F3-3) at third arbitrary point in the first end portion 342 and the second end portion 343 was 1.10.

Example 28

A negative electrode was prepared in the same manner as in Example 26 except that in the step B2, a slurry prepared by mixing 33% by mass of the slurry A produced in the step B1 and 67% by mass of the slurry B produced in the step B1 was applied to the negative electrode current collector 32, so as to form a portion advanced by (⅙) L from the center between the first side and the second side toward the first side and the second side.

The ratio (F1/F2) of the fluorine content (F1) in the central portion 341 to the average fluorine content (F2) in the first end portion 342 and the second end portion 343 was 1.20. The cycle characteristics after 1000 cycles were 87.1%.

The ratio (F1/F3-1) of the fluorine content (F1) to the fluorine content (F3-1) at a first arbitrary point in the first end portion 342 and the second end portion 343 was 1.18. The ratio (F1/F3-2) of the fluorine content (F1) to the fluorine content (F3-2) at second arbitrary point in the first end portion 342 and the second end portion 343 was 1.20. The ratio (F1/F3-3) of the fluorine content (F1) to the fluorine content (F3-3) at a third arbitrary point in the first end portion 342 and the second end portion 343 was 1.20.

Example 29

A negative electrode was prepared in the same manner as in Example 26 except that in the step B2, a slurry prepared by mixing 24% by mass of the slurry A produced in the step B1 and 76% by mass of the slurry B produced in the step B1 was applied to the negative electrode current collector 32, so as to form a portion advanced by (⅙) L from the center between the first side and the second side toward the first side and the second side.

The ratio (F1/F2) of the fluorine content (F1) in the central portion 341 to the average fluorine content (F2) in the first end portion 342 and the second end portion 343 was 1.22. The cycle characteristics after 1000 cycles were 87.8%.

The ratio (F1/F3-1) of the fluorine content (F1) to the fluorine content (F3-1) at a first arbitrary point in the first end portion 342 and the second end portion 343 was 1.22. The ratio (F1/F3-2) of the fluorine content (F1) to the fluorine content (F3-2) at second arbitrary point in the first end portion 342 and the second end portion 343 was 1.22. The ratio (F1/F3-3) of the fluorine content (F1) to the fluorine content (F3-3) at a third arbitrary point in the first end portion 342 and the second end portion 343 was 1.22.

Example 30

A negative electrode was prepared in the same manner as in Example 26 except that in the step B1, a 2% by mass solution of SURFLON was used as the additive to be added to the negative electrode mixture slurry B, and the additive was added so that the mass ratio of the phosphorus compound and other components was 4:96.

The ratio (F1/F2) of the fluorine content (F1) in the central portion 341 to the average fluorine content (F2) in the first end portion 342 and the second end portion 343 was 1.15. The cycle characteristics after 1000 cycles were 88.3%.

The ratio (F1/F3-1) of the fluorine content (F1) to the fluorine content (F3-1) at a first arbitrary point in the first end portion 342 and the second end portion 343 was 1.09. The ratio (F1/F3-2) of the fluorine content (F1) to the fluorine content (F3-2) at second arbitrary point in the first end portion 342 and the second end portion 343 was 1.20. The ratio (F1/F3-3) of the fluorine content (F1) to the fluorine content (F3-3) at a third arbitrary point in the first end portion 342 and the second end portion 343 was 1.17.

Example 31

A negative electrode was prepared in the same manner as in Example 26 except that in the step B 1, a 2% by mass solution of FC-4430 (manufactured by 3M) was used as the additive to be added to the negative electrode mixture slurry B, and the additive was added so that the mass ratio of the additive and other components was 4:96.

The ratio (F1/F2) of the fluorine content (F1) in the central portion 341 to the average fluorine content (F2) in the first end portion 342 and the second end portion 343 was 1.12. The cycle characteristics after 1000 cycles were 88.6%.

The ratio (F1/F3-1) of the fluorine content (F1) to the fluorine content (F3-1) at a first arbitrary point in the first end portion 342 and the second end portion 343 was 1.11. The ratio (F1/F3-2) of the fluorine content (F1) to the fluorine content (F3-2) at second arbitrary point in the first end portion 342 and the second end portion 343 was 1.10. The ratio (F1/F3-3) of the fluorine content (F1) to the fluorine content (F3-3) at a third arbitrary point in the first end portion 342 and the second end portion 343 was 1.14.

Example 32

A negative electrode was prepared in the same manner as in Example 26 except that in the step B1, a 2% by mass solution of POLYFLON PTFE LUBRON (manufactured by Daikin) was used as the additive to be added to the negative electrode mixture slurry B, and the additive was added so that the mass ratio of the additive and other components was 4:96.

The ratio (F1/F2) of the fluorine content (F1) in the central portion 341 to the average fluorine content (F2) in the first end portion 342 and the second end portion 343 was 1.10. The cycle characteristics after 1000 cycles were 88.2%.

The ratio (F1/F3-1) of the fluorine content (F1) to the fluorine content (F3-1) at a first arbitrary point in the first end portion 342 and the second end portion 343 was 1.08. The ratio (F1/F3-2) of the fluorine content (F1) to the fluorine content (F3-2) at second arbitrary point in the first end portion 342 and the second end portion 343 was 1.19. The ratio (F1/F3-3) of the fluorine content (F1) to the fluorine content (F3-3) at a third arbitrary point in the first end portion 342 and the second end portion 343 was 1.04.

Example 33

A negative electrode was prepared in the same manner as in Example 26 except that in the step B1, a 2% by mass solution of POLYFLON MPA (manufactured by Daikin) was used as the additive to be added to the negative electrode mixture slurry B, and the additive was added so that the mass ratio of the additive and other components was 4:96.

The ratio (F1/F2) of the fluorine content (F1) in the central portion 341 to the average fluorine content (F2) in the first end portion 342 and the second end portion 343 was 1.01. The cycle characteristics after 1000 cycles were 88.5%.

The ratio (F1/F3-1) of the fluorine content (F1) to the fluorine content (F3-1) at a first arbitrary point in the first end portion 342 and the second end portion 343 was 1.08. The ratio (F1/F3-2) of the fluorine content (F1) to the fluorine content (F3-2) at second arbitrary point in the first end portion 342 and the second end portion 343 was 1.10. The ratio (F1/F3-3) of the fluorine content (F1) to the fluorine content (F3-3) at a third arbitrary point in the first end portion 342 and the second end portion 343 was 1.14.

Comparative Example 4

A negative electrode was prepared in the same manner as in Example 26 except that in the step B2, a slurry prepared by mixing 20% by mass of the slurry A produced in the step B1 and 80% by mass of the slurry B produced in the step B1 was applied to the negative electrode current collector 32, so as to form a portion advanced by (⅙) L from the center between the first side and the second side toward the first side and the second side.

The ratio (F1/F2) of the fluorine content (F1) in the central portion 341 to the average fluorine content (F2) in the first end portion 342 and the second end portion 343 was 1.23. The cycle characteristics after 1000 cycles were 75.2%.

The ratio (F1/F3-1) of the fluorine content (F1) to the fluorine content (F3-1) at a first arbitrary point in the first end portion 342 and the second end portion 343 was 1.25. The ratio (F1/F3-2) of the fluorine content (F1) to the fluorine content (F3-2) at second arbitrary point in the first end portion 342 and the second end portion 343 was 1.22. The ratio (F1/F3-3) of the fluorine content (F1) to the fluorine content (F3-3) at a third arbitrary point in the first end portion 342 and the second end portion 343 was 1.21.

Comparative Example 5

A negative electrode was prepared in the same manner as in Example 26 except that in the step B1, only the negative electrode mixture slurry B was produced, and that in the step B2, the slurry B was applied to the first end portion 342, the second end portion 343, and the central portion 341.

The ratio (F1/F2) of the fluorine content (F1) in the central portion 341 to the average fluorine content (F2) in the first end portion 342 and the second end portion 343 was 0.99. The cycle characteristics after 1000 cycles were 75.6%.

The ratio (F1/F3-1) of the fluorine content (F1) to the fluorine content (F3-1) at a first arbitrary point in the first end portion 342 and the second end portion 343 was 0.98. The ratio (F1/F3-2) of the fluorine content (F1) to the fluorine content (F3-2) at second arbitrary point in the first end portion 342 and the second end portion 343 was 1.05. The ratio (F1/F3-3) of the fluorine content (F1) to the fluorine content (F3-3) at a third arbitrary point in the first end portion 342 and the second end portion 343 was 0.94.

Comparative Example 6

A negative electrode was prepared in the same manner as in Example 26 except that in the step B2, a slurry prepared by mixing 10% by mass of the negative electrode slurry A and 90% by mass of the negative electrode slurry B was used; and the resulting mixture slurry was applied to the first end portion 342, the second end portion 343, and the central portion 341.

The ratio (F1/F2) of the fluorine content (F1) in the central portion 341 to the average fluorine content (F2) in the first end portion 342 and the second end portion 343 was 1.00. The cycle characteristics after 1000 cycles were 75.3%.

The ratio (F1/F3-1) of the fluorine content (F1) to the fluorine content (F3-1) at a first arbitrary point in the first end portion 342 and the second end portion 343 was 1.00. The ratio (F1/F3-2) of the fluorine content (F1) to the fluorine content (F3-2) at second arbitrary point in the first end portion 342 and the second end portion 343 was 1.00. The ratio (F1/F3-3) of the fluorine content (F1) to the fluorine content (F3-3) at a third arbitrary point in the first end portion 342 and the second end portion 343 was 1.00.

Example 34

In the step B2, only the slurry A was applied to the entire surface of the negative electrode current collector 32. On top of the resulting electrode, a 1% by mass solution of SUR-FLON as a additive was applied using an applicator. A portion advanced by (⅓) L from the first side toward the second side and a portion advanced by (⅓) L from the second side toward the first side were coated with an applicator gap of 10 μm. A portion advanced by (⅙) L from the center of the first side and the second side toward the first side and the second side was coated with an applicator gap of 15 μm. A negative electrode was prepared in the same manner as in Example 26 except that the obtained negative electrode 30 was used.

The ratio (F1/F2) of the fluorine content (F1) in the central portion 341 to the average fluorine content (F2) in the first end portion 342 and the second end portion 343 was 1.10. The cycle characteristics after 1000 cycles were 89.3%.

The ratio (F1/F3-1) of the fluorine content (F1) to the fluorine content (F3-1) at a first arbitrary point in the first end portion 342 and the second end portion 343 was 1.10. The ratio (F1/F3-2) of the fluorine content (F1) to the fluorine content (F3-2) at second arbitrary point in the first end portion 342 and the second end portion 343 was 1.09. The ratio (F1/F3-3) of the fluorine content (F1) to the fluorine content (F3-3) at third arbitrary point in the first end portion 342 and the second end portion 343 was 1.10.

The ratio (T1/T2) of the average thickness T1 [μm] of the fluorine-containing layer in the central portion 341 to the average thickness T2 [μm] of the fluorine-containing layer in the first end portion 342 and the second end portion 343 was 1.1. T1 was 11.3 μm.

The ratio (T1/T3-1) of the average thickness T1 [μm] of the fluorine-containing layer in the central portion 341 to the thickness T3-1 [μm] of the fluorine-containing layer at first arbitrary point of the first end portion 342 and the second end portion 343 was 1.11. The ratio (T1/T3-2) of the average thickness T1 [μm] of the fluorine-containing layer in the central portion 341 to the thickness T3-2 [μm] of the fluorine-containing layer at second arbitrary point of the first end portion 342 and the second end portion 343 was 1.06. The ratio (T1/T3-3) of the average thickness T1 [μm] of the fluorine-containing layer in the central portion 341 to the thickness T3-3 [μm] of the fluorine-containing layer at third arbitrary point of the first end portion 342 and the second end portion 343 was 1.01.

Example 35

A negative electrode was prepared in the same manner as in Example 34 except that in the step B2, the portion advanced by (⅓) L from the first side to the second side and the portion advanced by (⅓) L from the second side to the first side were coated with a gap of 12 μm, and a portion advanced by (⅙) L from the center of the first side and the second side toward the first side and the second side was coated with an applicator gap of 15 μm.

The ratio (F1/F2) of the fluorine content (F1) in the central portion 341 to the average fluorine content (F2) in the first end portion 342 and the second end portion 343 was 1.10. The cycle characteristics after 1000 cycles were 89.1%.

The ratio (F1/F3-1) of the fluorine content (F1) to the fluorine content (F3-1) at a first arbitrary point in the first end portion 342 and the second end portion 343 was 1.10. The ratio (F1/F3-2) of the fluorine content (F1) to the fluorine content (F3-2) at second arbitrary point in the first end portion 342 and the second end portion 343 was 1.09. The ratio (F1/F3-3) of the fluorine content (F1) to the fluorine content (F3-3) at third arbitrary point in the first end portion 342 and the second end portion 343 was 1.10.

The ratio (T1/T2) between the average thickness T1 [μm] of the fluorine-containing layer in the central portion 341 and the average thickness T2 [μm] of the fluorine-containing layer in the first end portion 342 and the second end portion 343 was 1.3. Further, T1 was 14.7 μm.

The ratio (T1/T3-1) of the average thickness T1 [μm] of the fluorine-containing layer in the central portion 341 to the thickness T3-1 [μm] of the fluorine-containing layer at first arbitrary point of the first end portion 342 and the second end portion 343 was 1.67. The ratio (T1/T3-2) of the average thickness T1 [μm] of the fluorine-containing layer in the central portion 341 to the thickness T3-2 [μm] of the fluorine-containing layer at second arbitrary point of the first end portion 342 and the second end portion 343 was 1.35. The ratio (T1/T3-3) of the average thickness T1 [μm] of the fluorine-containing layer in the central portion 341 to the thickness T3-3 [μm] of the fluorine-containing layer at third arbitrary point of the first end portion 342 and the second end portion 343 was 1.01.

Example 36

A negative electrode was prepared in the same manner as in Example 34 except that in the step B2, the portion advanced by (⅓) L from the first side to the second side and the portion advanced by (⅓) L from the second side to the first side were coated with a gap of 18 μm, and a portion advanced by (⅙) L from the center of the first side and the second side toward the first side and the second side was coated with an applicator gap of 20 μm.

The ratio (F1/F2) of the fluorine content (F1) in the central portion 341 to the average fluorine content (F2) in the first end portion 342 and the second end portion 343 was 1.10. The cycle characteristics after 1000 cycles were 89.5%.

The ratio (F1/F3-1) of the fluorine content (F1) to the fluorine content (F3-1) at a first arbitrary point in the first end portion 342 and the second end portion 343 was 1.10. The ratio (F1/F3-2) of the fluorine content (F1) to the fluorine content (F3-2) at second arbitrary point in the first end portion 342 and the second end portion 343 was 1.09. The ratio (F1/F3-3) of the fluorine content (F1) to the fluorine content (F3-3) at third arbitrary point in the first end portion 342 and the second end portion 343 was 1.10.

The ratio (T1/T2) between the average thickness T1 [μm] of the fluorine-containing layer in the central portion 341 and the average thickness T2 [μm] of the fluorine-containing layer in the first end portion 342 and the second end portion 343 was 1.2. T1 was 15.2 μm.

The ratio (T1/T3-1) of the average thickness T1 [μm] of the fluorine-containing layer in the central portion 341 to the thickness T3-1 [μm] of the fluorine-containing layer at first arbitrary point of the first end portion 342 and the second end portion 343 was 1.15. The ratio (T1/T3-2) of the average thickness T1 [μm] of the fluorine-containing layer in the central portion 341 to the thickness T3-2 [μm] of the fluorine-containing layer at second arbitrary point of the first end portion 342 and the second end portion 343 was 1.15. The ratio (T1/T3-3) of the average thickness T1 [μm] of the fluorine-containing layer in the central portion 341 to the thickness T3-3 [μm] of the fluorine-containing layer at third arbitrary point of the first end portion 342 and the second end portion 343 was 1.15.

Example 37

A negative electrode was prepared in the same manner as in Example 34 except that in the step B2, the portion advanced by (⅓) L from the first side to the second side and the portion advanced by (⅓) L from the second side to the first side were coated with a gap of 22 μm, and a portion advanced by (⅙) L from the center of the first side and the second side toward the first side and the second side was coated with an applicator gap of 26 μm.

The ratio (F1/F2) of the fluorine content (F1) in the central portion 341 to the average fluorine content (F2) in the first end portion 342 and the second end portion 343 was 1.10. The cycle characteristics after 1000 cycles were 89.8%.

The ratio (F1/F3-1) of the fluorine content (F1) to the fluorine content (F3-1) at a first arbitrary point in the first end portion 342 and the second end portion 343 was 1.10. The ratio (F1/F3-2) of the fluorine content (F1) to the fluorine content (F3-2) at second arbitrary point in the first end portion 342 and the second end portion 343 was 1.09. The ratio (F1/F3-3) of the fluorine content (F1) to the fluorine content (F3-3) at third arbitrary point in the first end portion 342 and the second end portion 343 was 1.10.

The ratio (T1/T2) between the average thickness T1 [μm] of the fluorine-containing layer in the central portion 341 and the average thickness T2 [μm] of the fluorine-containing layer in the first end portion 342 and the second end portion 343 was 1.0. T1 was 17.2 μm.

The ratio (T1/T3-1) of the average thickness T1 [μm] of the fluorine-containing layer in the central portion 341 to the thickness T3-1 [μm] of the fluorine-containing layer at first arbitrary point of the first end portion 342 and the second end portion 343 was 1.02. The ratio (T1/T3-2) of the average thickness T1 [μm] of the fluorine-containing layer in the central portion 341 to the thickness T3-2 [μm] of the fluorine-containing layer at second arbitrary point of the first end portion 342 and the second end portion 343 was 1.04. The ratio (T1/T3-3) of the average thickness T1 [μm] of the fluorine-containing layer in the central portion 341 to the thickness T3-3 [μm] of the fluorine-containing layer at third arbitrary point of the first end portion 342 and the second end portion 343 was 1.07.

Example 38

A negative electrode was prepared in the same manner as in Example 34 except that in the step B2, the portion advanced by (⅓) L from the first side to the second side and the portion advanced by (⅓) L from the second side to the first side were coated with a gap of 8 μm, and a portion advanced by (⅙) L from the center of the first side and the second side toward the first side and the second side was coated with an applicator gap of 13 μm.

The ratio (F1/F2) of the fluorine content (F1) in the central portion 341 to the average fluorine content (F2) in the first end portion 342 and the second end portion 343 was 1.10. The cycle characteristics after 1000 cycles were 89.1%.

The ratio (F1/F3-1) of the fluorine content (F1) to the fluorine content (F3-1) at a first arbitrary point in the first end portion 342 and the second end portion 343 was 1.10. The ratio (F1/F3-2) of the fluorine content (F1) to the fluorine content (F3-2) at second arbitrary point in the first end portion 342 and the second end portion 343 was 1.09. The ratio (F1/F3-3) of the fluorine content (F1) to the fluorine content (F3-3) at third arbitrary point in the first end portion 342 and the second end portion 343 was 1.10.

The ratio (T1/T2) of the average thickness T1 [μm] of the fluorine-containing layer in the central portion 341 to the average thickness T2 [μm] of the fluorine-containing layer in the first end portion 342 and the second end portion 343 was 1.8. T1 was 9.8 μm.

The ratio (T1/T3-1) of the average thickness T1 [μm] of the fluorine-containing layer in the central portion 341 to the thickness T3-1 [μm] of the fluorine-containing layer at first arbitrary point of the first end portion 342 and the second end portion 343 was 1.78. The ratio (T1/T3-2) of the average thickness T1 [μm] of the fluorine-containing layer in the central portion 341 to the thickness T3-2 [μm] of the fluorine-containing layer at second arbitrary point of the first end portion 342 and the second end portion 343 was 1.75. The ratio (T1/T3-3) of the average thickness T1 [μm] of the fluorine-containing layer in the central portion 341 to the thickness T3-3 [μm] of the fluorine-containing layer at third arbitrary point of the first end portion 342 and the second end portion 343 was 1.78.

Example 39

A negative electrode was prepared in the same manner as in Example 34 except that in the step B2, the portion advanced by (⅓) L from the first side to the second side and the portion advanced by (⅓) L from the second side to the first side were coated with a gap of 7 μm, and a portion advanced by (⅙) L from the center of the first side and the second side toward the first side and the second side was coated with an applicator gap of 9 μm.

The ratio (F1/F2) of the fluorine content (F1) in the central portion 341 to the average fluorine content (F2) in the first end portion 342 and the second end portion 343 was 1.10. The cycle characteristics after 1000 cycles were 89.4%.

The ratio (F1/F3-1) of the fluorine content (F1) to the fluorine content (F3-1) at a first arbitrary point in the first end portion 342 and the second end portion 343 was 1.10. The ratio (F1/F3-2) of the fluorine content (F1) to the fluorine content (F3-2) at second arbitrary point in the first end portion 342 and the second end portion 343 was 1.09. The ratio (F1/F3-3) of the fluorine content (F1) to the fluorine content (F3-3) at third arbitrary point in the first end portion 342 and the second end portion 343 was 1.10.

The ratio (T1/T2) of the average thickness T1 [μm] of the fluorine-containing layer in the central portion 341 to the average thickness T2 [μm] of the fluorine-containing layer in the first end portion 342 and the second end portion 343 was 1.6. T1 was 7.5 μm.

The ratio (T1/T3-1) of the average thickness T1 [μm] of the fluorine-containing layer in the central portion 341 to the thickness T3-1 [μm] of the fluorine-containing layer at first arbitrary point of the first end portion 342 and the second end portion 343 was 1.56. The ratio (T1/T3-2) of the average thickness T1 [μm] of the fluorine-containing layer in the central portion 341 to the thickness T3-2 [μm] of the fluorine-containing layer at second arbitrary point of the first end portion 342 and the second end portion 343 was 1.79. The ratio (T1/T3-3) of the average thickness T1 [μm] of the fluorine-containing layer in the central portion 341 to the thickness T3-3 [μm] of the fluorine-containing layer at third arbitrary point of the first end portion 342 and the second end portion 343 was 1.39.

Example 40

A negative electrode was prepared in the same manner as in Example 34 except that in the step B2, the portion advanced by (⅓) L from the first side to the second side and the portion advanced by (⅓) L from the second side to the first side were coated with a gap of 5 μm, and a portion advanced by (⅙) L from the center of the first side and the second side toward the first side and the second side was coated with an applicator gap of 7 μm.

The ratio (F1/F2) of the fluorine content (F1) in the central portion 341 to the average fluorine content (F2) in the first end portion 342 and the second end portion 343 was 1.10. The cycle characteristics after 1000 cycles were 89.3%.

The ratio (F1/F3-1) of the fluorine content (F1) to the fluorine content (F3-1) at a first arbitrary point in the first end portion 342 and the second end portion 343 was 1.10. The ratio (F1/F3-2) of the fluorine content (F1) to the fluorine content (F3-2) at second arbitrary point in the first end portion 342 and the second end portion 343 was 1.09. The ratio (F1/F3-3) of the fluorine content (F1) to the fluorine content (F3-3) at third arbitrary point in the first end portion 342 and the second end portion 343 was 1.10.

The ratio (T1/T2) of the average thickness T1 [μm] of the fluorine-containing layer in the central portion 341 to the average thickness T2 [μm] of the fluorine-containing layer in the first end portion 342 and the second end portion 343 was 1.6. Further, T1 was 5.1 μm.

The ratio (T1/T3-1) of the average thickness T1 [μm] of the fluorine-containing layer in the central portion 341 to the thickness T3-1 [μm] of the fluorine-containing layer at first arbitrary point of the first end portion 342 and the second end portion 343 was 1.34. The ratio (T1/T3-2) of the average thickness T1 [μm] of the fluorine-containing layer in the central portion 341 to the thickness T3-2 [μm] of the fluorine-containing layer at second arbitrary point of the first end portion 342 and the second end portion 343 was 1.76. The ratio (T1/T3-3) of the average thickness T1 [μm] of the fluorine-containing layer in the central portion 341 to the thickness T3-3 [μm] of the fluorine-containing layer at third arbitrary point of the first end portion 342 and the second end portion 343 was 1.76.

Example 41

A negative electrode was prepared in the same manner as in Example 34 except that in the step B2, the portion advanced by (⅓) L from the first side to the second side and the portion advanced by (⅓) L from the second side to the first side were coated with a gap of 4 μm, and a portion advanced by (⅙) L from the center of the first side and the second side toward the first side and the second side was coated with an applicator gap of 6 μm.

The ratio (F1/F2) of the fluorine content (F1) in the central portion 341 to the average fluorine content (F2) in the first end portion 342 and the second end portion 343 was 1.10. The cycle characteristics after 1000 cycles were 89.3%.

The ratio (F1/F3-1) of the fluorine content (F1) to the fluorine content (F3-1) at a first arbitrary point in the first end portion 342 and the second end portion 343 was 1.10. The ratio (F1/F3-2) of the fluorine content (F1) to the fluorine content (F3-2) at second arbitrary point in the first end portion 342 and the second end portion 343 was 1.09. The ratio (F1/F3-3) of the fluorine content (F1) to the fluorine content (F3-3) at third arbitrary point in the first end portion 342 and the second end portion 343 was 1.10.

The ratio (T1/T2) of the average thickness T1 [μm] of the fluorine-containing layer in the central portion 341 to the average thickness T2 [μm] of the fluorine-containing layer in the first end portion 342 and the second end portion 343 was 1.7. Moreover, T1 was 4.8 micrometers.

The ratio (T1/T3-1) of the average thickness T1 [μm] of the fluorine-containing layer in the central portion 341 to the thickness T3-1 [μm] of the fluorine-containing layer at first arbitrary point of the first end portion 342 and the second end portion 343 was 1.60. The ratio (T1/T3-2) of the average thickness T1 [μm] of the fluorine-containing layer in the central portion 341 to the thickness T3-2 [μm] of the fluorine-containing layer at second arbitrary point of the first end portion 342 and the second end portion 343 was 1.78. The ratio (T1/T3-3) of the average thickness T1 [μm] of the fluorine-containing layer in the central portion 341 to the thickness T3-3 [μm] of the fluorine-containing layer at third arbitrary point of the first end portion 342 and the second end portion 343 was 1.78.

Example 42

A negative electrode was prepared in the same manner as in Example 34 except that in the step B 1, a solution which was obtained by mixing 50% by mass of a 1% by mass solution of SURFLON and 50% by mass of a 2% by mass solution of SURFLON was used as a additive.

The ratio (F1/F2) of the fluorine content (F1) in the central portion 341 to the average fluorine content (F2) in the first end portion 342 and the second end portion 343 was 1.10. The cycle characteristics after 1000 cycles were 81.2%.

The ratio (F1/F3-1) of the fluorine content (F1) to the fluorine content (F3-1) at a first arbitrary point in the first end portion 342 and the second end portion 343 was 1.00. The ratio (F1/F3-2) of the fluorine content (F1) to the fluorine content (F3-2) at second arbitrary point in the first end portion 342 and the second end portion 343 was 1.20. The ratio (F1/F3-3) of the fluorine content (F1) to the fluorine content (F3-3) at third arbitrary point in the first end portion 342 and the second end portion 343 was 1.10.

The ratio (T1/T2) of the average thickness T1 [μm] of the fluorine-containing layer in the central portion 341 to the average thickness T2 [μm] of the fluorine-containing layer in the first end portion 342 and the second end portion 343 was 1.1. T1 was 11.3 μm.

The ratio (T1/T3-1) of the average thickness T1 [μm] of the fluorine-containing layer in the central portion 341 to the thickness T3-1 [μm] of the fluorine-containing layer at first arbitrary point of the first end portion 342 and the second end portion 343 was 1.11. The ratio (T1/T3-2) of the average thickness T1 [μm] of the fluorine-containing layer in the central portion 341 to the thickness T3-2 [μm] of the fluorine-containing layer at second arbitrary point of the first end portion 342 and the second end portion 343 was 1.06. The ratio (T1/T3-3) of the average thickness T1 [μm] of the fluorine-containing layer in the central portion 341 to the thickness T3-3 [μm] of the fluorine-containing layer at third arbitrary point of the first end portion 342 and the second end portion 343 was 1.01.

Example 43

A negative electrode was prepared in the same manner as in Example 34 except that in the step B1, a solution which was obtained by mixing 30% by mass of a 1% by mass solution of SURFLON and 70% by mass of a 2% by mass solution of SURFLON was used as a additive.

The ratio (F1/F2) of the fluorine content (F1) in the central portion 341 to the average fluorine content (F2) in the first end portion 342 and the second end portion 343 was 1.05. The cycle characteristics after 1000 cycles were 79.9%.

The ratio (F1/F3-1) of the fluorine content (F1) to the fluorine content (F3-1) at a first arbitrary point in the first end portion 342 and the second end portion 343 was 0.99. The ratio (F1/F3-2) of the fluorine content (F1) to the fluorine content (F3-2) at second arbitrary point in the first end portion 342 and the second end portion 343 was 0.98. The ratio (F1/F3-3) of the fluorine content (F1) to the fluorine content (F3-3) at a third arbitrary point in the first end portion 342 and the second end portion 343 was 1.20.

The ratio (T1/T2) of the average thickness T1 [μm] of the fluorine-containing layer in the central portion 341 to the average thickness T2 [μm] of the fluorine-containing layer in the first end portion 342 and the second end portion 343 was 1.1. T1 was 11.3 μm.

The ratio (T1/T3-1) of the average thickness T1 [μm] of the fluorine-containing layer in the central portion 341 to the thickness T3-1 [μm] of the fluorine-containing layer at first arbitrary point of the first end portion 342 and the second end portion 343 was 1.11. The ratio (T1/T3-2) of the average thickness T1 [μm] of the fluorine-containing layer in the central portion 341 to the thickness T3-2 [μm] of the fluorine-containing layer at second arbitrary point of the first end portion 342 and the second end portion 343 was 1.06. The ratio (T1/T3-3) of the average thickness T1 [μm] of the fluorine-containing layer in the central portion 341 to the thickness T3-3 [μm] of the fluorine-containing layer at third arbitrary point of the first end portion 342 and the second end portion 343 was 1.01.

Example 44

A negative electrode was prepared in the same manner as in Example 34 except that in the step B1, a solution which was obtained by mixing 20% by mass of a 1% by mass solution of SURFLON and 80% by mass of a 2% by mass solution of SURFLON was used as a additive.

The ratio (F1/F2) of the fluorine content (F1) in the central portion 341 to the average fluorine content (F2) in the first end portion 342 and the second end portion 343 was 1.10. The cycle characteristics after 1000 cycles were 82.1%.

The ratio (F1/F3-1) of the fluorine content (F1) to the fluorine content (F3-1) at a first arbitrary point in the first end portion 342 and the second end portion 343 was 1.25. The ratio (F1/F3-2) of the fluorine content (F1) to the fluorine content (F3-2) at a second arbitrary point in the first end portion 342 and the second end portion 343 was 1.02. The ratio (F1/F3-3) of the fluorine content (F1) to the fluorine content (F3-3) at a third arbitrary point in the first end portion 342 and the second end portion 343 was 1.04.

The ratio (T1/T2) of the average thickness T1 [μm] of the fluorine-containing layer in the central portion 341 to the average thickness T2 [μm] of the fluorine-containing layer in the first end portion 342 and the second end portion 343 was 1.1. T1 was 11.3 μm.

The ratio (T1/T3-1) of the average thickness T1 [μm] of the fluorine-containing layer in the central portion 341 to the thickness T3-1 [μm] of the fluorine-containing layer at first arbitrary point of the first end portion 342 and the second end portion 343 was 1.11. The ratio (T1/T3-2) of the average thickness T1 [μm] of the fluorine-containing layer in the central portion 341 to the thickness T3-2 [μm] of the fluorine-containing layer at second arbitrary point of the first end portion 342 and the second end portion 343 was 1.06. The ratio (T1/T3-3) of the average thickness T1 [μm] of the fluorine-containing layer in the central portion 341 to the thickness T3-3 [μm] of the fluorine-containing layer at third arbitrary point of the first end portion 342 and the second end portion 343 was 1.01.

Example 45

A negative electrode was prepared in the same manner as in Example 26 except that in the step B1, a solution which was obtained by mixing 60% by mass of B1% by mass solution of SURFLON and 40% by mass of a 2% by mass solution of SURFLON was used as an additive.

The ratio (F1/F2) of the fluorine content (F1) in the central portion 341 to the average fluorine content (F2) in the first end portion 342 and the second end portion 343 was 1.15. The cycle characteristics after 1000 cycles were 79.2%.

The ratio (F1/F3-1) of the fluorine content (F1) to the fluorine content (F3-1) at a first arbitrary point in the first end portion 342 and the second end portion 343 was 1.01. The ratio (F1/F3-2) of the fluorine content (F1) to the fluorine content (F3-2) at second arbitrary point in the first end portion 342 and the second end portion 343 was 1.23. The ratio (F1/F3-3) of the fluorine content (F1) to the fluorine content (F3-3) at a third arbitrary point in the first end portion 342 and the second end portion 343 was 1.24.

The ratio (T1/T2) of the average thickness T1 [μm] of the fluorine-containing layer in the central portion 341 to the average thickness T2 [μm] of the fluorine-containing layer in the first end portion 342 and the second end portion 343 was 1.1. T1 was 11.3 μm.

The ratio (T1/T3-1) of the average thickness T1 [μm] of the fluorine-containing layer in the central portion 341 to the thickness T3-1 [μm] of the fluorine-containing layer at first arbitrary point of the first end portion 342 and the second end portion 343 was 1.11. The ratio (T1/T3-2) of the average thickness T1 [μm] of the fluorine-containing layer in the central portion 341 to the thickness T3-2 [μm] of the fluorine-containing layer at second arbitrary point of the first end portion 342 and the second end portion 343 was 1.06. The ratio (T1/T3-3) of the average thickness T1 [μm] of the fluorine-containing layer in the central portion 341 to the thickness T3-3 [μm] of the fluorine-containing layer at third arbitrary point of the first end portion 342 and the second end portion 343 was 1.01.

Example 46

As a reproduction experiment of Example 34, a negative electrode was produced in the same manner as Example 34.

The ratio (F1/F2) of the fluorine content (F1) in the central portion 341 to the average fluorine content (F2) in the first end portion 342 and the second end portion 343 was 1.10. The cycle characteristics after 1000 cycles were 80.5%.

The ratio (F1/F3-1) of the fluorine content (F1) to the fluorine content (F3-1) at a first arbitrary point in the first end portion 342 and the second end portion 343 was 1.10. The ratio (F1/F3-2) of the fluorine content (F1) to the fluorine content (F3-2) at second arbitrary point in the first end portion 342 and the second end portion 343 was 1.09. The ratio (F1/F3-3) of the fluorine content (F1) to the fluorine content (F3-3) at third arbitrary point in the first end portion 342 and the second end portion 343 was 1.10.

The ratio (T1/T2) between the average thickness T1 [μm] of the fluorine-containing layer in the central portion 341 and the average thickness T2 [μm] of the fluorine-containing layer in the first end portion 342 and the second end portion 343 was 1.2. T1 was 12.2 μm.

The ratio (T1/T3-1) of the average thickness T1 [μm] of the fluorine-containing layer in the central portion 341 to the thickness T3-1 [μm] of the fluorine-containing layer at first arbitrary point of the first end portion 342 and the second end portion 343 was 1.01. The ratio (T1/T3-2) of the average thickness T1 [μm] of the fluorine-containing layer in the central portion 341 to the thickness T3-2 [μm] of the fluorine-containing layer at second arbitrary point of the first end portion 342 and the second end portion 343 was 1.67. The ratio (T1/T3-3) of the average thickness T1 [μm] of the fluorine-containing layer in the central portion 341 to the thickness T3-3 [μm] of the fluorine-containing layer at third arbitrary point of the first end portion 342 and the second end portion 343 was 1.00.

Example 47

As a reproduction experiment of Example 34, a negative electrode was produced in the same manner as Example 34.

The ratio (F1/F2) of the fluorine content (F1) in the central portion 341 to the average fluorine content (F2) in the first end portion 342 and the second end portion 343 was 1.10. The cycle characteristics after 1000 cycles were 76.9%.

The ratio (F1/F3-1) of the fluorine content (F1) to the fluorine content (F3-1) at a first arbitrary point in the first end portion 342 and the second end portion 343 was 1.10. The ratio (F1/F3-2) of the fluorine content (F1) to the fluorine content (F3-2) at second arbitrary point in the first end portion 342 and the second end portion 343 was 1.09. The ratio (F1/F3-3) of the fluorine content (F1) to the fluorine content (F3-3) at third arbitrary point in the first end portion 342 and the second end portion 343 was 1.10.

The ratio (T1/T2) between the average thickness T1 [μm] of the fluorine-containing layer in the central portion 341 and the average thickness T2 [μm] of the fluorine-containing layer in the first end portion 342 and the second end portion 343 was 1.2. T1 was 12.2 μm.

The ratio (T1/T3-1) of the average thickness T1 [μm] of the fluorine-containing layer in the central portion 341 to the thickness T3-1 [μm] of the fluorine-containing layer at first arbitrary point of the first end portion 342 and the second end portion 343 was 1.00. The ratio (T1/T3-2) of the average thickness T1 [μm] of the fluorine-containing layer in the central portion 341 to the thickness T3-2 [μm] of the fluorine-containing layer at second arbitrary point of the first end portion 342 and the second end portion 343 was 1.79. The ratio (T1/T3-3) of the average thickness T1 [μm] of the fluorine-containing layer in the central portion 341 to the thickness T3-3 [μm] of the fluorine-containing layer at third arbitrary point of the first end portion 342 and the second end portion 343 was 0.98.

Example 48

As a reproduction experiment of Example 34, a negative electrode was produced in the same manner as Example 34.

The ratio (F1/F2) of the fluorine content (F1) in the central portion 341 to the average fluorine content (F2) in the first end portion 342 and the second end portion 343 was 1.10. The cycle characteristics after 1000 cycles were 80.2%.

The ratio (F1/F3-1) of the fluorine content (F1) to the fluorine content (F3-1) at a first arbitrary point in the first end portion 342 and the second end portion 343 was 1.10. The ratio (F1/F3-2) of the fluorine content (F1) to the fluorine content (F3-2) at second arbitrary point in the first end portion 342 and the second end portion 343 was 1.09. The ratio (F1/F3-3) of the fluorine content (F1) to the fluorine content (F3-3) at third arbitrary point in the first end portion 342 and the second end portion 343 was 1.10.

The ratio (T1/T2) between the average thickness T1 [μm] of the fluorine-containing layer in the central portion 341 and the average thickness T2 [μm] of the fluorine-containing layer in the first end portion 342 and the second end portion 343 was 1.2. T1 was 12.2 μm.

The ratio (T1/T3-1) of the average thickness T1 [μm] of the fluorine-containing layer in the central portion 341 to the thickness T3-1 [μm] of the fluorine-containing layer at first arbitrary point of the first end portion 342 and the second end portion 343 was 1.01. The ratio (T1/T3-2) of the average thickness T1 [μm] of the fluorine-containing layer in the central portion 341 to the thickness T3-2 [μm] of the fluorine-containing layer at second arbitrary point of the first end portion 342 and the second end portion 343 was 1.82. The ratio (T1/T3-3) of the average thickness T1 [μm] of the fluorine-containing layer in the central portion 341 to the thickness T3-3 [μm] of the fluorine-containing layer at third arbitrary point of the first end portion 342 and the second end portion 343 was 1.01.

Example 49

As a reproduction experiment of Example 34, a negative electrode was produced in the same manner as Example 34.

The ratio (F1/F2) of the fluorine content (F1) in the central portion 341 to the average fluorine content (F2) in the first end portion 342 and the second end portion 343 was 1.10. The cycle characteristics after 1000 cycles were 78.4%.

The ratio (F1/F3-1) of the fluorine content (F1) to the fluorine content (F3-1) at a first arbitrary point in the first end portion 342 and the second end portion 343 was 1.10. The ratio (F1/F3-2) of the fluorine content (F1) to the fluorine content (F3-2) at second arbitrary point in the first end portion 342 and the second end portion 343 was 1.09. The ratio (F1/F3-3) of the fluorine content (F1) to the fluorine content (F3-3) at third arbitrary point in the first end portion 342 and the second end portion 343 was 1.10.

The ratio (T1/T2) between the average thickness T1 [μm] of the fluorine-containing layer in the central portion 341 and the average thickness T2 [μm] of the fluorine-containing layer in the first end portion 342 and the second end portion 343 was 1.4. T1 was 12.2 μm.

The ratio (T1/T3-1) of the average thickness T1 [μm] of the fluorine-containing layer in the central portion 341 to the thickness T3-1 [μm] of the fluorine-containing layer at first arbitrary point of the first end portion 342 and the second end portion 343 was 1.01. The ratio (T1/T3-2) of the average thickness T1 [μm] of the fluorine-containing layer in the central portion 341 to the thickness T3-2 [μm] of the fluorine-containing layer at second arbitrary point of the first end portion 342 and the second end portion 343 was 1.85. The ratio (T1/T3-3) of the average thickness T1 [μm] of the fluorine-containing layer in the central portion 341 to the thickness T3-3 [μm] of the fluorine-containing layer at third arbitrary point of the first end portion 342 and the second end portion 343 was 1.82.

In Examples 26 to 33, the ratio (F1/F2) of the fluorine content (F1) in the central portion 341 to the average fluorine content (F2) in the first end portion 342 and the second end portion 343 satisfies the relationship of 1<F1/F2≤1.22, and the cycle characteristics after 1000 cycles were 87.1% or more. This high cycle characteristics are due to stability of intercalation and de-intercalation of lithium ions and electron transfer during charge and discharge in a whole of the negative electrode, by forming an appropriate potential gradient between the central portion 341 and the first end portion 342, and between the central portion 341 and the second end portion 343.

In Examples 34 to 49, the average thickness T1 [μm] of the fluorine-containing layer in the central portion 341 and the average thickness T2 [μm] of the fluorine-containing layer in the first end portion 342 and the second end portion 343 satisfy both the relationship of 1<T1/T2≤1.80 and the relationship of T1≤10, and the cycle characteristics after 1000 cycles were 76.9% or more. This high cycle characteristics are due to the fact that the formation of wrinkles of the negative electrode was suppressed during battery assembly and charge and discharge, and that the thin fluorine-containing layer in the central portion 341 reduced the internal resistance.

On the other hand, in Comparative Examples 4 to 6, the ratio (F1/F2) of the fluorine content (F1) in the central portion 341 to the average fluorine content (F2) in the first end portion 342 and the second end portion 343 does not satisfy the relationship of 1<F1/F2≤1.22, and the cycle characteristics after 1000 cycles were 75.6% or less. This is considered due to the fact that the potential gradient formed between the central portion 341, and the first end portion 342 or between the central portion 341 and the second end portion 343 becomes too large. Further, it is considered that the average thickness T1 of the fluorine-containing layer in the central portion 341 is 20 μm or more, and the internal resistance of the negative electrode active material layer 34 is increased.

Example 50

The negative electrode of Example 50 was manufactured by the following steps C1 to C9.

Step C1

A negative electrode active material, a binder, and a solvent were mixed to prepare negative electrode mixture slurries A and B, respectively. The negative electrode mixture slurry A contains 98% by mass of a negative electrode active material, 1% by mass of a binder and 1% by mass of a solvent, and the negative electrode mixture slurry B contains 97% by mass of the negative electrode active material, 2% by mass of the binder and 1% by mass of the solvent. As the negative electrode active material in the negative electrode mixture slurries A and B, a natural graphite material for a lithium ion secondary battery was used. Further, a mixture of CMC as a thickener and SBR in a mass ratio of 1:1 was used as a binder. Water was used as a solvent. Separately, a 1% by mass solution of triphenyl phosphite as a phosphorus compound was added to the negative electrode mixture slurry B. Since the slurry B has a higher binder content than the slurry A, the water adsorption capacity is high.

The mixing method of these components constituting the slurry A and B is not particularly limited, and the mixing order is not particularly limited.

The step C2 according to Example 50 is the same as the step A2 according to Example 1 above.

Step C3:

Step C3-1

The negative electrode 30 coated in the step C2 was dried for 15 minutes by a hot air drying method. The temperature of the hot air was 85° C.

Step C3-2

Only a portion of the negative electrode active material layer 34 that was dried in the step C3-1 was further dried for 15 minutes by a hot air drying method, wherein the portion is the portion to which the slurry A was applied. The temperature of the hot air was 100° C.

Step C3-3

The negative electrode 30 coated in the step C2 was placed in a low dew point environment (dry room) for 24 hours.

The steps C4 to C8 according to Example 50 are the same as the steps A4 to A8 according to Example 1 above.

Step C9

The lithium ion secondary battery produced in the step C8 was charged and discharged for single cycle or multi-cycle as an aging treatment, and then the lithium ion secondary battery was disassembled and a negative electrode active material layer 34 was taken out. Each of water contents in the central portion 341, the first the end portion 342 and the second end portion 343 of the negative electrode active material layer 34 taken out was measured by Karl Fischer method. The water content in the central portion 341 is an average value of five data obtained by measuring the water content at five arbitrary points in the central portion 341 in the negative electrode active material layer 34. The average water content in the first end portion 342 and the second end portion 343 was obtained by extracting five arbitrary points from the first end portion 342 and the second end portion 343 in the negative electrode active material layer 34, measuring the water contents at the five points, and obtaining an average value of five data. Again, the central portion 341 is included in the portion where the slurry B was applied, and the first end portion 342 and the second end portion 343 are included in the portion where the slurry A was applied. Through the charge or discharge of single cycle or multi-cycle, a deposition having an amount corresponding to the water content in the negative electrode active material layer 34 was formed on the negative electrode active material layer 34.

The lithium ion secondary battery produced in the step C8 was charged and discharged for single cycle or multi-cycle as an aging treatment, and then the lithium ion secondary battery was disassembled and a negative electrode active material layer 34 was taken out. Each of phosphorus contents in the central portion 341, the first the end portion 342 and the second end portion 343 of the negative electrode active material layer 34 taken out was measured by SEM-EDS analysis. The phosphorus content in the central portion 341 is an average value of five data obtained by measuring the phosphorus content at five arbitrary points in the central portion 341 in the negative electrode active material layer 34. The average phosphorus content in the first end portion 342 and the second end portion 343 was obtained by extracting five arbitrary points from the first end portion 342 and the second end portion 343 in the negative electrode active material layer 34, measuring the phosphorus contents at the five points, and obtaining an average value of five data. Again, the central portion 341 is included in the portion where the slurry B was applied, and the first end portion 342 and the second end portion 343 are included in the portion where the slurry A was applied. The phosphorus content in the negative electrode active material layer 34 was determined through the charge and discharge of single cycle or multi-cycle. The phosphorus content can be determined according to the phosphorus component contained in the negative electrode mixture slurry used for producing the negative electrode, and the phosphorus components contained in the non-aqueous electrolyte and the lithium salt.

The lithium ion secondary battery produced in the step C8 was charged and discharged for single cycle or multi-cycle as an aging treatment, and then the lithium ion secondary battery was disassembled and a negative electrode active material layer 34 was taken out. Each of fluorine contents in the central portion 341, the first the end portion 342 and the second end portion 343 of the negative electrode active material layer 34 taken out was measured by SEM-EDS analysis. The fluorine content in the central portion 341 is an average value of five data obtained by measuring the fluorine content at five arbitrary points in the central portion 341 in the negative electrode active material layer 34. The average fluorine content in the first end portion 342 and the second end portion 343 was obtained by extracting five arbitrary points from the first end portion 342 and the second end portion 343 in the negative electrode active material layer 34, measuring the fluorine contents at the five points, and obtaining an average value of five data. Again, the central portion 341 is included in the portion where the slurry B was applied, and the first end portion 342 and the second end portion 343 are included in the portion where the slurry A was applied. The fluorine content in the negative electrode active material layer 34 was determined through the charge and discharge of single cycle or multi-cycle. The fluorine content can be determined according to the fluorine component contained in the negative electrode mixture slurry used for producing the negative electrode, and the fluorine components contained in the non-aqueous electrolyte and the lithium salt.

The five arbitrary points of the central portion 341 are total five points including one point of the central point in the central portion 341 of the negative electrode active material layer 34 taken out by disassembling the lithium ion secondary battery, and four points of four ends of two straight lines passing through the central point.

The five arbitrary points extracted from the first end portion 342 and the second end portion 343 in the negative electrode active material layer 34 are total 3 points including one point selected from a first central point in the first end portion 342 and a second central point in the second end portion 343 taken out by disassembling the lithium ion secondary battery, and four points of four ends of two straight lines passing through another central point rather than the above-selected central point, wherein the other central point is in an end portion where the central point was not extracted.

The five arbitrary points related to the average thickness T1 of the phosphorus-containing layer in the central portion 341 are total five points including one point of the central point in the central portion 341 of the negative electrode active material layer 34 taken out by disassembling the lithium ion secondary battery, and four points of four ends of two straight lines passing through the central point.

The five arbitrary points related to the average thickness T2 of the phosphorus-containing layer in the first end portion 342 and the second end portion 343 are total five points including one point of a center point selected from a first center point of the first end portion 342 and a second center point of the second end portion 343 taken out by disassembling the lithium ion secondary battery, and four points of four ends of two straight lines passing through another central point rather than the above-selected central point, wherein the other central point is in an end portion where the central point was not extracted.

No significant difference was observed between the water content distribution in the negative electrode active material layer 34 after charge and discharge of single cycle or multi-cycle and the water content distribution in the negative electrode active material layer 34 after 1000 cycles.

No significant difference was observed between the phosphorus content distribution in the negative electrode active material layer 34 after charge and discharge of single cycle or multi-cycle and the phosphorus content distribution in the negative electrode active material layer 34 after 1000 cycles.

No significant difference was observed between the fluorine content distribution in the negative electrode active material layer 34 after charge and discharge of single cycle or multi-cycle and the fluorine content distribution in the negative electrode active material layer 34 after 1000 cycles.

The water content W1 [ppm] per unit mass in the central portion 341 of the negative electrode active material layer 34; the average water content W2 [ppm] per unit mass in the first end portion 342 and the second end portion 343; their ratio; and cycle characteristics after 1000 cycles, all of which were obtained from Examples 50 to 69, are shown in Tables 3 and 4. The phosphorus content P1 in the central portion 341 of the negative electrode active material layer 34; the average phosphorus content P2 in the first end portion 342 and the second end portion 343; and the ratio thereof are shown in Table 3. The fluorine content F1 in the central portion 341 of the negative electrode active material layer 34; the average fluorine content F2 in the first end portion 342 and the second end portion 343; and the ratio thereof are shown in Table 4.

The ratio (P1/P2) of the phosphorus content (P1) in the central portion 341 to the average phosphorus content (P2) in the first end portion 342 and the second end portion 343 was 1.16.

The ratio (W1/W2) of the water content (W1) in the central portion 341 to the average water content (W2) in the first end portion 342 and the second end portion 343 was 1.03. The cycle characteristics after 1000 cycles were 89.1%.

Example 52

A negative electrode was prepared in the same manner as in Example 50 except that in the step C3-3, the negative electrode 30 was left in a low dew point environment (dry room) for 12 hours.

TABLE 3

|  | P1 | P2 | P1/P2 | W1 | W2 | W1/W2 | Cycle Characteristics @1000cycle (%) |
|---|---|---|---|---|---|---|---|
| Example 50 | 2.21 | 1.91 | 1.16 | 33 | 27 | 1.22 | 89.1 |
| Example 51 | 2.21 | 1.91 | 1.16 | 140 | 136 | 1.03 | 88.9 |
| Example 52 | 2.21 | 1.91 | 1.16 | 87 | 59 | 1.47 | 89.2 |
| Example 53 | 2.21 | 1.91 | 1.16 | 120 | 117 | 1.03 | 89.0 |
| Example 54 | 2.21 | 1.91 | 1.16 | 29 | 28 | 1.04 | 89.1 |
| Example 55 | 2.21 | 1.91 | 1.16 | 33 | 31 | 1.06 | 85.6 |
| Example 56 | 2.21 | 1.91 | 1.16 | 478 | 283 | 1.69 | 86.1 |
| Example 57 | 2.21 | 1.91 | 1.16 | 279 | 450 | 0.62 | 85.3 |
| Example 58 | 2.21 | 1.91 | 1.16 | 592 | 353 | 1.68 | 84.9 |
| Example 59 | 2.21 | 1.91 | 1.16 | 289 | 289 | 1.00 | 84.9 |

TABLE 4

|  | F1 | F2 | F1/F2 | W1 | W2 | W1/W2 | Cycle Characteristics @1000cycle (%) |
|---|---|---|---|---|---|---|---|
| Example 60 | 18.68 | 17.05 | 1.10 | 32 | 25 | 1.28 | 90.1 |
| Example 61 | 18.68 | 17.05 | 1.10 | 143 | 136 | 1.05 | 91.4 |
| Example 62 | 18.68 | 17.05 | 1.10 | 86 | 58 | 1.48 | 90.8 |
| Example 63 | 18.68 | 17.05 | 1.10 | 133 | 121 | 1.10 | 91.1 |
| Example 64 | 18.68 | 17.05 | 1.10 | 30 | 29 | 1.03 | 90.9 |
| Example 65 | 18.68 | 17.05 | 1.10 | 36 | 33 | 1.09 | 91.0 |
| Example 66 | 18.68 | 17.05 | 1.10 | 495 | 297 | 1.67 | 87.2 |
| Example 67 | 18.68 | 17.05 | 1.10 | 266 | 438 | 0.61 | 88.3 |
| Example 68 | 18.68 | 17.05 | 1.10 | 601 | 366 | 1.64 | 87.9 |
| Example 69 | 18.68 | 17.05 | 1.10 | 299 | 299 | 1.00 | 87.6 |

The ratio (P1/P2) of the phosphorus content (P1) in the central portion 341 to the average phosphorus content (P2) in the first end portion 342 and the second end portion 343 was 1.16.

The ratio (W1/W2) of the water content (W1) in the central portion 341 to the average water content (W2) in the first end portion 342 and the second end portion 343 was 1.22. The cycle characteristics after 1000 cycles were 88.3%.

Example 51

A negative electrode was prepared in the same manner as in Example 50 except that in the step C3-3, the negative electrode 30 was left in the atmospheric environment for 12 hours.

The ratio (P1/P2) of the phosphorus content (P1) in the central portion 341 to the average phosphorus content (P2) in the first end portion 342 and the second end portion 343 was 1.16.

The ratio (W1/W2) of the water content (W1) in the central portion 341 to the average water content (W2) in the first end portion 342 and the second end portion 343 was 1.47. The cycle characteristics after 1000 cycles were 88.9%.

Example 53

A negative electrode was prepared in the same manner as in Example 50 except that in the step C3-3, the negative electrode 30 was left in the atmospheric environment for 6 hours.

The ratio (P1/P2) of the phosphorus content (P1) in the central portion 341 to the average phosphorus content (P2) in the first end portion 342 and the second end portion 343 was 1.16.

The ratio (W1/W2) of the water content (W1) in the central portion 341 to the average water content (W2) in the first end portion 342 and the second end portion 343 was 1.03. The cycle characteristics after 1000 cycles were 89.2%.

Example 54

A negative electrode was prepared in the same manner as in Example 50 except that in the step C1 and C2, only the slurry A was used to be applied to the negative electrode current collector 32 so as to form the negative electrode active material layer 34. In the step C3-2, only the portion advanced by (⅓) L from the first side toward the second side and the portion advanced from the second side by (⅓) L toward the first side were further dried for 15 minutes with the hot air drying method.

The ratio (P1/P2) of the phosphorus content (P1) in the central portion 341 to the average phosphorus content (P2) in the first end portion 342 and the second end portion 343 was 1.16.

The ratio (W1/W2) of the water content (W1) in the central portion 341 to the average water content (W2) in the first end portion 342 and the second end portion 343 was 1.04. The cycle characteristics after 1000 cycles were 89.0%.

Example 55

A negative electrode was prepared in the same manner as in Example 50 except that in the step C1 and C2, only the slurry B was used to be applied to the negative electrode current collector 32 so as to form the negative electrode active material layer 34. In the step C3-2, only the portion advanced by (⅓) L from the first side toward the second side and the portion advanced from the second side by (⅓) L toward the first side were further dried for 15 minutes with the hot air drying method.

The ratio (P1/P2) of the phosphorus content (P1) in the central portion 341 to the average phosphorus content (P2) in the first end portion 342 and the second end portion 343 was 1.16.

The ratio (W1/W2) of the water content (W1) in the central portion 341 to the average water content (W2) in the first end portion 342 and the second end portion 343 was 1.06. The cycle characteristics after 1000 cycles were 89.1%.

Example 56

A negative electrode was prepared in the same manner as in Example 50 except that in the step C1 and C2, only the slurry A was used to be applied to the negative electrode current collector 32 so as to form the negative electrode active material layer 34; and in the step C3-1, the negative electrode 30 was dried for 5 minutes by the hot air drying method. In the step C3-2, only the portion advanced by (⅓) L from the first side toward the second side and the portion advanced from the second side by (⅓) L toward the first side were further dried for 15 minutes with the hot air drying method.

The ratio (P1/P2) of the phosphorus content (P1) in the central portion 341 to the average phosphorus content (P2) in the first end portion 342 and the second end portion 343 was 1.16.

The ratio (W1/W2) of the water content (W1) in the central portion 341 to the average water content (W2) in the first end portion 342 and the second end portion 343 was 1.69. The cycle characteristics after 1000 cycles were 85.6%.

Example 57

A negative electrode was prepared in the same manner as in Example 50 except that in the step C1 and C2, only the slurry A was used to be applied to the negative electrode current collector 32 so as to form the negative electrode active material layer 34; in the step C3-1, the negative electrode 30 was dried for 5 minutes by the hot air drying method; and in the step C3-2, only the portion advanced by (⅙) L from the center of the first side and the second side toward the first side and the second side were further dried with the hot air drying method.

The ratio (P1/P2) of the phosphorus content (P1) in the central portion 341 to the average phosphorus content (P2) in the first end portion 342 and the second end portion 343 was 1.16.

The ratio (W1/W2) of the water content (W1) in the central portion 341 to the average water content (W2) in the first end portion 342 and the second end portion 343 was 0.62. The cycle characteristics after 1000 cycles were 86.1%.

Example 58

A negative electrode was prepared in the same manner as in Example 50 except that in the step C1 and C2, only the slurry B was used to be applied to the negative electrode current collector 32 so as to form the negative electrode active material layer 34; and in the step C3-1, the negative electrode 30 was dried for 5 minutes by the hot air drying method. In the step C3-2, only the portion advanced by (⅓) L from the first side toward the second side and the portion advanced from the second side by (⅓) L toward the first side were further dried for 15 minutes with the hot air drying method.

The ratio (P1/P2) of the phosphorus content (P1) in the central portion 341 to the average phosphorus content (P2) in the first end portion 342 and the second end portion 343 was 1.16.

The ratio (W1/W2) of the water content (W1) in the central portion 341 to the average water content (W2) in the first end portion 342 and the second end portion 343 was 1.68. The cycle characteristics after 1000 cycles were 85.3%.

Example 59

A negative electrode was prepared in the same manner as in Example 50 except that in the step C2, a slurry prepared by mixing 40% by mass of the slurry A produced in the step C1 and 60% by mass of the slurry B produced in the step C1 was applied to the negative electrode current collector 32, so as to form a portion advanced by (⅙) L from the center between the first side and the second side toward the first side and the second side.

The ratio (P1/P2) of the phosphorus content (P1) in the central portion 341 to the average phosphorus content (P2) in the first end portion 342 and the second end portion 343 was 1.16.

The ratio (W1/W2) of the water content (W1) in the central portion 341 to the average water content (W2) in the first end portion 342 and the second end portion 343 was 1.00. The cycle characteristics after 1000 cycles were 84.9%.

Example 60

A negative electrode was prepared in the same manner as in Example 50 except that in the step C1, 1% by mass solution of SURFLON (registered trademark) (manufactured by AGC Semi Chemical Co., Ltd.) was added instead of 1% by mass solution of triphenyl phosphite as a phosphorus compound.

The ratio (F1/F2) of the fluorine content (F1) in the central portion 341 to the average fluorine content (F2) in the first end portion 342 and the second end portion 343 was 1.10.

The ratio (W1/W2) of the water content (W1) in the central portion 341 to the average water content (W2) in the first end portion 342 and the second end portion 343 was 1.28. The cycle characteristics after 1000 cycles were 90.1%.

Example 61

A negative electrode was prepared in the same manner as in Example 51 except that in the step C1, 1% by mass solution of SURFLON (registered trademark) (manufactured by AGC Semi Chemical Co., Ltd.) was added instead of 1% by mass solution of triphenyl phosphite as a phosphorus compound.

The ratio (F1/F2) of the fluorine content (F1) in the central portion 341 to the average fluorine content (F2) in the first end portion 342 and the second end portion 343 was 1.10.

The ratio (W1/W2) of the water content (W1) in the central portion 341 to the average water content (W2) in the first end portion 342 and the second end portion 343 was 1.05. The cycle characteristics after 1000 cycles were 91.4%.

Example 62

A negative electrode was prepared in the same manner as in Example 52 except that in the step C1, 1% by mass solution of SURFLON (registered trademark) (manufactured by AGC Semi Chemical Co., Ltd.) was added instead of 1% by mass solution of triphenyl phosphite as a phosphorus compound.

The ratio (F1/F2) of the fluorine content (F1) in the central portion 341 to the average fluorine content (F2) in the first end portion 342 and the second end portion 343 was 1.10.

The ratio (W1/W2) of the water content (W1) in the central portion 341 to the average water content (W2) in the first end portion 342 and the second end portion 343 was 1.48. The cycle characteristics after 1000 cycles were 90.8%.

Example 63

A negative electrode was prepared in the same manner as in Example 53 except that in the step C1, 1% by mass solution of SURFLON (registered trademark) (manufactured by AGC Semi Chemical Co., Ltd.) was added instead of 1% by mass solution of triphenyl phosphite as a phosphorus compound.

The ratio (F1/F2) of the fluorine content (F1) in the central portion 341 to the average fluorine content (F2) in the first end portion 342 and the second end portion 343 was 1.10.

The ratio (W1/W2) of the water content (W1) in the central portion 341 to the average water content (W2) in the first end portion 342 and the second end portion 343 was 1.10. The cycle characteristics after 1000 cycles were 91.1%.

Example 64

A negative electrode was prepared in the same manner as in Example 54 except that in the step C1, 1% by mass solution of SURFLON (registered trademark) (manufactured by AGC Semi Chemical Co., Ltd.) was added instead of 1% by mass solution of triphenyl phosphite as a phosphorus compound.

The ratio (F1/F2) of the fluorine content (F1) in the central portion 341 to the average fluorine content (F2) in the first end portion 342 and the second end portion 343 was 1.10.

The ratio (W1/W2) of the water content (W1) in the central portion 341 to the average water content (W2) in the first end portion 342 and the second end portion 343 was 1.03. The cycle characteristics after 1000 cycles were 90.9%.

Example 65

A negative electrode was prepared in the same manner as in Example 55 except that in the step C1, 1% by mass solution of SURFLON (registered trademark) (manufactured by AGC Semi Chemical Co., Ltd.) was added instead of 1% by mass solution of triphenyl phosphite as a phosphorus compound.

The ratio (F1/F2) of the fluorine content (F1) in the central portion 341 to the average fluorine content (F2) in the first end portion 342 and the second end portion 343 was 1.10.

The ratio (W1/W2) of the water content (W1) in the central portion 341 to the average water content (W2) in the first end portion 342 and the second end portion 343 was 1.09. The cycle characteristics after 1000 cycles were 91.0%.

Example 66

A negative electrode was prepared in the same manner as in Example 56 except that in the step C1, 1% by mass solution of SURFLON (registered trademark) (manufactured by AGC Semi Chemical Co., Ltd.) was added instead of 1% by mass solution of triphenyl phosphite as a phosphorus compound.

The ratio (F1/F2) of the fluorine content (F1) in the central portion 341 to the average fluorine content (F2) in the first end portion 342 and the second end portion 343 was 1.10.

The ratio (W1/W2) of the water content (W1) in the central portion 341 to the average water content (W2) in the first end portion 342 and the second end portion 343 was 1.67. The cycle characteristics after 1000 cycles were 87.2%.

Example 67

A negative electrode was prepared in the same manner as in Example 57 except that in the step C1, 1% by mass solution of SURFLON (registered trademark) (manufactured by AGC Semi Chemical Co., Ltd.) was added instead of 1% by mass solution of triphenyl phosphite as a phosphorus compound.

The ratio (F1/F2) of the fluorine content (F1) in the central portion 341 to the average fluorine content (F2) in the first end portion 342 and the second end portion 343 was 1.10.

The ratio (W1/W2) of the water content (W1) in the central portion 341 to the average water content (W2) in the first end portion 342 and the second end portion 343 was 0.61. The cycle characteristics after 1000 cycles were 88.3%.

Example 68

A negative electrode was prepared in the same manner as in Example 58 except that in the step C1, 1% by mass solution of SURFLON (registered trademark) (manufactured by AGC Semi Chemical Co., Ltd.) was added instead of 1% by mass solution of triphenyl phosphite as a phosphorus compound.

The ratio (F1/F2) of the fluorine content (F1) in the central portion 341 to the average fluorine content (F2) in the first end portion 342 and the second end portion 343 was 1.10.

The ratio (W1/W2) of the water content (W1) in the central portion 341 to the average water content (W2) in the first end portion 342 and the second end portion 343 was 1.64. The cycle characteristics after 1000 cycles were 87.9%.

Example 69

A negative electrode was prepared in the same manner as in Example 59 except that in the step C1, 1% by mass solution of SURFLON (registered trademark) (manufactured by AGC Semi Chemical Co., Ltd.) was added instead of 1% by mass solution of triphenyl phosphite as a phosphorus compound.

The ratio (F1/F2) of the fluorine content (F1) in the central portion 341 to the average fluorine content (F2) in the first end portion 342 and the second end portion 343 was 1.10.

The ratio (W1/W2) of the water content (W1) in the central portion 341 to the average water content (W2) in the first end portion 342 and the second end portion 343 was 1.00. The cycle characteristics after 1000 cycles were 87.6%.

In Examples 50 to 55, 58 to 66, and 68 to 69, the ratio (W2/W1) of the water content (W1) in the central portion 341 to the average water content (W2) in the first end portion 342 and the second end portion 343 satisfies the relationship of 1<W1/W2≤1.5, and the cycle characteristics after 1000 cycles were 85.1% or more. The results are due to stability of intercalation and de-intercalation of lithium ions and electron transfer during charge and discharge in a whole of the negative electrode, by forming an appropriate potential gradient between the central portion 341 and the first end portion 342, and between the central portion 341 and the second end portion 343 by increasing the amount of precipitates in the central portion 341 within a predetermined range.

Example 70

The negative electrode of Example 70 was produced by the following steps D1 to D9.

Step D1

A negative electrode active material, a binder, and a solvent were mixed to prepare negative electrode mixture slurries A and B, respectively. The negative electrode mixture slurry A contains 98% by mass of a negative electrode active material, 1% by mass of a binder and 1% by mass of a solvent, and the negative electrode mixture slurry B contains 97% by mass of the negative electrode active material, 2% by mass of the binder and 1% by mass of the solvent. As the negative electrode active material in the negative electrode mixture slurries A and B, a natural graphite material for a lithium ion secondary battery was used. Further, a mixture of CMC as a thickener and SBR in a mass ratio of 1:1 was used as a binder. Water was used as a solvent. Separately, a 1% by mass solution of triphenyl phosphite as a phosphorus compound and 1% by mass solution of SURFLON (registered trademark) (manufactured by AGC Semi Chemical Co., Ltd.) was added to the negative electrode mixture slurry B. In the negative electrode mixture slurry B, the phosphorus compound and fluorine compound were added so that the mass ratio of the phosphorus compound and fluorine compound to other components was 2:98.

The mixing method of these components constituting the slurry A and B is not particularly limited, and the mixing order is not particularly limited.

Step D2

When the distance between the first side and the second side is L, a slurry prepared by mixing 50% by mass of the slurry A produced in the step D1 and 50% by mass of the slurry B produced in the step D1 was applied to an electrolytic copper foil (Furukawa Electric) as a negative electrode current collector 32, so as to form a portion advanced by (⅓) L from the first side to the second side and a portion advanced by (⅓) L from the second side toward the first side. In addition, a slurry prepared by mixing 45% by mass of the slurry A produced in the step D1 and 55% by mass of the slurry B produced in the step D1 was applied to the negative electrode current collector 32, so as to form a portion advanced by (⅙) L from the center between the first side and the second side toward the first side and the second side. Thus, the negative electrode 30 was produced.

As is clear from the definitions of the central portion and the first and second end portions, the portion to which the slurry B was applied may include the central portion 341, and the portion to which the slurry A was applied may include the first end portion 342 and the second end portion 343.

The coating method is not particularly limited, and a method usually employed when producing an electrode can be used. Examples thereof include a slit die coating method and a doctor blade method. The application of the slurry A and B may be performed simultaneously or separately.

Step D3

The negative electrode 30 coated in the step D2 was dried for 15 minutes by a hot air drying method. The temperature of the hot air was 85° C.

Step D4

A positive electrode active material, a binder, and a solvent were mixed to prepare a positive electrode mixture slurry. As the positive electrode active material, $LiNi_{0.83}Co_{0.12}Al_{0.05}O_2$ having an average particle diameter of 10 μm was prepared. After 92 parts by mass of the positive electrode active material, 4 parts by mass of acetylene black, and 4 parts by mass of polyvinylidene fluoride (PVDF) were weighed, they were dispersed in N-methyl-2-pyrrolidone (NMP). A positive electrode mixture slurry was prepared.

Step D5

The positive electrode mixture slurry prepared in the step D4 was applied onto an aluminum current collector foil for lithium ion batteries (manufactured by UACJ) as the positive electrode current collector 22 to prepare the positive electrode 20.

The coating method is not particularly limited, and a method usually employed when producing an electrode can be used. Examples thereof include a slit die coating method and a doctor blade method.

Step D6

The positive electrode 20 coated in the step D5 was dried by a hot air drying method.

Step D7

The negative electrode 30 produced in the step A3, a 20 µm thick polyethylene microporous film (porosity: 40%) as the separator 10, and the positive electrode 20 produced in the step D6 were alternately laminated to produce a laminated body. The positive electrode 20, the separator 10, and the negative electrode 30 may be brought into close contact with each other by heating and pressing with a press tool from a direction perpendicular to the laminating direction of the laminated body 40.

Step D8

The laminated body produced in the step D7 was sealed in a laminate outer package 50 (nylon/aluminum foil/unstretched polypropylene), in which an electrolyte was injected. The electrolyte was prepared by mixing ethylene carbonate (EC) and diethyl carbonate (DEC) at a volume ratio of 3:7 and dissolving $LiPF_6$ as a lithium salt so as to be 1 mol/L. Thereafter, the laminate outer package 50 was sealed to produce a lithium ion secondary battery.

Instead of injecting the electrolyte into the laminate outer package 50, the laminated body 40 may be impregnated with the electrolyte.

Step D9

The lithium ion secondary battery produced in the step D8 was charged and discharged for single cycle or multi-cycle as an aging treatment, and then the lithium ion secondary battery was disassembled and a negative electrode active material layer 34 was taken out. Each of phosphorus contents and fluorine contents in the central portion 341, the first the end portion 342 and the second end portion 343 of the negative electrode active material layer 34 taken out was measured by SEM-EDS analysis (Equipment used: SU8010 (manufactured by Hitachi High-Tech Fielding)). The phosphorus content and fluorine content in the central portion 341 are an average value of three data obtained by measuring the phosphorus content and fluorine content at three arbitrary points in the central portion 341 in the negative electrode active material layer 34. The average phosphorus content and fluorine content in the first end portion 342 and the second end portion 343 were obtained by extracting three arbitrary points from the first end portion 342 and the second end portion 343 in the negative electrode active material layer 34, measuring the phosphorus contents and fluorine contents at the three points, and obtaining an average value of three data. In addition, the average thickness T1 of the phosphorus-containing layer in the central portion 341 was an average value obtained by observing cross sections of three arbitrary points of the central portion 341 in the negative electrode active material layer 34 with a scanning electron microscope. The average thickness T2 of the phosphorus-containing layer in the first end portion 342 and the second end portion 343 was obtained by extracting three arbitrary points from the first end portion 342 and the second end portion 343 in the negative electrode active material layer 34, observing cross sections of the three points with a scanning electron microscope, and obtaining average value of the three data. Again, the central portion 341 is included in the portion where the slurry B was applied, and the first end portion 342 and the second end portion 343 are included in the portion where the slurry A was applied. The phosphorus content and fluorine content in the negative electrode active material layer 34 were determined through the charge and discharge of single cycle or multi-cycle. The phosphorus content and fluorine content can be determined according to the phosphorus component and fluorine components contained in the negative electrode mixture slurry used for producing the negative electrode, and the phosphorus components and fluorine components contained in the non-aqueous electrolyte and the lithium salt.

The three arbitrary points of the central portion 341 are three points in total including one point of the central point in the central portion 341 of the negative electrode active material layer 34 taken out by disassembling the lithium ion secondary battery, and two points of two ends of one straight line passing through the central point.

The three arbitrary points extracted from the first end portion 342 and the second end portion 343 in the negative electrode active material layer 34 are total 3 points including one point selected from a first central point in the first end portion 342 and a second central point in the second end portion 343 taken out by disassembling the lithium ion secondary battery, and two points of two ends of one straight line passing through another central point rather than the above-selected central point, wherein the other central point is in an end portion where the central point was not extracted.

The three arbitrary points related to the average thickness T1 of the phosphorus-containing layer in the central portion 341 are three points in total including one point of the central point in the central portion 341 of the negative electrode active material layer 34 taken out by disassembling the lithium ion secondary battery, and two points of two ends of one straight line passing through the central point.

The three arbitrary points related to the average thickness T2 of the phosphorus-containing layer in the first end portion 342 and the second end portion 343 are three points in total including one point of a center point selected from a first center point of the first end portion 342 and a second center point of the second end portion 343 taken out by disassembling the lithium ion secondary battery, and two points of two ends of one straight line passing through another central point rather than the above-selected central point, wherein the other central point is in an end portion where the central point was not extracted.

No significant difference was observed between the distribution of the phosphorus content and fluorine content in the negative electrode active material layer 34 after charge and discharge of single cycle or multi-cycle and the distribution of the phosphorus content and fluorine content in the negative electrode active material layer 34 after 1000 cycles.

The phosphorus content P1 in the central portion 341 of the negative electrode active material layer 34; the average phosphorus content P2 in the first end portion 342 and the second end portion 343; the phosphorus contents P3-1 to P3-3 at three arbitrary points of the first end portion 342 and the second end portion 343; and their ratios, all of which were obtained from Examples 70 to 78, are shown in Table 5. The fluorine content F1 in the central portion 341 of the negative electrode active material layer 34; the average fluorine content F2 in the first end portion 342 and the second end portion 343; the fluorine contents F3-1 to F3-3 at three arbitrary points of the first end portion 342 and the second end portion 343; and their ratios, all of which were obtained from Examples 70 to 78, are shown in Table 5. Further, the ratio ((P1+F1)/(P2+F2)) of the sum of the phosphorus content P1 and fluorine content F1 to the sum of the average phosphorus content P2 and average fluorine content F2, obtained from Examples 70 to 78; and the cycle characteristics after 1000 cycles are shown in Table 5.

The phosphorus content P1 in the central portion 341, the average phosphorus content P2 in the first end portion 342 and the second end portion 343 are the phosphorus content after single cycle or multi-cycle of charge and discharge performed in the degassing/aging process before product shipment. The average phosphorus content P2 is an average value of the phosphorus contents P3-1 to P3-3 at three arbitrary points.

The fluorine content F1 in the central portion 341, the average fluorine content F2 in the first end portion 342 and the second end portion 343 are the fluorine content after single cycle or multi-cycle of charge and discharge performed in the degassing/aging process before product shipment. The average fluorine content F2 is an average value of the fluorine contents F3-1 to F3-3 at three arbitrary points.

The phosphorus content P1 in the central portion 341 of the negative electrode active material layer 34; the average phosphorus content P2 in the first end portion 342 and the second end portion 343 and their ratios, all of which were obtained from Examples 79 to 88, are shown in Table 6. The fluorine content F1 in the central portion 341 of the negative electrode active material layer 34; the average fluorine content F2 in the first end portion 342 and the second end portion 343; and their ratios, all of which were obtained from Examples 79 to 88, are shown in Table 6. Further, the ratio ((P1+F1)/(P2+F2)) of the sum of the phosphorus content P1 and fluorine content F1 to the sum of the average phosphorus content P2 and average fluorine content F2; the water content W1 [ppm] per unit mass in the central portion 341 of the negative electrode active material layer 34; the average water content W2 [ppm] per unit mass in the first end portion 342 and the second end portion 343 and their ratios, obtained from Examples 79 to 88; and the cycle characteristics after 1000 cycles are shown in Table 6.

The phosphorus content P1 in the central portion 341, the average phosphorus content P2 in the first end portion 342 and the second end portion 343 are the phosphorus content after single cycle or multi-cycle of charge and discharge performed in the degassing/aging process before product shipment.

The fluorine content F1 in the central portion 341, the average fluorine content F2 in the first end portion 342 and the second end portion 343 are the fluorine content after single cycle or multi-cycle of charge and discharge performed in the degassing/aging process before product shipment.

TABLE 5

|  | P3-1 | P3-1 | P3-1 | P1 | P2 | P1/P2 |
|---|---|---|---|---|---|---|
| Example 70 | 1.99 | 2.10 | 2.03 | 2.19 | 2.04 | 1.07 |
| Example 71 | 1.80 | 2.20 | 1.73 | 2.21 | 1.91 | 1.16 |
| Example 72 | 1.80 | 1.78 | 1.76 | 2.20 | 1.78 | 1.24 |
| Example 73 | 1.73 | 1.73 | 1.72 | 2.23 | 1.73 | 1.29 |
| Example 74 | 1.90 | 1.90 | 1.78 | 2.21 | 1.86 | 1.19 |
| Example 75 | 2.16 | 2.17 | 2.18 | 2.20 | 2.17 | 1.01 |
| Example 76 | 2.08 | 2.11 | 2.00 | 2.22 | 2.06 | 1.08 |
| Example 77 | 2.16 | 1.99 | 2.20 | 2.23 | 2.12 | 1.05 |
| Example 78 | 1.70 | 1.69 | 1.68 | 2.21 | 1.69 | 1.31 |

|  | F3-1 | F3-2 | F3-3 | F1 | F2 | F1/F2 | (P1 + F1)/(P2 + F2) | Cycle Characteristics @1000 Cycles | Phosphorus and Fluorine-Containing Layer |
|---|---|---|---|---|---|---|---|---|---|
| Example 70 | 17.10 | 17.13 | 17.22 | 18.77 | 17.15 | 1.09 | 1.09 | 91.4 | Yes |
| Example 71 | 17.01 | 17.10 | 17.04 | 18.68 | 17.05 | 1.10 | 1.10 | 90.1 | Yes |
| Example 72 | 15.69 | 15.51 | 15.44 | 18.59 | 15.55 | 1.20 | 1.20 | 91.8 | Yes |
| Example 73 | 15.33 | 15.32 | 15.31 | 18.66 | 15.32 | 1.22 | 1.23 | 91.3 | Yes |
| Example 74 | 17.09 | 15.49 | 15.92 | 18.65 | 16.17 | 1.15 | 1.16 | 92.1 | Yes |
| Example 75 | 16.82 | 17.01 | 16.34 | 16.66 | 16.72 | 1.12 | 1.10 | 90.9 | Yes |
| Example 76 | 17.23 | 15.71 | 17.97 | 18.67 | 16.97 | 1.10 | 1.10 | 91.1 | Yes |
| Example 77 | 17.30 | 16.95 | 16.40 | 18.64 | 18.53 | 1.01 | 1.01 | 89.5 | Yes |
| Example 78 | 14.90 | 15.32 | 15.37 | 18.67 | 15.20 | 1.23 | 1.24 | 89.1 | Yes |

TABLE 6

|  | P1 | P2 | P1/P2 | F1 | F2 | F1/F2 | (P1 + F1)/(P2 + F2) | W1 | W2 | W1/W2 | Cycle Characteristics @ 1000 Cycles |
|---|---|---|---|---|---|---|---|---|---|---|---|
| Example 79 | 2.21 | 1.91 | 1.16 | 18.68 | 17.05 | 1.10 | 1.10 | 41 | 31 | 1.32 | 91.9% |
| Example 80 | 2.21 | 1.91 | 1.16 | 18.68 | 17.05 | 1.10 | 1.10 | 151 | 144 | 1.05 | 92.3% |
| Example 81 | 2.21 | 1.91 | 1.16 | 18.68 | 17.05 | 1.10 | 1.10 | 88 | 59 | 1.49 | 91.6% |
| Example 82 | 2.21 | 1.91 | 1.16 | 18.68 | 17.05 | 1.10 | 1.10 | 112 | 104 | 1.08 | 92.1% |
| Example 83 | 2.21 | 1.91 | 1.16 | 18.68 | 17.05 | 1.10 | 1.10 | 33 | 31 | 1.06 | 92.2% |
| Example 84 | 2.21 | 1.91 | 1.16 | 18.68 | 17.05 | 1.10 | 1.10 | 36 | 32 | 1.13 | 91.4% |
| Example 85 | 2.21 | 1.91 | 1.16 | 18.68 | 17.05 | 1.10 | 1.10 | 566 | 339 | 1.67 | 89.9% |
| Example 86 | 2.21 | 1.91 | 1.16 | 18.68 | 17.05 | 1.10 | 1.10 | 266 | 438 | 0.61 | 90.1% |

TABLE 6-continued

|  | P1 | P2 | P1/P2 | F1 | F2 | F1/F2 | (P1 + F1)/ (P2 + F2) | W1 | W2 | W1/W2 | Cycle Characteristics @ 1000 Cycles |
|---|---|---|---|---|---|---|---|---|---|---|---|
| Example 87 | 2.21 | 1.91 | 1.16 | 18.68 | 17.05 | 1.10 | 1.10 | 597 | 389 | 1.53 | 89.5% |
| Example 88 | 2.21 | 1.91 | 1.16 | 18.68 | 17.05 | 1.10 | 1.10 | 301 | 301 | 1.00 | 89.8% |

The ratio (P1/P2) of the phosphorus content (P1) in the central portion 341 to the average phosphorus content (P2) in the first end portion 342 and the second end portion 343 was 1.07.

The ratio (F1/F2) of the fluorine content (F1) in the central portion 341 to the average fluorine content (F2) in the first end portion 342 and the second end portion 343 was 1.09.

The ratio of the sum of the phosphorus content P1 and the fluorine content F1 to the sum of the average phosphorus content P2 and the average fluorine content F2 ((P1+F1)/(P2+F2)) was 1.09. The cycle characteristics after 1000 cycles were 91.4%.

Example 71

A negative electrode was prepared in the same manner as in Example 70, except that in the step D2, the mixing ratio of the slurry A and the slurry B (slurry A:slurry B) in the center portion was changed to 40:60.

The ratio (P1/P2) of the phosphorus content (P1) in the central portion 341 to the average phosphorus content (P2) in the first end portion 342 and the second end portion 343 was 1.16.

The ratio (F1/F2) of the fluorine content (F1) in the central portion 341 to the average fluorine content (F2) in the first end portion 342 and the second end portion 343 was 1.10.

The ratio ((P1+F1)/(P2+F2)) of the sum of the phosphorus content P1 and the fluorine content F1 to the sum of the average phosphorus content P2 and the average fluorine content F2 was 1.10. The cycle characteristics after 1000 cycles were 90.1%.

Example 72

A negative electrode was prepared in the same manner as in Example 70, except that in the step D2, the mixing ratio of the slurry A and the slurry B (slurry A:slurry B) in the center portion was changed to 33:67.

The ratio (P1/P2) of the phosphorus content (P1) in the central portion 341 to the average phosphorus content (P2) in the first end portion 342 and the second end portion 343 was 1.24.

The ratio (F1/F2) of the fluorine content (F1) in the central portion 341 to the average fluorine content (F2) in the first end portion 342 and the second end portion 343 was 1.20.

The ratio ((P1+F1)/(P2+F2)) of the sum of the phosphorus content P1 and the fluorine content F1 and the sum of the average phosphorus content P2 and the average fluorine content F2 was 1.20. The cycle characteristics after 1000 cycles were 91.8%.

Example 73

A negative electrode was prepared in the same manner as in Example 70, except that in the step D2, the mixing ratio of the slurry A and the slurry B (slurry A:slurry B) in the center portion was changed to 24:76.

The ratio (P1/P2) of the phosphorus content (P1) in the central portion 341 to the average phosphorus content (P2) in the first end portion 342 and the second end portion 343 was 1.29.

The ratio (F1/F2) of the fluorine content (F1) in the central portion 341 to the average fluorine content (F2) in the first end portion 342 and the second end portion 343 was 1.22.

The ratio ((P1+F1)/(P2+F2)) of the sum of the phosphorus content P1 and the fluorine content F1 and the sum of the average phosphorus content P2 and the average fluorine content F2 was 1.23. The cycle characteristics after 1000 cycles were 91.3%.

Example 74

A negative electrode was prepared in the same manner as in Example 70, except that in the step D2, the mixing ratio of the slurry A and the slurry B (slurry A:slurry B) in the center portion was changed to 4:96.

The ratio (P1/P2) of the phosphorus content (P1) in the central portion 341 to the average phosphorus content (P2) in the first end portion 342 and the second end portion 343 was 1.19.

The ratio (F1/F2) of the fluorine content (F1) in the central portion 341 to the average fluorine content (F2) in the first end portion 342 and the second end portion 343 was 1.15.

The ratio ((P1+F1)/(P2+F2)) of the total of the phosphorus content P1 and the fluorine content F1 and the total of the average phosphorus content P2 and the average fluorine content F2 was 1.16. The cycle characteristics after 1000 cycles were 92.1%.

Example 75

A negative electrode was prepared in the same manner as in Example 70, except that in the step D1, the phosphorus compound and the fluorine compound were changed to a 2% by mass solution of the trisnonylphenyl phosphite as the phosphorus compound and a 2% by mass solution of the FC-4430 (manufactured by 3M) as the fluorine compound, and the mass ratio of total amount of the phosphorus compound the fluorine compound to other components was changed to 4:96.

The ratio (P1/P2) of the phosphorus content (P1) in the central portion 341 to the average phosphorus content (P2) in the first end portion 342 and the second end portion 343 was 1.01.

The ratio (F1/F2) of the fluorine content (F1) in the central portion 341 to the average fluorine content (F2) in the first end portion 342 and the second end portion 343 was 1.12.

The ratio ((P1+F1)/(P2+F2)) of the sum of the phosphorus content P1 and the fluorine content F1 to the sum of the average phosphorus content P2 and the average fluorine content F2 was 1.10. The cycle characteristics after 1000 cycles were 90.9%.

Example 76

A negative electrode was prepared in the same manner as in Example 70, except that in the step D1, the phosphorus compound and the fluorine compound were changed to a 2% by mass solution of the tricresyl phosphite as the phosphorus compound and a 2% by mass solution of the POLYFLON PTFE LUBRON (manufactured by Daikin) as the fluorine compound, and the mass ratio of total amount of the phosphorus compound the fluorine compound to other components was changed to 4:96.

The ratio (P1/P2) of the phosphorus content (P1) in the central portion 341 to the average phosphorus content (P2) in the first end portion 342 and the second end portion 343 was 1.08.

The ratio (F1/F2) of the fluorine content (F1) in the central portion 341 to the average fluorine content (F2) in the first end portion 342 and the second end portion 343 was 1.10.

The ratio ((P1+F1)/(P2+F2)) of the sum of the phosphorus content P1 and the fluorine content F1 to the sum of the average phosphorus content P2 and the average fluorine content F2 was 1.10. The cycle characteristics after 1000 cycles were 91.1%.

Example 77

A negative electrode was prepared in the same manner as in Example 70, except that in the step D1, the phosphorus compound and the fluorine compound were changed to a 2% by mass solution of the tris(2-ethylhexyl) phosphite as the phosphorus compound and a 2% by mass solution of the POLYFLON MPA (manufactured by Daikin) as the fluorine compound, and the mass ratio of total amount of the phosphorus compound the fluorine compound to other components was changed to 4:96.

The ratio (P1/P2) of the phosphorus content (P1) in the central portion 341 to the average phosphorus content (P2) in the first end portion 342 and the second end portion 343 was 1.05.

The ratio (F1/F2) of the fluorine content (F1) in the central portion 341 to the average fluorine content (F2) in the first end portion 342 and the second end portion 343 was 1.01.

The ratio ((P1+F1)/(P2+F2)) of the total of the phosphorus content P1 and the fluorine content F1 and the total of the average phosphorus content P2 and the average fluorine content F2 was 1.01. The cycle characteristics after 1000 cycles were 89.5%.

Example 78

A negative electrode was prepared in the same manner as in Example 70, except that in the step D2, the mixing ratio of the slurry A and the slurry B (slurry A:slurry B) in the center portion was changed to 22:78.

The ratio (P1/P2) of the phosphorus content (P1) in the central portion 341 to the average phosphorus content (P2) in the first end portion 342 and the second end portion 343 was 1.31.

The ratio (F1/F2) of the fluorine content (F1) in the central portion 341 to the average fluorine content (F2) in the first end portion 342 and the second end portion 343 was 1.23.

The ratio ((P1+F1)/(P2+F2)) of the total of the phosphorus content P1 and the fluorine content F1 and the total of the average phosphorus content P2 and the average fluorine content F2 was 1.24. The cycle characteristics after 1000 cycles were 89.1%.

Example 79

As a reproduction experiment of Example 71, a negative electrode was produced in the same manner as Example 71.

The ratio (P1/P2) of the phosphorus content (P1) in the central portion 341 to the average phosphorus content (P2) in the first end portion 342 and the second end portion 343 was 1.16.

The ratio (F1/F2) of the fluorine content (F1) in the central portion 341 to the average fluorine content (F2) in the first end portion 342 and the second end portion 343 was 1.10.

The ratio (W1/W2) of the water content (W1) in the central portion 341 to the average water content (W2) in the first end portion 342 and the second end portion 343 was 1.32.

The cycle characteristics after 1000 cycles were 91.9%.

Example 80

As a reproduction experiment of Example 71, a negative electrode was produced in the same manner as Example 71.

The ratio (P1/P2) of the phosphorus content (P1) in the central portion 341 to the average phosphorus content (P2) in the first end portion 342 and the second end portion 343 was 1.16.

The ratio (F1/F2) of the fluorine content (F1) in the central portion 341 to the average fluorine content (F2) in the first end portion 342 and the second end portion 343 was 1.10.

The ratio (W1/W2) of the water content (W1) in the central portion 341 to the average water content (W2) in the first end portion 342 and the second end portion 343 was 1.05.

The cycle characteristics after 1000 cycles were 92.3%.

Example 81

As a reproduction experiment of Example 71, a negative electrode was produced in the same manner as Example 71.

The ratio (P1/P2) of the phosphorus content (P1) in the central portion 341 to the average phosphorus content (P2) in the first end portion 342 and the second end portion 343 was 1.16.

The ratio (F1/F2) of the fluorine content (F1) in the central portion 341 to the average fluorine content (F2) in the first end portion 342 and the second end portion 343 was 1.10.

The ratio (W1/W2) of the water content (W1) in the central portion 341 to the average water content (W2) in the first end portion 342 and the second end portion 343 was 1.49.

The cycle characteristics after 1000 cycles were 91.6%.

Example 82

As a reproduction experiment of Example 71, a negative electrode was produced in the same manner as Example 71.

The ratio (P1/P2) of the phosphorus content (P1) in the central portion 341 to the average phosphorus content (P2) in the first end portion 342 and the second end portion 343 was 1.16.

The ratio (F1/F2) of the fluorine content (F1) in the central portion 341 to the average fluorine content (F2) in the first end portion 342 and the second end portion 343 was 1.10.

The ratio (W1/W2) of the water content (W1) in the central portion 341 to the average water content (W2) in the first end portion 342 and the second end portion 343 was 1.08.

The cycle characteristics after 1000 cycles were 92.1%.

Example 83

As a reproduction experiment of Example 71, a negative electrode was produced in the same manner as Example 71.

The ratio (P1/P2) of the phosphorus content (P1) in the central portion 341 to the average phosphorus content (P2) in the first end portion 342 and the second end portion 343 was 1.16.

The ratio (F1/F2) of the fluorine content (F1) in the central portion 341 to the average fluorine content (F2) in the first end portion 342 and the second end portion 343 was 1.10.

The ratio (W1/W2) of the water content (W1) in the central portion 341 to the average water content (W2) in the first end portion 342 and the second end portion 343 was 1.06.

The cycle characteristics after 1000 cycles were 92.2%.

Example 84

As a reproduction experiment of Example 71, a negative electrode was produced in the same manner as Example 71.

The ratio (P1/P2) of the phosphorus content (P1) in the central portion 341 to the average phosphorus content (P2) in the first end portion 342 and the second end portion 343 was 1.16.

The ratio (F1/F2) of the fluorine content (F1) in the central portion 341 to the average fluorine content (F2) in the first end portion 342 and the second end portion 343 was 1.10.

The ratio (W1/W2) of the water content (W1) in the central portion 341 to the average water content (W2) in the first end portion 342 and the second end portion 343 was 1.13.

The cycle characteristics after 1000 cycles were 91.4%.

Example 85

As a reproduction experiment of Example 71, a negative electrode was produced in the same manner as Example 71.

The ratio (P1/P2) of the phosphorus content (P1) in the central portion 341 to the average phosphorus content (P2) in the first end portion 342 and the second end portion 343 was 1.16.

The ratio (F1/F2) of the fluorine content (F1) in the central portion 341 to the average fluorine content (F2) in the first end portion 342 and the second end portion 343 was 1.10.

The ratio (W1/W2) of the water content (W1) in the central portion 341 to the average water content (W2) in the first end portion 342 and the second end portion 343 was 1.67.

The cycle characteristics after 1000 cycles were 89.9%.

Example 86

As a reproduction experiment of Example 71, a negative electrode was produced in the same manner as Example 71.

The ratio (P1/P2) of the phosphorus content (P1) in the central portion 341 to the average phosphorus content (P2) in the first end portion 342 and the second end portion 343 was 1.16.

The ratio (F1/F2) of the fluorine content (F1) in the central portion 341 to the average fluorine content (F2) in the first end portion 342 and the second end portion 343 was 1.10.

The ratio (W1/W2) of the water content (W1) in the central portion 341 to the average water content (W2) in the first end portion 342 and the second end portion 343 was 0.61.

The cycle characteristics after 1000 cycles were 90.1%.

Example 87

As a reproduction experiment of Example 71, a negative electrode was produced in the same manner as Example 71.

The ratio (P1/P2) of the phosphorus content (P1) in the central portion 341 to the average phosphorus content (P2) in the first end portion 342 and the second end portion 343 was 1.16.

The ratio (F1/F2) of the fluorine content (F1) in the central portion 341 to the average fluorine content (F2) in the first end portion 342 and the second end portion 343 was 1.10.

The ratio (W1/W2) of the water content (W1) in the central portion 341 to the average water content (W2) in the first end portion 342 and the second end portion 343 was 1.53.

The cycle characteristics after 1000 cycles were 89.5%.

Example 88

As a reproduction experiment of Example 71, a negative electrode was produced in the same manner as Example 71.

The ratio (P1/P2) of the phosphorus content (P1) in the central portion 341 to the average phosphorus content (P2) in the first end portion 342 and the second end portion 343 was 1.16.

The ratio (F1/F2) of the fluorine content (F1) in the central portion 341 to the average fluorine content (F2) in the first end portion 342 and the second end portion 343 was 1.10.

The ratio (W1/W2) of the water content (W1) in the central portion 341 to the average water content (W2) in the first end portion 342 and the second end portion 343 was 1.00.

The cycle characteristics after 1000 cycles were 89.8%.

In Examples 70 to 78, the ratio ((P1+F1)/(P2+F2)) of the sum of the phosphorus content P1 and the fluorine content F1 to the sum of the average phosphorus content P2 and the average fluorine content F2 satisfies the relationship of $1<(P1+F1)/(P2+F2)\leq1.24$, and the cycle characteristics after 1000 cycles were 88.9% or more. The reason for this is not clear, but it is presumably because the formation of a potential gradient between the central portion and the end portion is stabilized, and the intensive formation of unintended precipitates that cause local high resistance is further prevented by controlling the sum of the phosphorus content P1 and the fluorine content F1 in the central portion and the sum of the average phosphorus content P2 and average fluorine content F2 in the end portion to a specific range.

In Examples 79 to 85 and Examples 87 to 88, the ratio (W2/W1) of the water content (W1) in the central portion 341 to the average water content (W2) in the first end portion 342 and the second end portion 343 satisfies the relationship of $1<W1/W2\leq1.5$, and the cycle characteristics after 1000 cycles were 89.5% or more. The results is due to stability of intercalation and de-intercalation of lithium ions and electron transfer during charge and discharge in a whole of the negative electrode, by forming an appropriate potential gradient between the central portion 341 and the first end portion 342, and between the central portion 341 and the second end portion 343 by increasing the amount of precipitates in the central portion 341 within a predetermined range.

INDUSTRIAL APPLICABILITY

Since the negative electrode of the present invention suppresses the generation of wrinkles on the coated surface due to the water absorption of the binder and the expansion degree of the active material, unintended non-uniformity of the oxidation/reduction reaction in the negative electrode surface is prevented, and excessive deposition of precipitates on the negative electrode surface is suppressed.

Thereby, since the metal lithium precipitation tolerance during repeated charge and discharge is improved, the lithium ion secondary battery with excellent cyclic characteristics can be provided.

DESCRIPTION OF SYMBOLS

10 Separator,
20 Positive electrode,
22 Positive electrode collector,
24 Positive electrode active material layer,
30 Negative electrode,
32 Negative electrode collector,
34 Negative electrode active material layer, Negative electrode layer,
40 Laminated body,
50 Case, Laminate outer package,
60, 62 Lead,
100 Lithium ion secondary battery,
341 Center portion,
342 First end portion,
343 Second end portion

What is claimed is:

1. A negative electrode comprising
a current collector and
a negative electrode active material layer coated on at least one surface of the current collector,
wherein the negative electrode active material layer comprises either phosphorus or fluorine,
a phosphorus content or a fluorine content in a central portion of the negative electrode active material layer is different from an average phosphorus content or an average fluorine content in an end portion outward from the central portion to a side,
the phosphorus content P1 in the central portion and the average phosphorus content P2 in the end portion satisfy a relationship of $1<P1/P2\leq1.30$, or the fluorine content F1 in the central portion and the average fluorine content F2 in the end portion satisfy a relationship of $1<F1/F2\leq1.22$.

2. The negative electrode according to claim 1,
wherein the negative electrode layer has a phosphorus-containing layer,
an average thickness T1 [μm] of the phosphorus-containing layer in the central portion and an average thickness T2 [μm] of the phosphorus-containing layer in the end portion satisfy both a relationship of $1<T1/T2\leq1.80$ and a relationship of $T1\leq10$.

3. The negative electrode according to claim 1,
wherein the phosphorus content P1 in the central portion and the phosphorus content P3 at an arbitrary point in the end portion satisfy a relationship of $1<P1/P2\leq1.30$.

4. The negative electrode according to claim 1,
wherein the negative electrode active material layer has a phosphorus-containing layer,
an average thickness T1 [μm] of the phosphorus-containing layer in the central portion and a thickness T3 [μm] of the phosphorus-containing layer at an arbitrary point in the end portion satisfy a relationship of $1<T1/T3\leq1.80$.

5. The negative electrode according to claim 1,
wherein the negative electrode active material layer has a fluorine-containing layer,
an average thickness T1 [μm] of the fluorine-containing layer in the central portion and an average thickness T2 [μm] of the fluorine-containing layer in the end portion satisfy both a relationship of $1<T1/T3\leq1.80$ and a relationship of $T1\leq10$.

6. The negative electrode according to claim 1,
wherein the fluorine content F1 in the central portion and the fluorine content F3 at an arbitrary point in the end portion satisfy a relationship of $1<F1/F3\leq1.22$.

7. The negative electrode according to claim 1,
wherein the negative electrode active material layer has a fluorine-containing layer,
the average thickness T1 [μm] of the fluorine-containing layer in the central portion and the thickness T3 [μm] of the fluorine-containing layer at arbitrary point in the end portion satisfy both a relationship of $1<T1/T3\leq1.80$ and a relationship of $T1\leq10$.

8. The negative electrode according to claim 1,
wherein a water content in the central portion of the negative electrode active material layer is different from an average water content in the end portion outward from the central portion to the side,
the water content W1 [ppm] per unit mass in the central portion measured and the average water content W2 [ppm] per unit mass in the end portion satisfy a relationship of $1<W1/W2\leq1.5$, wherein when the water content W1 and the average water content W2 are measured when the negative electrode active material layer is heated from 120° C. to 300° C.

9. A lithium ion secondary battery, comprising:
a positive electrode;
the negative electrode according to claim 1; and
a separator interposed between the positive electrode and the negative electrode, and
a non-aqueous electrolyte.

10. The negative electrode according to claim 1,
wherein the current collector is not alloyed with lithium.

11. The negative electrode according to claim 1,
wherein the current collector comprises no lithium metal.

12. The negative electrode according to claim 1,
wherein the current collector is a metal thin plate of copper foil or nickel foil.

13. The negative electrode according to claim 1,
wherein the negative electrode active material layer comprises a negative electrode active material and a negative electrode binder.

14. The negative electrode according to claim 13,
wherein the negative electrode active material comprises at least one selected from the group consisting of a carbon material, aluminum, phosphorus, tin, $SiO_x$ ($0<x<2$), tin dioxide, and lithium titanate.

15. The negative electrode of claim 1,
wherein the negative electrode is a negative electrode for a lithium ion secondary battery.

* * * * *